US012574494B2

(12) United States Patent
Ito

(10) Patent No.: US 12,574,494 B2
(45) Date of Patent: Mar. 10, 2026

(54) DISPLAY DEVICE, DISPLAY CONTROL METHOD, AND COMPUTER-READABLE STORAGE MEDIUM

(71) Applicant: JVCKENWOOD Corporation, Yokohama (JP)

(72) Inventor: Fumihiko Ito, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 127 days.

(21) Appl. No.: 18/464,301

(22) Filed: Sep. 11, 2023

(65) Prior Publication Data

US 2023/0421750 A1    Dec. 28, 2023

Related U.S. Application Data

(63) Continuation of application No. PCT/JP2022/012769, filed on Mar. 18, 2022.

(30) Foreign Application Priority Data

Mar. 19, 2021   (JP) ................................. 2021-046022
Mar. 19, 2021   (JP) ................................. 2021-046023
(Continued)

(51) Int. Cl.
*H04N 13/398*        (2018.01)
*G02B 30/26*         (2020.01)
(Continued)

(52) U.S. Cl.
CPC ........... *H04N 13/398* (2018.05); *G02B 30/26* (2020.01); *H04N 13/332* (2018.05); *H04N 13/383* (2018.05)

(58) Field of Classification Search
CPC .. H04N 13/398; H04N 13/332; H04N 13/383; H04N 5/64; H04N 13/344;
(Continued)

(56) References Cited

U.S. PATENT DOCUMENTS 5,872,590 A * 2/1999 Aritake ................ H04N 13/376
                                                    348/E13.058
6,304,288 B1 * 10/2001 Hamagishi ........... H04N 13/346
                                                    348/E13.05
(Continued)

FOREIGN PATENT DOCUMENTS

JP          06-235885         8/1994
JP          09-297282        11/1997
(Continued)

OTHER PUBLICATIONS

Hu, et al. "High-resolution optical see-through multi-focal-plane head-mounted display using freeform optics", Optics Express, vol. 22, No. 11, 2014, pp. 13896-13903.
(Continued)

*Primary Examiner* — Tung T Vo
(74) *Attorney, Agent, or Firm* — Amin, Turocy & Watson, LLP

(57)          ABSTRACT

A display device includes a display unit including a plurality of pixels to cause the pixels to emit light to provide an image to a user; a drive control unit configured to move the display unit at predetermined intervals; and a timing setting unit configured to set an emission timing of the light for each of the pixels based on a position of the display unit.

12 Claims, 54 Drawing Sheets

(30)          Foreign Application Priority Data

| Mar. 19, 2021 | (JP) | ................................. | 2021-046052 |
| Mar. 19, 2021 | (JP) | ................................. | 2021-046081 |
| Mar. 19, 2021 | (JP) | ................................. | 2021-046216 |
| Mar. 19, 2021 | (JP) | ................................. | 2021-046217 |
| Mar. 19, 2021 | (JP) | ................................. | 2021-046450 |

(51)  Int. Cl.
        *H04N 13/332*          (2018.01)
        *H04N 13/383*          (2018.01)
(58)  Field of Classification Search
        CPC .... G02B 30/26; G02B 27/0093; G02B 27/02;
                    G02B 30/20; G02B 30/22; G09G 3/20;
                                                                    G09G 5/36
        USPC ........................................................... 348/53
        See application file for complete search history.

(56)                    References Cited

U.S. PATENT DOCUMENTS

| 6,710,920 | B1 * | 3/2004 | Mashitani | .............. | H04N 13/32 |
| | | | | | 359/464 |
| 9,520,106 | B2 * | 12/2016 | An | ........................ | H04N 13/351 |
| 9,832,457 | B2 * | 11/2017 | Kim | ...................... | H04N 13/351 |
| 10,241,545 | B1 * | 3/2019 | Richards | .................. | G06F 3/013 |
| 10,610,775 | B1 * | 4/2020 | Ebert | ...................... | G06F 3/013 |
| 11,042,039 | B1 * | 6/2021 | Trail | ....................... | G06F 3/013 |
| 11,837,134 | B1 * | 12/2023 | Park | ................... | H01L 25/0753 |
| 11,843,763 | B2 * | 12/2023 | Makiguchi | ......... | G02B 27/0093 |
| 2002/0030887 | A1 * | 3/2002 | Hamagishi | ........... | H04N 13/363 |
| | | | | | 348/E13.058 |
| 2011/0164188 | A1 * | 7/2011 | Karaoguz | .......... | H04N 21/4122 |
| | | | | | 348/734 |
| 2013/0155337 | A1 * | 6/2013 | Sugiyama | ............. | G02F 1/1313 |
| | | | | | 349/62 |
| 2013/0249896 | A1 * | 9/2013 | Hamagishi | ........... | H04N 13/354 |
| | | | | | 345/204 |
| 2014/0300536 | A1 * | 10/2014 | Kim | ...................... | H04N 13/383 |
| | | | | | 345/156 |
| 2015/0362740 | A1 * | 12/2015 | Hamagishi | ........... | H04N 13/366 |
| | | | | | 359/462 |
| 2016/0065954 | A1 * | 3/2016 | Son | ........................ | G02B 30/52 |
| | | | | | 348/51 |
| 2016/0073097 | A1 * | 3/2016 | Hamagishi | ........... | H04N 13/383 |
| | | | | | 348/59 |
| 2016/0080729 | A1 * | 3/2016 | Watanabe | ........... | H04N 13/225 |
| | | | | | 348/54 |
| 2016/0091861 | A1 * | 3/2016 | Liu | ....................... | H04N 13/302 |
| | | | | | 359/9 |
| 2016/0105665 | A1 * | 4/2016 | Wang | ................. | G02B 27/0093 |
| | | | | | 348/55 |
| 2017/0078652 | A1 | 3/2017 | Hua et al. | | |
| 2017/0102545 | A1 | 4/2017 | Hua et al. | | |
| 2017/0301313 | A1 * | 10/2017 | Perreault | .................. | G02B 3/14 |
| 2017/0357098 | A1 * | 12/2017 | Kroll | .................. | G02B 27/0093 |
| 2018/0063502 | A1 * | 3/2018 | Ogawa | .................... | H04N 13/31 |
| 2018/0084245 | A1 * | 3/2018 | Lapstun | ................ | G02B 6/105 |
| 2018/0253931 | A1 * | 9/2018 | Maddox | .............. | H04N 13/315 |
| 2019/0129274 | A1 * | 5/2019 | Wang | .................. | G02F 1/13306 |
| 2019/0137758 | A1 * | 5/2019 | Banks | .................. | H04N 13/344 |
| 2019/0260982 | A1 | 8/2019 | Hua et al. | | |
| 2019/0299858 | A1 * | 10/2019 | Imamura | .................. | G02B 5/10 |
| 2020/0089316 | A1 * | 3/2020 | Raskar | .................. | G06T 7/0002 |
| 2020/0249476 | A1 * | 8/2020 | Wu | .......................... | G02B 7/08 |
| 2021/0006773 | A1 | 1/2021 | Hua et al. | | |
| 2022/0191464 | A1 * | 6/2022 | Makiguchi | ........... | H04N 13/366 |
| 2022/0208037 | A1 * | 6/2022 | Chen | ...................... | G02B 30/27 |
| 2023/0007226 | A1 * | 1/2023 | Diao | ...................... | H04N 13/15 |
| 2023/0051252 | A1 * | 2/2023 | Gaudreau | .............. | H04N 13/32 |
| 2023/0393655 | A1 * | 12/2023 | Mizuo | ................ | G02B 27/0093 |
| 2024/0137484 | A1 * | 4/2024 | Wang | .................. | H04N 13/383 |
| 2024/0385458 | A1 * | 11/2024 | Li | ....................... | G02B 27/0176 |

FOREIGN PATENT DOCUMENTS

| JP | 2003-334221 | 11/2003 |
| JP | 2006-091333 | 4/2006 |
| JP | 2017-515162 | 6/2017 |
| WO | 2019/044501 | 3/2019 |

OTHER PUBLICATIONS

Suyama, "Volumetric 3D Display Utilizing a Liquid-Crystal Varifocal Lens", 2011, pp. 616-621.
Japanese Office Action for Japanese Patent Application No. 2021-046052 dated Jul. 23, 2024.
International Search Report and Written Opinion for International Application No. PCT/JP2022/012769 mailed on Jun. 7, 2022, 11 pages.

* cited by examiner

FIG.22

DISPLAY DEVICE, DISPLAY CONTROL METHOD, AND COMPUTER-READABLE STORAGE MEDIUM

CROSS-REFERENCE TO RELATED APPLICATIONS

This application is a Continuation of PCT International Application No. PCT/JP2022/012769 filed on Mar. 18, 2022 which claims the benefit of priority from Japanese Patent Applications No. 2021-046022, No. 2021-046023, No. 2021-046052, No. 2021-046081, No. 2021-046216, No. 2021-046217 and No. 2021-046450, each filed on Mar. 19, 2021, the entire contents of all of which are incorporated herein by reference.

BACKGROUND

The present disclosure relates to a display device, a display control method, and a computer-readable storage medium.

A display device is known that causes the right and left eyes of the user to view images having different parallaxes, and displays a stereoscopic image by making use of the variation in the convergence. Examples of such a display device include, what is called, a head-mounted display (HMD) that is mounted in the head region of the user. For example, in International Laid-open Pamphlet No. 2019/044501, a head-mounted display is disclosed in which a microlens array is disposed in between a display and an optical system.

SUMMARY

A display device according to an aspect of the present disclosure includes: a display unit including a plurality of pixels to cause the pixels to emit light to provide an image to a user; a drive control unit configured to move the display unit at predetermined intervals; and a timing setting unit configured to set an emission timing of the light for each of the pixels based on a position of the display unit.

A display control method according to an aspect of the present disclosure includes: performing drive control to move a display unit at predetermined intervals, the display unit including a plurality of pixels to cause the pixels to emit light; and setting an emission timing of the light for each of the pixels based on a position of the display unit.

A non-transitory computer-readable storage medium according to an aspect of the present disclosure stores a display control program causing a computer to execute: performing drive control to move a display unit at predetermined intervals, the display unit including a plurality of pixels to cause the pixels to emit light; and setting an emission timing of the light for each of the pixels based on a position of the display unit.

BRIEF DESCRIPTION OF THE DRAWINGS

FIGS. 20 to 22 are schematic diagrams for explaining about setting an emission timing.

DETAILED DESCRIPTION

Figure 1:
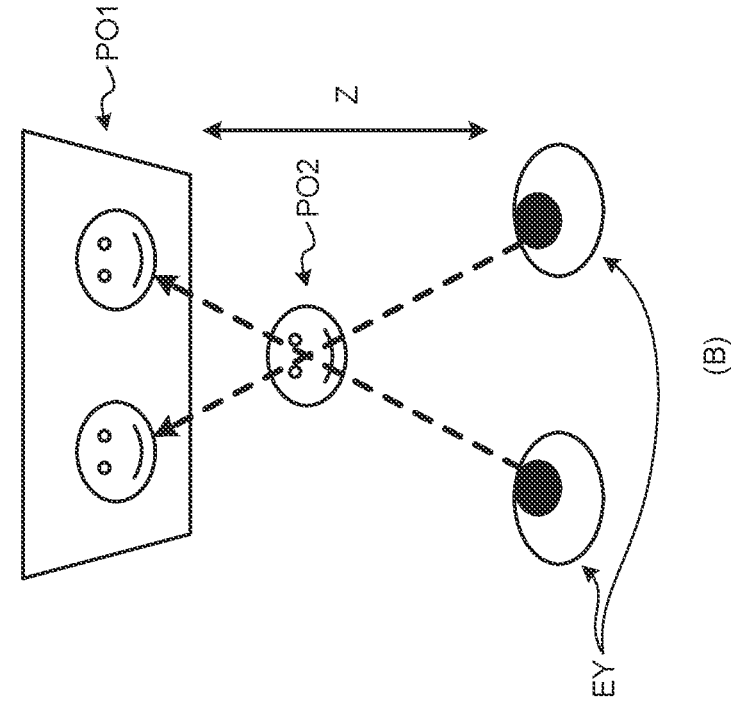
FIG. 1 is a schematic diagram for explaining the convergence/accommodation contradiction.

Exemplary embodiments are described below in detail with reference to the accompanying drawings. However, the present invention is not limited by the embodiments described below.
Convergence/Accommodation Contradiction FIG. 1 is a schematic diagram for explaining the convergence/accommodation contradiction. A display device, which is configured to display stereoscopic images, causes the right and left eyes of the user to view images having different parallaxes, and displays a stereoscopic image by making use of the variation in the convergence. In the case of displaying a stereoscopic image, the display surface on which the image is actually displayed serves as the focal position of the eyes of the user, and the position at which the lines of sight of the right and left eyes intersect represents the convergence position. However, as illustrated in FIG. 1, in a stereoscopic image, there are times when a focal position PO1 and a convergence position PO2 become misaligned in the Z direction that represents the depth direction of the stereoscopic image. If the focal position PO1 and the convergence position PO2 become misaligned, it results in what is called the convergence/accommodation contradiction that is responsible for the eye fatigue or for what is called 3D sickness. For that reason, there is a demand for ensuring that the convergence/accommodation contradiction is held down. Meanwhile, in (A) in FIG. 1, an example is illustrated in which, as compared to the convergence position PO2, the focal position PO1 is closer to eyes EY of the user. On the other hand, in (B) in FIG. 1, an example is illustrated in which, as compared to the focal position PO1, the convergence position PO2 is closer to the eyes EY of the user.

First Embodiment

Overall Configuration of Display Device

Figure 2:
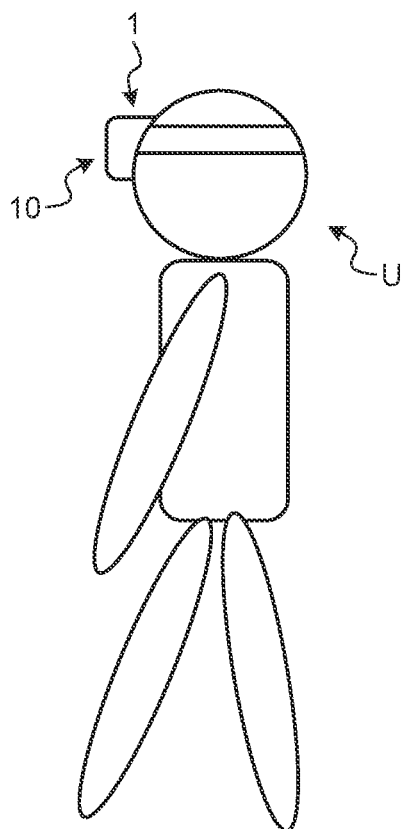
FIG. 2 is a schematic diagram of a display device according to a first embodiment.

FIG. 2 is a schematic diagram of a display device according to a first embodiment. A display device 1 according to the first embodiment is configured to display stereoscopic images. As illustrated in FIG. 2, the display device 1 is what is called a head-mounted display (HMD) that is mounted in the head region of a user U. For example, of the display device 1, a display unit 10 is mounted to face toward the eyes EY of the user U. The display device 1 displays images in the display unit 10 and provides contents to the user U. Meanwhile, the configuration of the display device 1 illustrated in FIG. 2 is only exemplary. Alternatively, for example, the display device 1 can include a sound output unit (speaker) that is mounted on an ear of the user U.

As a result of mounting the display device 1 on the user U in the manner explained above, the position of the display device 1 with respect to the eyes EY of the user U gets fixed. The display device 1 is not limited to be an HMD mounted on the user U, and can alternatively be a display device fixed to an equipment. In that case too, it is desirable that the position of the display device 1 with respect to the eyes EY of the user U is fixed. For example, it is desirable that the position of the display device 1 is fixed with respect to the seat on which the user U is sitting.

Figure 3:
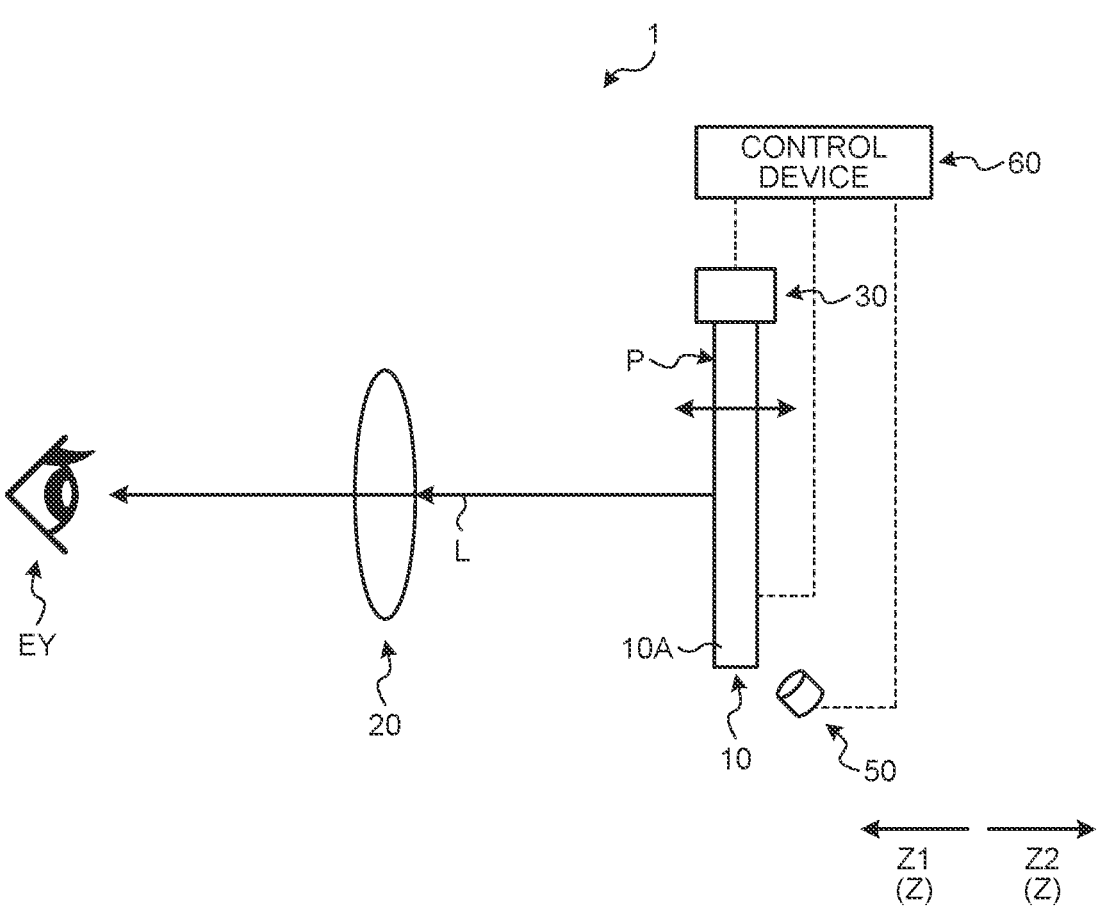
FIG. 3 is a schematic diagram illustrating the constituent elements of the display device according to the first embodiment.

FIG. 3 is a schematic diagram illustrating the constituent elements of the display device according to the first embodiment. As illustrated in FIG. 3, the display device 1 includes the display unit 10, an eyepiece 20, a driving unit 30, a position detection unit 50, and a control device 60.
Display Unit The display unit 10 is a device for displaying stereoscopic images. The display unit 10 is a display that includes a plurality of self-luminous pixels P (display elements) arranged in a matrix. Because of the self-luminous nature of the pixels P in the display unit 10, it becomes possible for the display unit 10 to control the emission of light (light irradiation) from each pixel P on an individual basis. The pixels P of the display unit 10 can be, for example, organic light emitting diodes (OLED) or inorganic light emitting diodes (micro LEDs). Meanwhile, a display surface 10A represents that surface of the display unit 10 on which images are displayed. In the following explanation, the direction from the display surface 10A toward the eyes EY of the user U is referred to as a Z1 direction; and the direction opposite to the Z1 direction, that is, the direction from the eyes EY of the user U toward the display surface 10A is referred to as a Z2 direction. When the directions Z1 and Z2 need not be distinguished from each other, they are referred to as a Z direction. In FIG. 3, the display surface 10A represents that surface of the display unit 10 which is present on the side of the eyes EY of the user U. However, the display surface 10A is not limited to be the surface present on the side of the eyes EY of the user U. Alternatively, the display surface 10A can be present more on the inner side than the surface on the side of the eyes EY of the user U. Meanwhile, the display unit 10 receives, from the control device 60 (explained later), a control signal meant for controlling the pixels P of the display unit 10.

The display unit 10 ensures that an image light L, which represents the light emitted (emission light) from each pixel P, reaches the eyes EY of the user U, and thus provides a stereoscopic image to the user U. More specifically, the emission of light from each pixel is controlled in such a way that a left-eye image and a right-eye image are provided. Of the image light L emitted from the pixels P, the image light L emitted from the pixels P corresponding to the left-eye image falls onto the left eye of the user U, and the image light L emitted from the pixels P corresponding to the right-eye image falls onto the right eye of the user U. As a result, a stereoscopic image is provided to the user U.

Eyepiece

The eyepiece 20 is disposed on the side in the Z1 direction with reference to the display unit 10. The eyepiece 20 is an optical element that transmits light (image light). More particularly, in the display device 1, the eyepiece 20 is the closest optical element (lens) to the eyes EY of the user U. The image light L emitted from the display unit 10 passes through the eyepiece 20 and falls onto the eyes EY of the user U. Meanwhile, in the first embodiment, in the light path of the image light L from the eyepiece 20 (eyepiece) to the eyes EY of the user U, the optical axis direction can be treated as the Z direction. Moreover, in the first embodiment, the eyepiece 20 is not movable, and has a fixed position in the display device 1.

In the example illustrated in FIG. 3, only the eyepiece 20 is illustrated as the optical element present on the side in the Z1 direction with reference to the display unit 10. However, that is not the only possible case, and other optical elements other than the eyepiece 20 can also be disposed on that side.

Driving Unit

The driving unit 30 is a driving mechanism for the purpose of moving the display unit 10 in the Z direction, and can also be called an actuator. Meanwhile, the driving unit 30 acquires, from the control device 60 (explained later), a signal meant for performing drive control.

Position Detection Unit

The position detection unit 50 is a sensor for detecting the position of the display unit 10 in the Z direction. As long as the position of the display unit 10 in the Z direction can be detected, the position detection unit 50 can be any type of sensor. The position information detection unit 50 sends the position detection result to the control device 60.

Control Device

Figure 4:
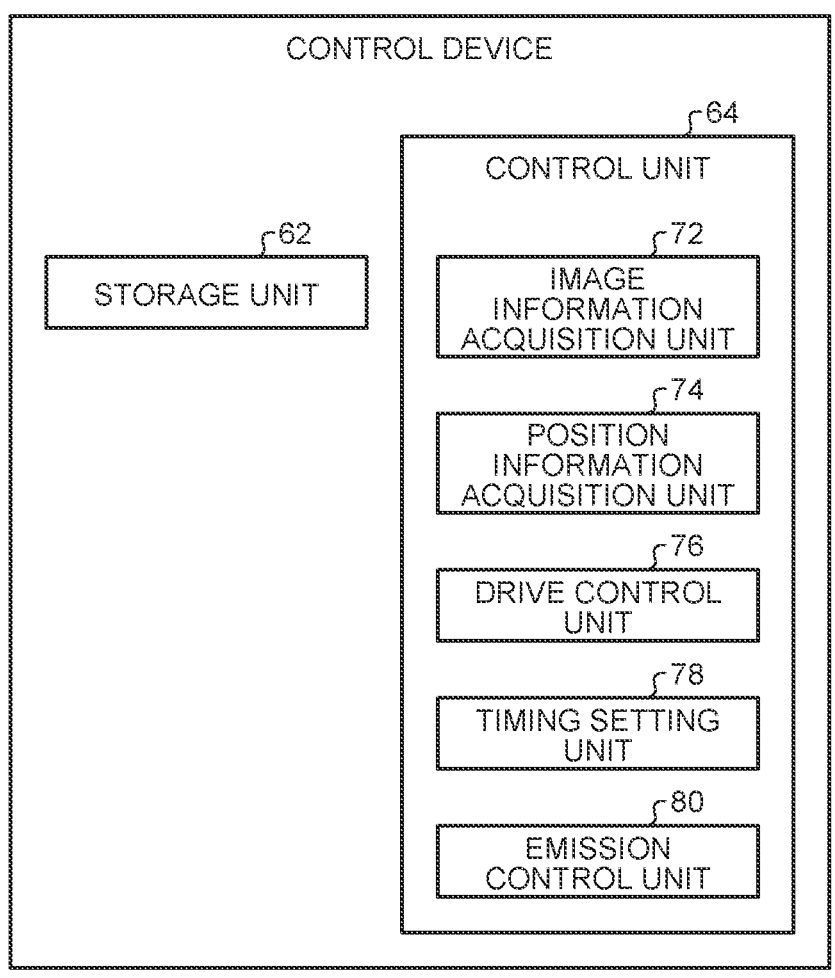
FIG. 4 is a schematic block diagram of a control device according to the first embodiment.

The control device 60 controls the constituent elements of the display device 1. FIG. 4 is a schematic block diagram of the control device according to the first embodiment. In the first embodiment, the control device 60 is a computer and includes a storage unit 62 and a control unit 64. The storage unit 62 is a memory used to store the computational details of the control unit 64 and to store a variety of information such as computer programs. For example, the storage unit 62 includes at least either a main storage device such as a random access memory (RAN) or a read only memory (ROM), or an external storage device such as a hard disk drive. The computer programs written for the control unit 64 and stored in the storage unit 62 can be alternatively stored in a recording medium that is readable by the control device 60.

The control unit 64 is an arithmetic device that includes an arithmetic circuit such as a central processing unit (CPU). The control unit 64 includes an image information acquisition unit 72, a position information acquisition unit 74, a drive control unit 76, a timing setting unit 78, and an emission control unit 80. The control unit 64 reads computer programs (software) from the storage unit 62 and executes them so as to implement the image information acquisition unit 72, the position information acquisition unit 74, the drive control unit 76, the timing setting unit 78, and the emission control unit 80 and to perform their processing. Meanwhile, the control unit 64 either can perform those processing using a single CPU, or can include a plurality of CPUs and can perform the processing using those CPUs. Meanwhile, at least one of the image information acquisition unit 72, the position information acquisition unit 74, the drive control unit 76, the timing setting unit 78, and the emission control unit 80 can be implemented using a hardware circuit.

Image Information Acquisition Unit

The image information acquisition unit 72 acquires image data of each stereoscopic image that is displayed in the display unit 10. That is, the image information acquisition unit 72 acquires image data of a left-eye image and acquires image data of a right-eye image. Moreover, the image information acquisition unit 72 acquires depth information indicating the position of the stereoscopic image in the depth direction. The position of a stereoscopic image in the depth direction implies the position of a virtual image in the depth direction that is viewed by the user U when an image is displayed on the display surface 10A. The depth direction can also be said to be the direction orthogonal to the display surface 10A of the display unit 10. In the first embodiment, the Z direction represents the depth direction. Meanwhile, the depth information is associated to the image data. Moreover, in a stereoscopic image, regarding each image included in a single frame, the position in the depth direction is set. In other words, for each position on the display surface 10A, the position in the depth direction is set. Hence, it can be said that, regarding a stereoscopic image, the image information acquisition unit 72 acquires the depth information regarding each position on the display surface 10A. Meanwhile, in a stereoscopic image, the position in the depth direction is set for each pixel P. However, alternatively, for a plurality of pixels P constituting a single image, the position in the depth direction can be set to be identical. The image information acquisition unit 72 can acquire the image data and the depth information according to an arbitrary method, such as by reading the image data and the depth information stored in advance in the storage unit 62 or by receiving the image data and the depth information via a communication unit (not illustrated). Alternatively, the image information acquisition unit 72 can calculate the positions in the depth direction based on the image data, and thus acquire the depth information.

Position Information Acquisition Unit

The position information acquisition unit 74 controls the position detection unit 50 and causes it to detect the position of the display unit 10 in the Z direction, and acquires the detection result about the position of the display unit 10 in the Z direction.

Drive Control Unit

The drive control unit 76 controls the driving unit 30 and causes it to the move the display unit 10 in the Z direction. The drive control unit 76 moves the display unit 10 in such a way that the display unit 10 repeatedly reciprocates (oscillates) by moving in the Z1 direction for a predetermined distance and then moving in the Z2 direction for a predetermined distance. Thus, the drive control unit 76 moves the display unit 10 along the Z direction at regular intervals. In other words, the drive control unit 76 causes reciprocation of the display unit 10 in the Z direction at regular intervals. In the first embodiment, the cycle of reciprocation in the Z direction (i.e., the period of time taken by the display unit 10 to return to the original position in the Z direction) is constant. However, the cycle is not limited to be constant, and can be variable.

Timing Setting Unit and Emission Control Unit

The timing setting unit 78 sets, for each pixel P of the display unit 10, the emission timing regarding the image light L. The emission control unit 80 controls, based on the image data, the pixels P of the display unit 10 and causes them to emit light. The emission control unit 80 causes each pixel P to emit the image light L at the emission timing set for that pixel P by the timing setting unit 78. That is, the emission control unit 80 causes a particular pixel P of the display unit 10 to emit the image light L at the emission timing set for that particular pixel P. The timing setting unit 78 sets the emission timing based on the position of the display unit 10 in the Z direction (i.e., in the optical axis direction of the image light L). More particularly, based on the depth information regarding the concerned stereoscopic image and based on the position of the display unit 10 in the Z direction, the timing setting unit 78 sets the emission timing. Meanwhile, although the timing setting unit 78 sets the emission timing for each pixel P, the emission timing is not limited to be different for each pixel P. For example, for a group of pixels P constituting a single image (for example, a group of pixels P displaying an image of a house in FIG. 5), the emission timing can be set to be identical. Regarding the setting performed by the timing setting unit 78, more specific explanation is given below.

Figure 5:
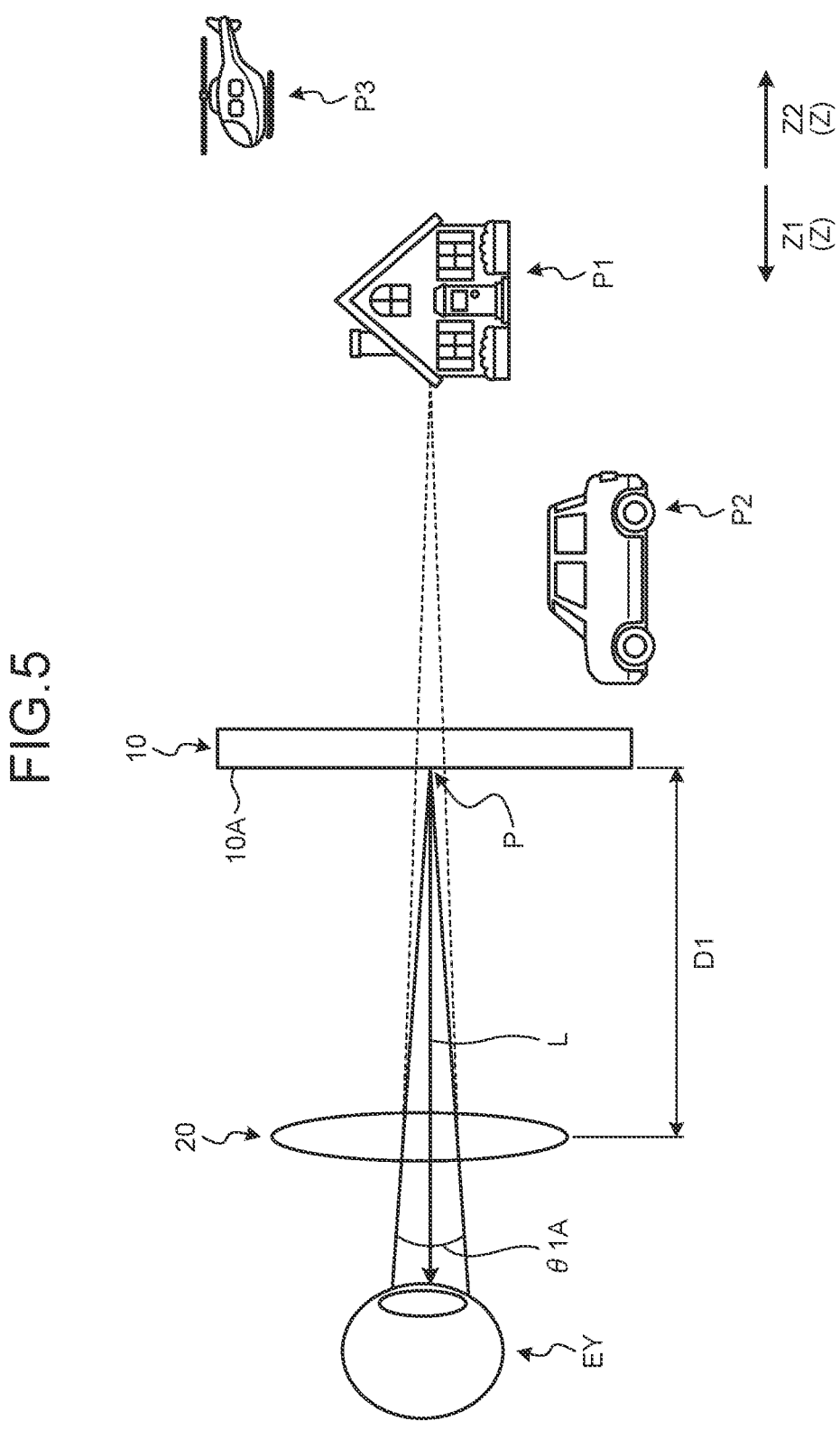
FIGS. 5 to 7 are schematic diagrams for explaining about setting an emission timing.
Figure 6:
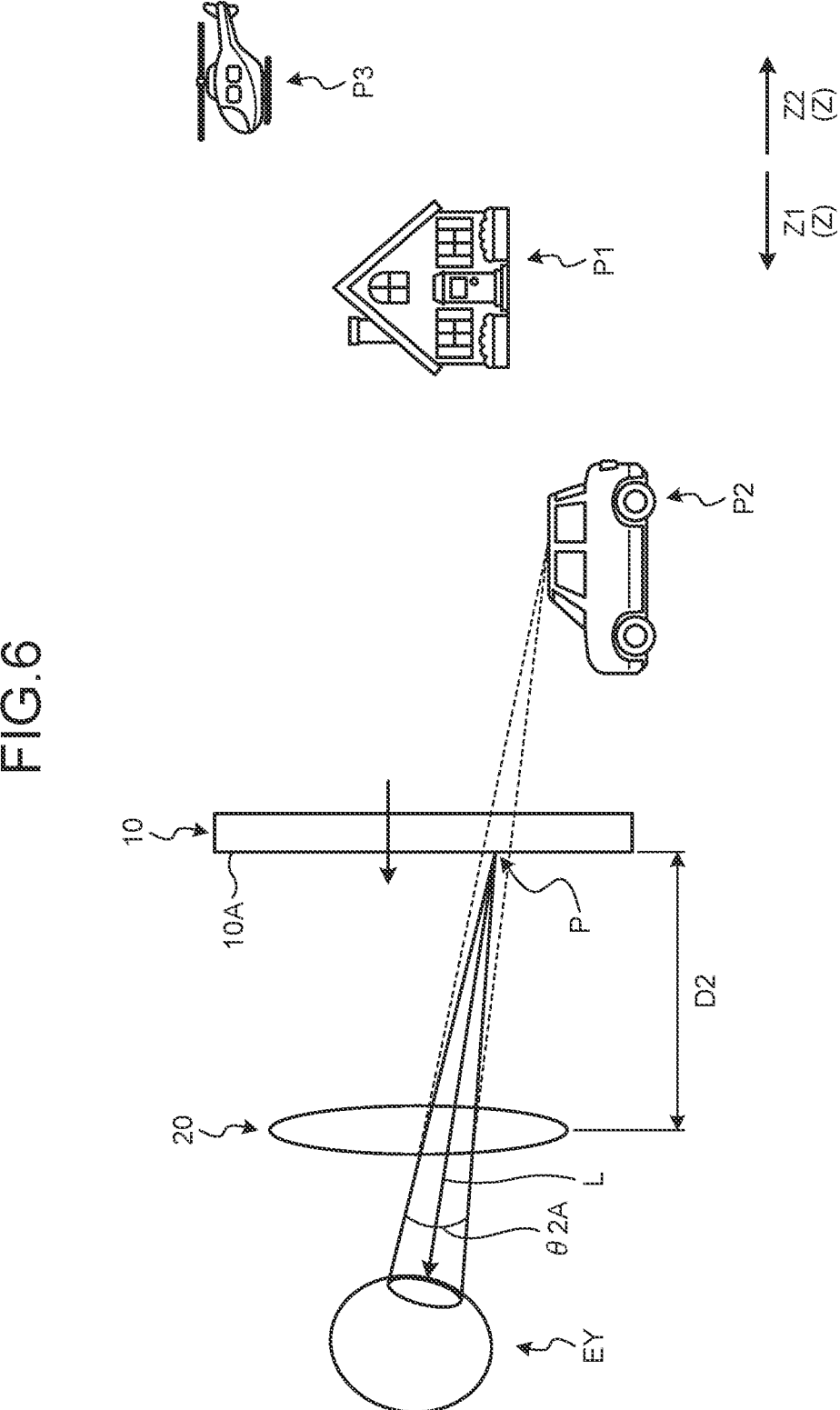
Figure 7:
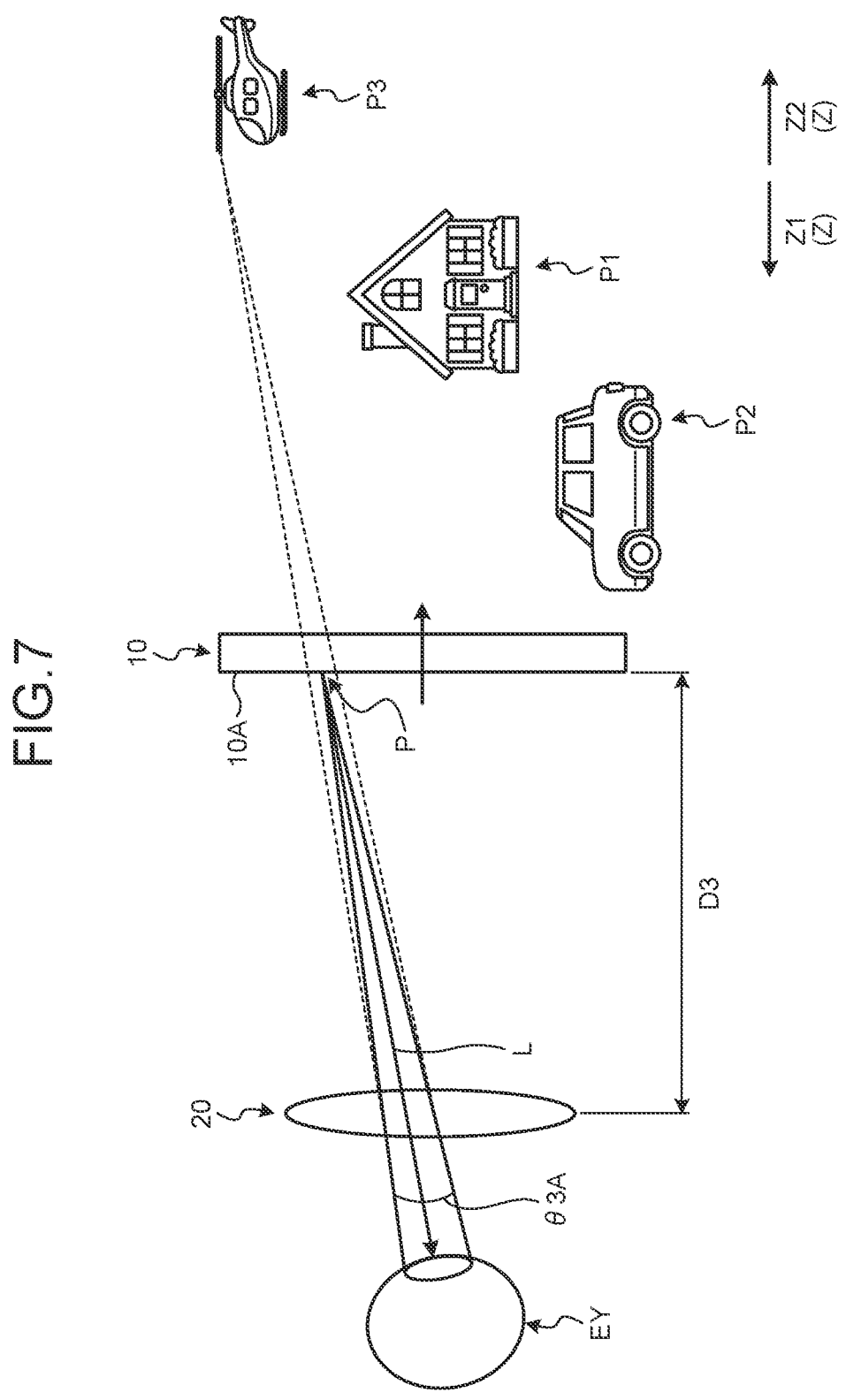

FIGS. 5 to 7 are schematic diagrams for explaining about setting the emission timing. For example, as illustrated in FIG. 5, the image light L that is emitted from a pixel P of the display unit 10 falls onto the eyes EY of the user U as a luminous flux having a predetermined angular aperture. In that case, in order to be in alignment with the angular aperture of the luminous flux, the user U involuntarily varies the thickness of the crystalline lenses of the eyeballs, and makes adjustment so that the retinas come in focus. The convergence/accommodation contradiction implies that the degree of convergence of the right and left eyes (the degree of cross-eye of the right and left eyes) does not match with the state in which the angular aperture of the luminous flux is focused on. In that regard, the display device 1 according to the first embodiment emits the image light L in such a way that there is a decrease in the difference between a virtual image angular aperture, which represents the angular aperture when it is assumed that light is emitted from a virtual image (convergence position) and falls onto the eyes EY (in the example illustrated in FIG. 5, an angle θ1A), and the angular aperture of the image light L at the time when the image light L is actually emitted from the concerned pixel P and falls onto the eyes EY. Herein, the angular aperture of the image light L is decided according to the distance from the display unit 10 (the display surface 10A) to the eyes EY in the Z direction (the optical axis direction). In the first embodiment, since the display unit 10 is moved in the Z direction at regular intervals, the timing setting unit 78 sets, as the emission timing, the timing at which the display unit 10 reaches the position at which there is a decrease in the difference between the virtual image angular aperture and the angular aperture of the image light L.

More specifically, the timing setting unit 78 acquires the depth information regarding each pixel P. That is, the timing setting unit 78 acquires, for each pixel P, the information about a position in the depth direction (the Z direction). Then, based on the depth information regarding each pixel P, the timing setting unit 78 sets the emission position representing the position of the display unit 10 at the time of causing the concerned pixel P to start emitting the image light L. The timing setting unit 78 sets, as the emission position for the concerned pixel P, the position of the display unit 10 in the Z direction at the time when the actual angular aperture of the image light L emitted from the concerned pixel P matches with the angular aperture of the luminous flux when light is emitted onto the eyes EY from the position in the depth direction of that part of the stereoscopic image which is displayed by the concerned pixel P (i.e., from the position of the virtual image formed by the concerned pixel P). Then, the timing setting unit 78 sets, as the emission timing for the concerned pixel P, the timing at which the display unit 10 reaches the position at which the distance between the display unit 10 and the emission position is within a predetermined distance range. The timing setting unit 78 sets the emission position for each pixel P as well as sets the emission timing for each pixel P. Although the timing setting unit 78 sets the emission position as well as the emission timing for each pixel P, the emission position and the emission timing are not limited to be different for each pixel P. For example, for a group of pixels P constituting a single image (for example, a group of pixels P displaying the image of a house in FIG. 5), the emission position and the emission timing can be set to be identical.

In the first embodiment, from the position information acquisition unit 74, the timing setting unit 78 sequentially acquires the information about the position of the display unit 10 in the Z direction; and, when the position of the display unit 10 in the Z direction reaches within a predetermined distance from the emission position, determines that the emission timing has arrived. Herein, the predetermined distance can be set in an arbitrary manner. However, in order to reduce the convergence/accommodation contradiction, it is desirable that the predetermined distance is set in such a way that there is a decrease in the difference between the virtual image angular aperture and the angular aperture of the image light L. Moreover, as the position in the depth direction of the pixel P which is to be used in setting the emission position, the timing setting unit 78 can use a value obtained by quantizing the depth direction. That is, for example, the depth direction is segmented into a plurality of numerical ranges and, for each numerical range, a predetermined value within that numerical range is set as the reference position. Then, the timing setting unit 78 extracts the numerical range that includes the position in the depth direction of the concerned pixel P as acquired by the image information acquisition unit 72, and treats the reference position of that numerical range as the position in the depth direction of the pixel P which is to be used in setting the emission position.

In this way, the timing setting unit 78 sets the emission timing for each pixel P. Moreover, the timing setting unit 78 sets a timing arriving later than the emission timing as the emission discontinuation timing. When it is determined that the emission timing for a particular pixel P has arrived, the emission control unit 80 causes that pixel P to start emitting the image light L. The emission control unit 80 causes that pixel P to emit the image light L during the period of time from the emission timing to the emission discontinuation timing; and, upon arrival of the emission discontinuation timing, causes that pixel P to stop emitting the image light L. Meanwhile, the emission discontinuation timing can be set in an arbitrary manner. For example, either the timing arriving after a predetermined period of time since the emission timing can be set as the emission discontinuation timing; or, immediately after the emission timing, the timing at which the distance between the display unit 10 and the emission position goes out of the predetermined distance range can be set as the emission discontinuation timing.

In this way, in the display device 1, each pixel P is made to emit the image light L upon arrival of the emission timing and is made to stop emitting the image light L upon arrival of the emission discontinuation timing. Thus, during the period of time from the emission timing to the emission discontinuation timing, the image light L falls onto the eyes EY of the user U. As a result, the angular aperture of the luminous flux of the image light L falling on the eyes EY gets closer to the virtual image angular aperture attributed to the virtual image formed by the concerned pixel P, thereby enabling achieving reduction in the convergence/accommodation contradiction. Meanwhile, since the display unit 10 reciprocates in the Z direction, it repeatedly switches between the state in which the distance to the emission position is within a predetermined distance range and the state in which the distance to the emission position goes out of the predetermined distance range. Every time the distance between the display unit 10 and the emission position falls within the predetermined distance range, that is, at every arrival of the emission timing, the control device 60 causes the pixel P to emit the image light L. Hence, the user U happens to view the stereoscopic images in the form of a video. Moreover, since the display unit 10 reciprocates in the Z direction, during a single cycle of reciprocation, the distance to the emission position becomes equal to the predetermined distance at two timings. For that reason, it is desirable that the oscillation frequency of the reciprocation of the display unit 10 is set to be equal to or greater than a half times of the framerate of the stereoscopic image. Herein, the oscillation frequency (cycle) of the reciprocation of the display unit 10 can be set in an arbitrary manner.

The abovementioned example about the setting of the emission timing is explained below with reference to FIGS. 5 to 7. The following explanation is given about an example in which an image of a house, an image of a vehicle, and an image of a helicopter are displayed as stereoscopic images, and the position in the depth direction (the Z direction) becomes more distant from the eyes EY of the user U in the order of the image of a vehicle, the image of a house, and the image of a helicopter. That is, a virtual image P2 of the image of a vehicle is positioned more on the side in the Z1 direction than a virtual image P1 of the image of a house, and a virtual image P3 of the image of a helicopter is positioned more on the side in the Z2 direction than the virtual image P1 of the image of a house.

In FIG. 5 is illustrated an example in which the user U is made to view the virtual image P1 of the image of a house. In the example illustrated in FIG. 5, the angle θ1A represents the angular aperture of the luminous flux when light is emitted from the virtual image P1 (i.e., from the position in the depth direction of the pixel P constituting the image of a house) onto the eyes EY (i.e., the angle θ1A represents the virtual image angular aperture). Moreover, it is assumed that, at the position of the display unit 10 at which the distance between the display unit 10 and the eyepiece 20 in the Z direction is equal to a distance D1, the angular aperture of the luminous flux of the image light L emitted from the pixel P constituting the image of a house becomes equal to the angle θ1A. In that case, the position at which the distance to the eyepiece 20 in the Z direction becomes equal to the distance D1 represents the emission position for the pixel P constituting the image of a house. Then, the timing setting unit 78 sets, as the emission timing for the pixel P constituting the image of a house, the timing at which the display unit 10 arrives to the position at which the distance to the emission position falls within a predetermined distance range. Upon arrival of the emission timing, the emission control unit 80 causes the pixel P, which constitutes the image of a house, to emit the image light L. As a result, the virtual image angular aperture attributed to the virtual image P1 of the image of a house gets closer to the angular aperture of the image light L that actually falls onto the eyes EY of the user U, thereby enabling achieving reduction in the convergence/accommodation contradiction. Meanwhile, since the image light L gets refracted from the eyepiece 20 before falling on the eyes EY, the angular aperture of the luminous flux of the image light L implies the angular aperture of the luminous flux of the image light L that has already passed through the eyepiece 20.

In FIG. 6 is illustrated an example in which the user U is made to view the virtual image P2 of the image of a vehicle. In the example illustrated in FIG. 6, an angle θ2A represents the angular aperture of the luminous flux when light is emitted from the virtual image P2 (i.e., from the position in the depth direction of the pixel P constituting the image of a vehicle) onto the eyes EY (i.e., the angle θ2A represents the virtual image angular aperture). Moreover, it is assumed that, at the position of the display unit 10 at which the distance between the display unit 10 and the eyepiece 20 in the Z direction is equal to a distance D2, the angular aperture of the luminous flux of the image light L emitted from the pixel P constituting the image of a vehicle becomes equal to the angle θ2A. Meanwhile, since the virtual image P2 is viewable more on the side in the Z1 direction than the virtual image P1, the angle θ2A is greater than the angle θ1A illustrated in FIG. 5 and the distance D2 is shorter than distance D1 illustrated in FIG. 5. In that case, the position at which the distance to the eyepiece 20 in the Z direction becomes equal to the distance D2 represents the emission position for the pixel P constituting the image of a vehicle. Then, the timing setting unit 78 sets, as the emission timing for the pixel P constituting the image of a vehicle, the timing at which the display unit 10 arrives to the position at which the distance to the emission position falls within a predetermined distance range. Upon arrival of the emission timing, the emission control unit 80 causes the pixel P, which constitutes the image of a vehicle, to emit the image light L. As a result, the virtual image angular aperture attributed to the virtual image P2 of the image of a vehicle gets closer to the angular aperture of the image light L that actually falls onto the eyes EY of the user U, thereby enabling achieving reduction in the convergence/accommodation contradiction.

In FIG. 7 is illustrated an example in which the user U is made to view the virtual image P3 of the image of a helicopter. In the example illustrated in FIG. 7, an angle θ3A represents the angular aperture of the luminous flux when light is emitted from the virtual image P3 (i.e., from the position in the depth direction of the pixel P constituting the image of a helicopter) onto the eyes EY (i.e., the angle θ3A represents the virtual image angular aperture). Moreover, it is assumed that, at the position of the display unit 10 at which the distance between the display unit 10 and the eyepiece 20 in the Z direction is equal to the distance D3, the angular aperture of the luminous flux of the image light L emitted from the pixel P constituting the image of a helicopter becomes equal to the angle θ3A. Meanwhile, since the virtual image P3 is viewable more on the side in the Z2 direction than the virtual image P1, the angle θ3A is smaller than the angle θ1A illustrated in FIG. 5 and the distance D3 is longer than the distance D1 illustrated in FIG. 5. In that case, the position at which the distance to the eyepiece 20 in the Z direction becomes equal to the distance D3 represents the emission position for the pixel P constituting the image of a helicopter. Then, the timing setting unit 78 sets, as the emission timing for the pixel P constituting the image of a helicopter, the timing at which the display unit 10 arrives to the position at which the distance to the emission position falls within a predetermined distance range. Upon arrival of the emission timing, the emission control unit 80 causes the pixel P, which constitutes the image of a helicopter, to emit the image light L. As a result, the virtual image angular aperture attributed to the virtual image P3 of the image of a helicopter gets closer to the angular aperture of the image light L that actually falls onto the eyes EY of the user U, thereby enabling achieving reduction in the convergence/accommodation contradiction.

Meanwhile, in the display device 1, since the emission timing is set for each pixel P, there are also times when only some pixels P in a single frame are turned on. For example, at the timing explained with reference to FIG. 5, only the image of a house is displayed. Similarly, at the timing explained with reference to FIG. 6, only the image of a vehicle is displayed. Moreover, at the timing explained with reference to FIG. 7, only the image of a helicopter is displayed. However, because of the afterimage effect attributed to successive delivery of a plurality of frames, the user U recognizes that a house, a vehicle, and a helicopter are all appearing in a single image. Alternatively, the configuration can be such that the entire image (in the present example, all of the house, the vehicle, and the helicopter) is displayed within the display period of a single frame. In that case, within the display period of a single frame, the drive control unit 76 can move the focal position of the eyepiece 20 by at least half of the reciprocation cycle. As a result, within display period of a single frame, all focal positions within the reciprocation can be covered, thereby enabling the display of the entire image.

In the explanation given above, from the position information acquisition unit 74, the timing setting unit 78 sequentially acquires the information about the position of the display unit 10 in the Z direction, and determines whether the display unit 10 has reached within a predetermined distance from the emission position. However, that is not the only possible case. For example, when the display unit 10 is being reciprocated in the Z direction at regular intervals, the timing-by-timing positions of the display unit 10 in the Z direction (i.e., the predicted positions) can be figured out without causing the position detection unit 50 to perform position detection. Thus, the timing setting unit 78 can acquire, from the timing information, the information about the positions of the display unit 10 in the Z direction. In that case, based on the information about the timing-by-timing predicted positions of the display unit 10 and based on the information about the emission position, the timing setting unit 78 can set, as the emission timing, the timing at which the display unit 10 reaches within a predetermined distance from the emission position; and, when the current timing coincides with the emission timing, can determine that the display unit 10 has reached the emission position and can cause the concerned pixel P to emit the image light L.

Flow of Processing

Figure 8:
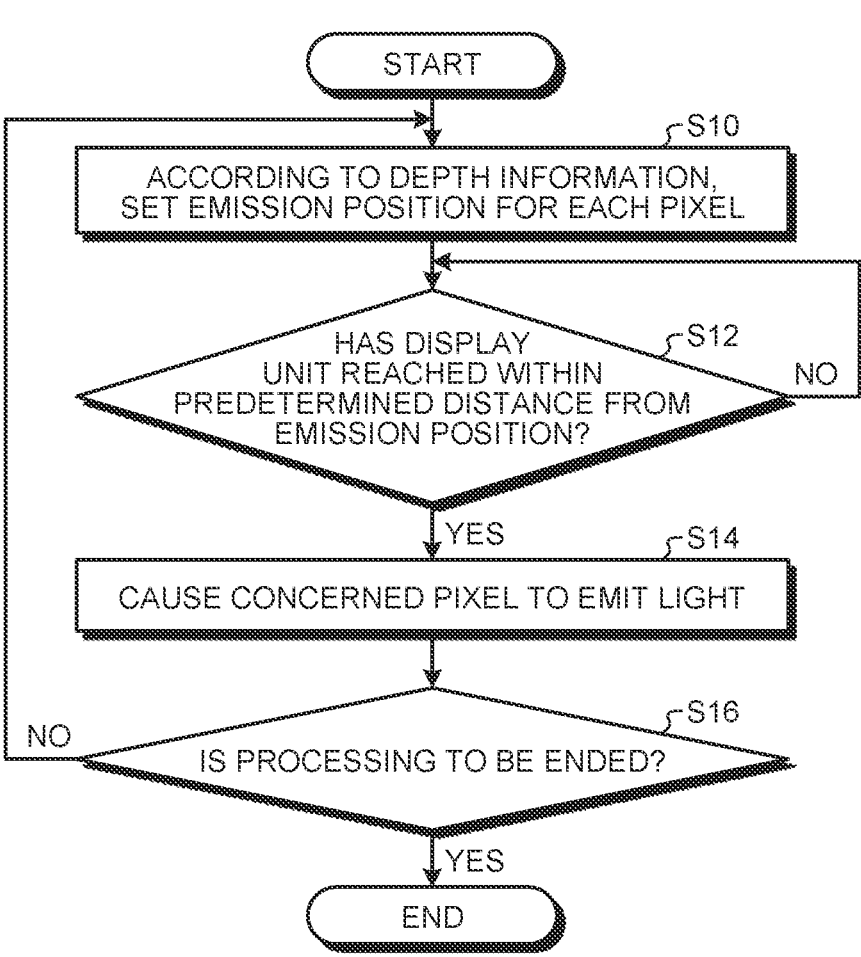
FIG. 8 is a flowchart for explaining a flow of processing performed by the control device according to the first embodiment.

Given below is the explanation of a flow of processing performed by the control device 60. FIG. 8 is a flowchart for explaining a flow of processing performed by the control device according to the first embodiment. In the control device 60, the drive control unit 76 causes the display unit 10 to reciprocate in the Z direction at regular intervals.

Moreover, in the control device 60, the timing setting unit 78 refers to the depth information regarding each pixel P and sets the emission position for each pixel P (Step S10). Then, in the control device 60, the position information acquisition unit 74 sequentially acquires the position of the display unit 10 in the Z direction and determines, for each pixel P, whether the display unit 10 has reached within a predetermined distance from the corresponding emission position (Step S12). If the display unit 10 has reached within a predetermined distance (Yes at Step S12), that is, if there is a pixel P regarding which the display unit 10 is determined to have reached within a predetermined distance from the emission position; then the timing setting unit 78 determines that the emission timing for the concerned pixel P has arrived, and the emission control unit 80 causes that pixel P to emit the image light L based on the image data (Step S14). Subsequently, upon arrival of the emission discontinuation timing, the emission control unit 80 causes that pixel P to stop emitting the image light L. After that, if the processing is not to be ended (No at Step S16), then the system control returns to Step S10 and the processing are performed again. Meanwhile, if the display unit 10 has not yet reached within a predetermined distance from the emission position (No at Step S12), that is, if there is no pixel P regarding which the display unit 10 is determined to have reached within a predetermined distance from the emission position; then the system control returns to Step S12 and no pixel P is allowed to emit the light until the display unit 10 reaches within the predetermined distance from the emission position. Meanwhile, at Step S16, if the processing is to be ended (Yes at Step S16), then it marks the end of the processing.

Effects

As explained above, the display device 1 according to the first embodiment provides stereoscopic images to the user U and includes the display unit 10, the drive control unit 76, the timing setting unit 78, and the emission control unit 80. The display unit 10 includes a plurality of self-luminous pixels P, and provides stereoscopic images to the user U by ensuring that the image light L emitted from the pixels P reaches the user U. The drive control unit 76 moves the display unit 10 along the optical axis direction of the image light L (in the first embodiment, along the Z direction) at regular intervals. Based on the position of the display unit 10 in the optical axis direction (in the first embodiment, the Z direction), the timing setting unit 78 sets the emission timing for each pixel P in regard to the emission of the image light L. At an emission timing, the emission control unit 80 causes the corresponding pixel P to emit the image light L.

In the case of displaying a stereoscopic image, it is required that the stereoscopic image is provided to the user in an appropriate manner. In that regard, in the first embodiment, the display unit 10 is moved in the optical axis direction and, based on the position of the display unit 10 in the optical axis direction, the emission timing regarding the image light L is set. Thus, according to the first embodiment, it can be ensured that the image light L reaches the user U at an appropriate timing based on the position of the display unit 10 in the optical axis direction, thereby making it possible to provide a stereoscopic image to the user U in an appropriate manner. Moreover, as explained above, at the time of displaying a stereoscopic image, there are times when the convergence/accommodation contradiction occurs. In that regard, in the first embodiment, the display unit 10 is moved in the optical axis direction and at the same time the emission timing regarding the image light L is set based on the position of the display unit 10 in the optical axis direction. Hence, the angular aperture of the luminous flux of the image light L can be appropriately adjusted and the convergence/accommodation contradiction can be reduced. More particularly, in the first embodiment, it is not every time that the display unit 10 is moved to a position at which the angular aperture of the luminous flux of the image light L is appropriate. Instead, the display unit 10 is moved at regular intervals, and the emission of light from the concerned pixel P is controlled at the timing at which the angular aperture of the luminous flux of the image light L becomes appropriate. As a result of controlling the emission of light in this manner, it becomes possible to hold down a delay in the control, and to appropriately adjust the angular aperture of the luminous flux of the image light L.

Moreover, the timing setting unit 78 sets the emission timing based on the depth information that indicates the position of a stereoscopic image in the depth direction (in the first embodiment, the Z direction). According to the first embodiment, since the emission timing is set by taking into account the depth information too, the angular aperture of the luminous flux of the image light L can be appropriately adjusted according to the stereoscopic image to be displayed. That enables achieving reduction in the convergence/accommodation contradiction.

Furthermore, the timing setting unit 78 acquires the information about the emission position that represents the position of the display unit 10 in the optical axis direction at which the angular aperture of the luminous flux of the image light L emitted from the concerned pixel P corresponds to the angular aperture of the luminous flux in the case in which the image light L is emitted toward the user U from the position in the depth direction in that part of the stereoscopic image which is displayed using the concerned pixel P (i.e., corresponds to the virtual image angular aperture). The timing setting unit 78 sets, as the emission timing for the concerned pixel P, the timing at which the display unit 10 reaches within a predetermined distance range from the emission position. According to the first embodiment, it becomes possible to ensure that only those pixels P emit light for which the angular aperture of the luminous flux and the virtual image angular aperture are close, and that the pixels P for which the angular aperture of the luminous flux and the virtual image angular aperture are not close do not emit light. That enables achieving reduction in the convergence/accommodation contradiction.

In the display device, an eyepiece is disposed on the side of the user U with respect to the display unit 10 in the optical axis direction. In the display device 1, as a result of disposing the eyepiece, it becomes possible to appropriately provide stereoscopic images to the user U.

Meanwhile, the display device 1 is a head-mounted display, because of which stereoscopic images can be provided in an appropriate manner.

Second Embodiment

Given below is the description of a second embodiment. In the second embodiment, the difference from the first embodiment is that a microlens array is included. In the second embodiment, regarding identical constituent elements to the first embodiment, the explanation is not repeated.

Figure 9:
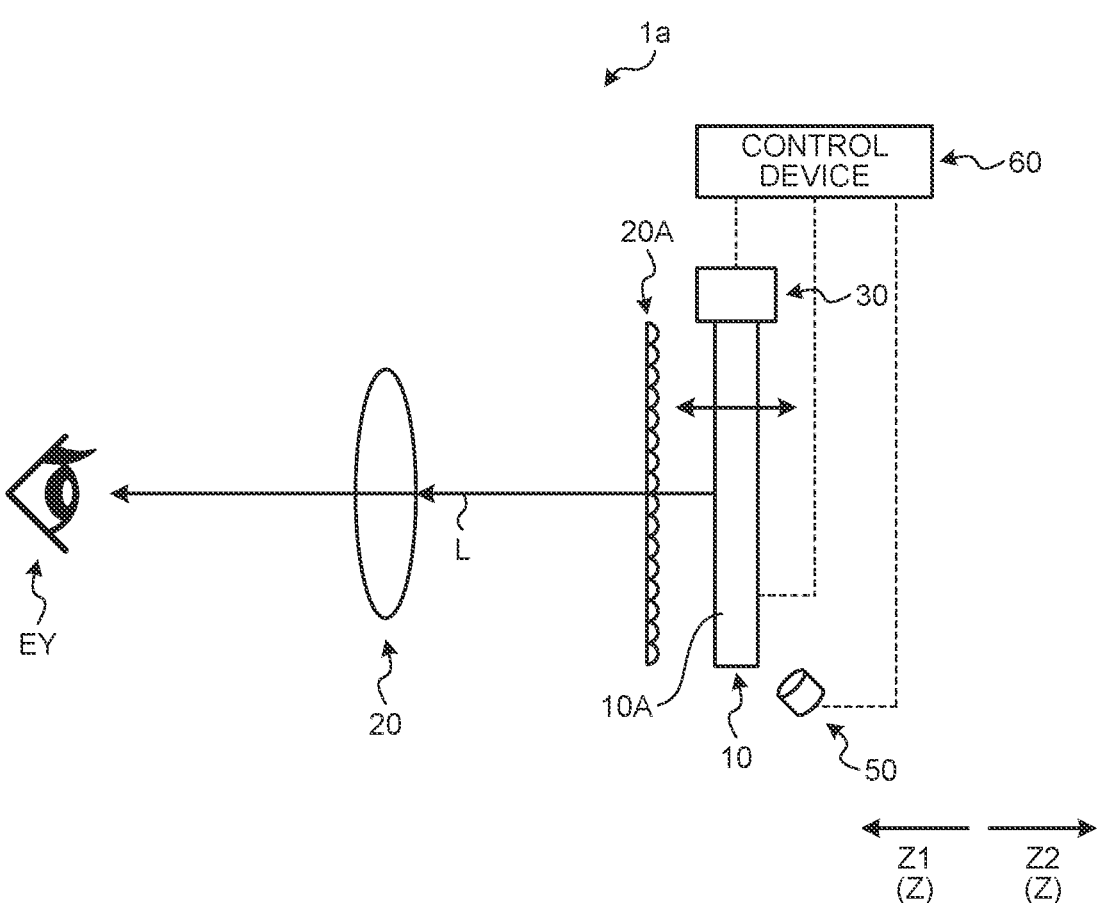
FIG. 9 is a schematic diagram of a display device according to a second embodiment.

FIG. 9 is a schematic diagram of a display device according to the second embodiment. As illustrated in FIG. 9, in a display device 1a according to the second embodiment, a microlens array 20A is disposed on the side of the eyes EY of the user U with respect to the display unit 10 in the optical axis direction of the image light L. The microlens array 20A is disposed in between the display unit 10 and the eyepiece 20 in the optical axis direction of the image light L. The microlens array 20A is an optical element in which a plurality of lenses is arranged in a matrix along a plane parallel to the display surface 10A. In the second embodiment, the pitch of each lens of the microlens array 20A, that is, the distance between the centers of neighboring lenses is about the same as the pitch of each pixel P of the display unit 10 (i.e., the distance between the centers of neighboring pixels P). In the microlens array 20A, the lenses are disposed on the side facing the pixels P of the display unit 10.

In the second embodiment, the image light L emitted from the display unit 10 reaches the eyes EY of the user U through the microlens array 20A and the eyepiece 20. The amount of movement of the display unit 10 in the Z direction, that is, the distance between the farthest position in the Z1 direction and the farthest position in the Z2 direction during one reciprocation cycle needs to be set to such a length that the angular aperture of the luminous flux of the image light L can follow the virtual image angular aperture attributed to a virtual image. In that regard, when the microlens array 20A is disposed, it causes widening of the angular aperture of the luminous flux of the image light L, and hence there is an increase the degree of change in the angular aperture of the luminous flux of the image light L (i.e., there is an increase in the sensitivity to the degree of change in the aperture angle) when the display unit 10 moves for a unit distance. Thus, according to the second embodiment, it becomes possible to reduce the amount of movement of the display unit 10 in the Z direction, and hence to reduce the burden exerted on the driving unit 30 and the display unit 10 accompanying the movement of the display unit 10.

In this way, in the display device 1a according to the second embodiment, a microlens array is disposed on the side of the user U with respect to the display unit 10 in the optical axis direction. As a result of disposing the microlens array in the display device 1a, it becomes possible to reduce the amount of movement of the display unit 10 and at the same time reduce the convergence/accommodation contradiction.

Figure 10:
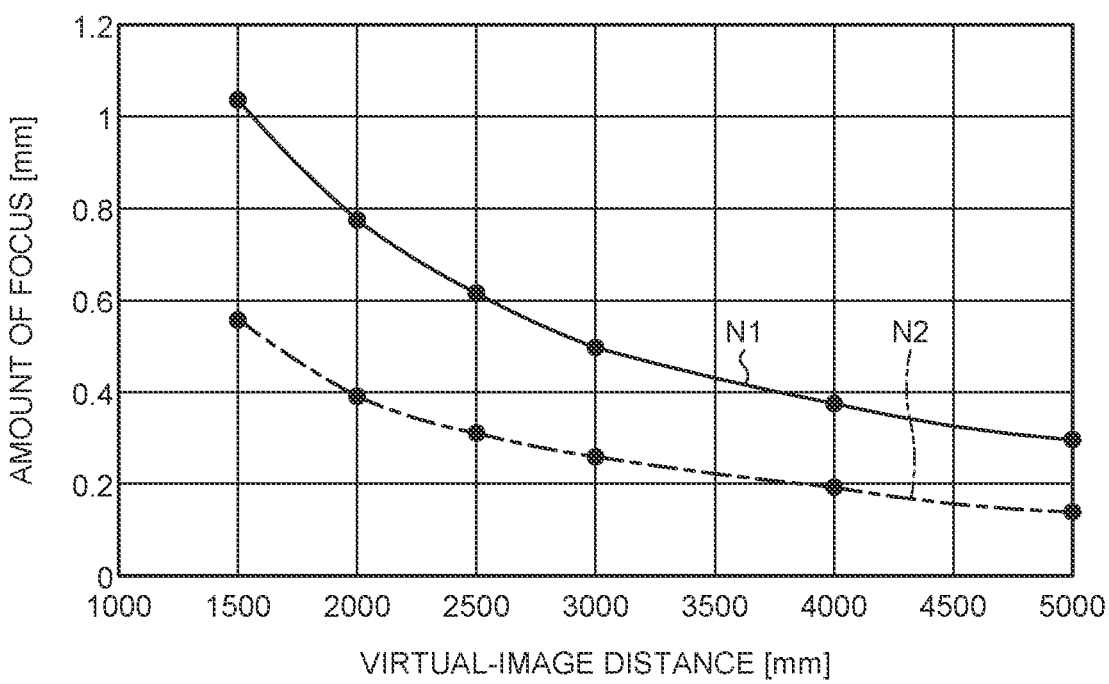
FIG. 10 is a graph for explaining the difference occurring in the amount of movement of a display unit when a microlens array is disposed.

FIG. 10 is a graph for explaining the difference occurring in the amount of movement of the display unit when a microlens array is disposed. The following explanation is given about the calculation result obtained when optical simulation was performed to calculate the difference in the required amount of movement of the display unit 10 in the case in which a microlens array was disposed and in the case in which a microlens array was not disposed. In the optical simulation, a 3.5-inch display was used, the eyepiece had the focal length of 40 mm, and the lenses in the microlens array had the focal length of 4.8 mm and had the radius of curvature of 2.5 mm. In the actual lens optical system of an HMD, there is a relatively larger field curvature due to a general restriction on the number of eyepieces. However, the size of the field curvature differs according to the lens design. Hence, in this simulation, in order to check the variation only in the focus amount, the calculation was performed using ideal lenses having no aberration. The luminous flux of the image light coming from a display passes through the microlens array and substantially becomes a parallel light in the eyepiece, before falling on the eye-point. Then, the luminous flux gets folded at the eye-point, and converges on the object point in a virtual image. In the present simulation, based on a virtual image distance of 100 m (equivalent to infinity) that is set as the reference, the virtual image distance was varied from 5000 mm to 1500 mm, and the amount of movement of the display was calculated as the amount of focus. In FIG. 10, a line N1 represents the amount of focus at each virtual image distance in the case in which a microlens array is not disposed, and a line N2 represents the amount of focus at each virtual image distance in the case in which a microlens array is disposed. As indicated by the lines N1 and N2, it can be understood that, when a microlens array is disposed, the amount of focus becomes smaller and the amount of movement of the display can be reduced.

Third Embodiment

Given below is the description of a third embodiment. In the third embodiment, the difference from the first embodiment is that the eyepiece 20 is moved in the Z direction. In the third embodiment, regarding identical constituent elements to the first embodiment, the explanation is not repeated.

Figure 11:
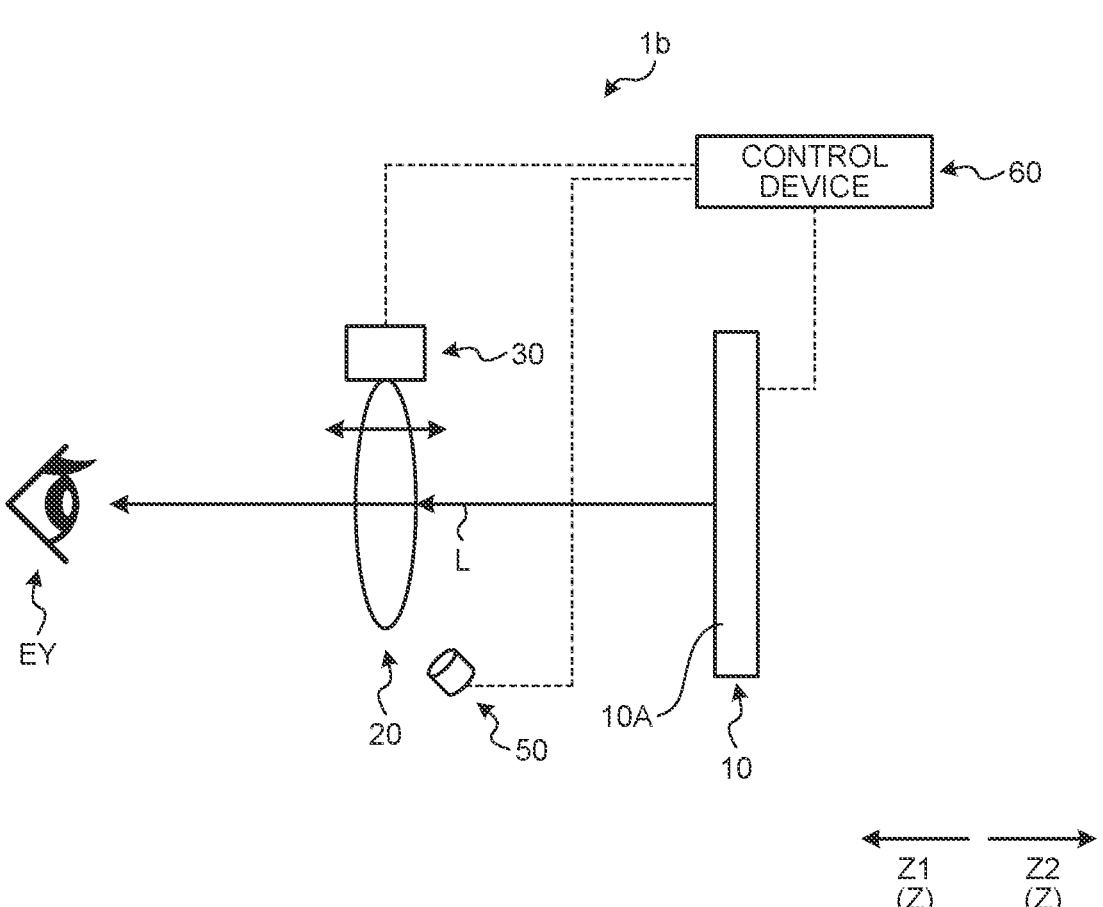
FIG. 11 is a schematic diagram of a display device according to a third embodiment.

FIG. 11 is a schematic diagram of a display device according to the third embodiment. As illustrated in FIG. 11, in a display device 1*b* according to the third embodiment, the driving unit 30 is attached to the eyepiece 20 for the purpose of moving the eyepiece 20 in the Z direction. In the third embodiment, the drive control unit 76 moves the eyepiece 20 in such a way that the eyepiece 20 repeatedly reciprocates (oscillates) in the Z direction by moving in the Z1 direction for a predetermined distance and then moving in the Z2 direction for a predetermined distance. Thus, the drive control unit 76 moves the eyepiece 20 along the Z direction at regular intervals. In other words, the drive control unit 76 causes reciprocation of the eyepiece 20 in the Z direction at regular intervals. In the third embodiment, the cycle of reciprocation in the Z direction is constant. However, the cycle is not limited to be constant, and can be variable.

The position detection unit 50 according to the third embodiment detects the position of the eyepiece 20 in the Z direction. The position information acquisition unit 74 according to the third embodiment causes the position detection unit 50 to detect the position of the eyepiece 20 in the Z direction, and acquires the detection result about the position of the eyepiece 20 in the Z direction.

In the third embodiment, based on the position of the eyepiece 20 in the Z direction (i.e., in the optical axis direction of the image light L), the timing setting unit 78 sets the emission timing. More particularly, the timing setting unit 78 sets the emission timing based on the depth information regarding a stereoscopic image and based on the position of the eyepiece 20 in the Z direction.

More specifically, the timing setting unit 78 acquires the depth information regarding each pixel P. That is, the timing setting unit 78 acquires, for each pixel P, the information about a position in the depth direction (the Z direction). Then, based on the depth information regarding each pixel P, the timing setting unit 78 sets the emission position representing the position of the eyepiece 20 at the time of causing the concerned P to start emitting the image light L. The timing setting unit 78 sets, as the emission position for the concerned pixel P, the position of the eyepiece 20 in the Z direction at the time when the actual angular aperture of the image light L emitted from the concerned pixel P matches with the angular aperture of the luminous flux in the case in which light is emitted onto the eyes EY from the position in the depth direction of that part of the stereoscopic image which is displayed due to the concerned pixel P (i.e., from the position of the virtual image formed by the concerned pixel P). Then, the timing setting unit 78 sets, as the emission timing for the concerned pixel P, the timing at which the eyepiece 20 reaches the position at which the distance between the eyepiece 20 and the emission position falls within a predetermined distance range. The timing setting unit 78 sets the emission position for each pixel P as well as sets the emission timing for each pixel P. Although the timing setting unit 78 sets the emission position as well as the emission timing for each pixel P, the emission position and the emission timing are not limited to be different for each pixel P. For example, for a group of pixels P constituting a single image (for example, a group of pixels P displaying the image of a house in FIG. 5), the emission position and the emission timing can be set to be identical.

In the third embodiment, from the position information acquisition unit 74, the timing setting unit 78 sequentially acquires the information about the position of the eyepiece 20 in the Z direction; and, when the position of the eyepiece 20 in the Z direction reaches within a predetermined distance from the emission position, determines that the emission timing has arrived. Herein, the predetermined distance can be set in an arbitrary manner. However, in order to reduce the convergence/accommodation contradiction, it is desirable that the predetermined distance is set in such a way that there is a decrease in the difference between the virtual image angular aperture and the angular aperture of the image light L.

In this way, the timing setting unit 78 sets the emission timing for each pixel P. Moreover, the timing setting unit 78 sets a timing arriving later than the emission timing as the emission discontinuation timing. When it is determined that the emission timing for a particular pixel P has arrived, the emission control unit 80 causes that pixel P to start emitting the image light L. The emission control unit 80 causes that pixel P to emit the image light L during the period of time from the emission timing to the emission discontinuation timing; and, upon arrival of the emission discontinuation timing, causes that pixel P to stop emitting the image light L.

In the explanation given above, from the position information acquisition unit 74, the timing setting unit 78 sequentially acquires the information about the position of the eyepiece 20 in the Z direction, and determines whether the eyepiece 20 has reached within a predetermined distance from the emission position. However, that is not the only possible case. For example, when the eyepiece 20 is being reciprocated in the Z direction at regular intervals, the timing-by-timing positions of the eyepiece 20 in the Z direction (i.e., the predicted positions) can be figured out without causing the position detection unit 50 to perform position detection. Thus, the timing setting unit 78 can acquire, from the timing information, the information about the positions of the eyepiece 20 in the Z direction. In that case, based on the information about the timing-by-timing predicted positions of the eyepiece 20 and based on the information about the emission position, the timing setting unit 78 can set, as the emission timing, the timing at which the eyepiece 20 reaches within a predetermined distance from the emission position; and, when the current timing coincides with the emission timing, can determine that the eyepiece 20 has reached the emission position and can cause the concerned pixel P to emit the light.

Flow of Processing

Figure 12:
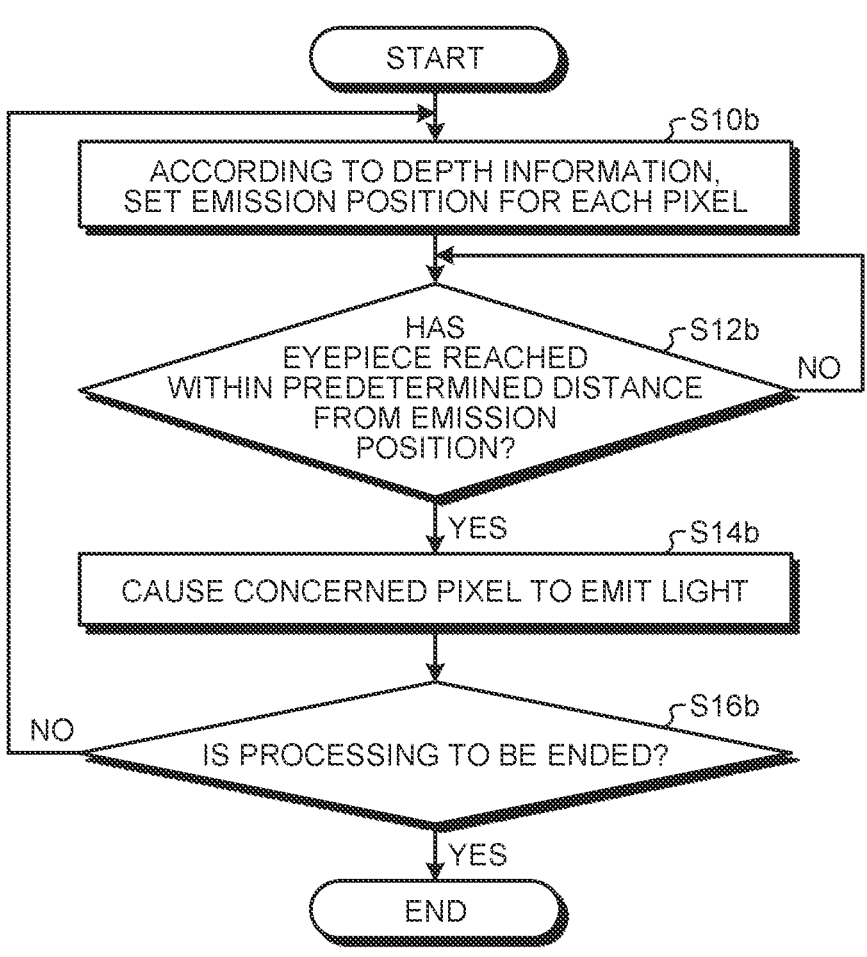
FIG. 12 is a flowchart for explaining a flow of processing performed by a control device according to the third embodiment.

Given below is the explanation of a flow of processing performed by the control device 60 according to the third embodiment. FIG. 12 is a flowchart for explaining a flow of processing performed by the control device according to the third embodiment. In the control device 60, the drive control unit 76 causes the eyepiece 20 to reciprocate in the Z direction at regular intervals. Moreover, in the control device 60, the timing setting unit 78 refers to the depth information regarding each pixel P and sets the emission position for each pixel P (Step S10*b*). Then, in the control device 60, the position information acquisition unit 74 sequentially acquires the position of the eyepiece 20 in the Z direction and determines, for each pixel P, whether the eyepiece 20 has reached within a predetermined distance from the corresponding emission position (Step S12*b*). If the eyepiece 20 has reached within a predetermined distance (Yes at Step S12*b*), that is, if there is a pixel P regarding which the eyepiece 20 is determined to have reached within a predetermined distance from the emission position; then the timing setting unit 78 determines that the emission timing for the concerned pixel P has arrived, and the emission control unit 80 causes that pixel P to emit the image light L based on the image data (Step S14*b*). Subsequently, upon arrival of the emission discontinuation timing, the emission control unit 80 causes that pixel P to stop emitting the image light L. After that, if the processing is not to be ended (No at Step S16*b*), then the system control returns to Step S10*b* and the processing are performed again. Meanwhile, if the eyepiece 20 has not yet reached within a predetermined distance from the emission position (No at Step S12*b*), that is, if there is no pixel P regarding which the eyepiece 20 is determined to have reached within a predetermined distance from the emission position; then the system control returns to Step S12*b* and no pixel P is allowed to emit the light until the eyepiece 20 reaches within the predetermined distance from the emission position. Meanwhile, at Step S16*b*, if the processing is to be ended (Yes at Step S16*b*), then it marks the end of the processing.

Effects

As explained above, the display device 1 according to the third embodiment provides stereoscopic images to the user U and includes the display unit 10, an optical element, the drive control unit 76, the timing setting unit 78, and the emission control unit 80. The display unit 10 includes a plurality of self-luminous pixels P, and provides stereoscopic images to the user U by ensuring that the image light L emitted from the pixels P reaches the user U. The optical element (in the example according to the third embodiment, the eyepiece 20) is disposed on the side of the user U with respect to the display unit 10 in the optical axis direction of the image light L. The drive control unit 76 moves the optical element along the optical axis direction of the image light L (in the third embodiment, along the Z direction) at regular intervals. Based on the position of the optical element in the optical axis direction (in the third embodiment, the Z direction), the timing setting unit 78 sets the emission timing for each pixel P in regard to the emission of the image light L. At an emission timing, the emission control unit 80 causes the corresponding pixel P to emit the image light L.

As is the case of the display device 1*b* according to the third embodiment, even when an optical element is moved, in an identical manner to the first embodiment, stereoscopic images can be provided in an appropriate manner to the user U and the angular aperture of the luminous flux of the image light L can be appropriately adjusted, thereby enabling achieving reduction in the convergence/accommodation contradiction. Moreover, the optical element is, for example, a lens made of resin or glass, and has a simpler configuration as compared to the display unit 10. Hence, when the optical element is moved, it becomes possible to lower the risk of malfunctioning.

Moreover, the timing setting unit 78 acquires the information about the emission position that represents the position of the optical element in the optical axis direction at which the angular aperture of the luminous flux of the image light L emitted from the concerned pixel P corresponds to the angular aperture of the luminous flux in the case in which the image light L is emitted toward the user U from the position in the depth direction in that part of the stereoscopic image which is displayed using the concerned pixel P (i.e., corresponds to the virtual image angular aperture). The timing setting unit 78 sets, as the emission timing for the concerned pixel P, the timing at which the optical element reaches within a predetermined distance range from the emission position. According to the third embodiment, it becomes possible to ensure that only those pixels P emit light for which the angular aperture of the luminous flux and the virtual image angular aperture are close, and that the pixels P for which the angular aperture of the luminous flux and the virtual image angular aperture are not close do not emit light. That enables achieving reduction in the convergence/accommodation contradiction.

The optical element includes the eyepiece 20, and the drive control unit 76 moves the eyepiece 20. According to the third embodiment, as a result of moving the eyepiece 20, it becomes possible to appropriately provide stereoscopic images to the user U, and to appropriately adjust the angular aperture of the luminous flux of the image light L. That enables achieving reduction in the convergence/accommodation contradiction.

Meanwhile, in the first embodiment, the display unit 10 is moved; and, in the third embodiment, an optical element is moved. Alternatively, it is possible to move the display unit 10 as well as an optical element.

Fourth Embodiment

Given below is the description of a fourth embodiment. In the fourth embodiment, the difference from the third embodiment is that the microlens array 20A is moved instead of moving the eyepiece 20. In the fourth embodiment, regarding identical constituent elements to the third embodiment, the explanation is not repeated.

Figure 13:
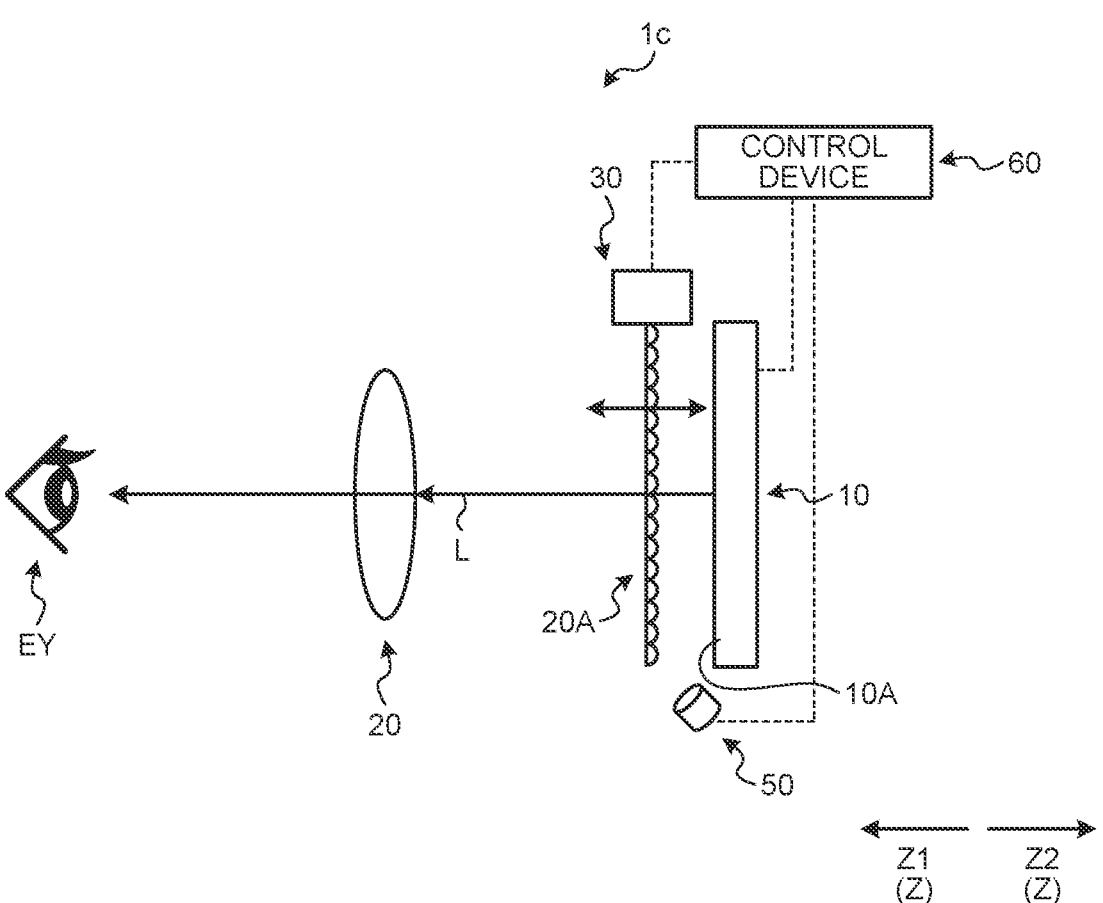
FIG. 13 is a schematic diagram of a display device according to a fourth embodiment.

FIG. 13 is a schematic diagram of a display device according to the fourth embodiment. As illustrated in FIG. 13, in a display device 1*c* according to the fourth embodiment, the microlens array 20A is disposed on the side of the eyes EY of the user U with respect to the display unit 10 in the optical axis direction of the image light L. The microlens array 20A is disposed in between the display unit 10 and the eyepiece 20 in the optical axis direction of the image light L. In the fourth embodiment, the driving unit 30 is attached to the microlens array 20A for the purpose of moving the microlens array 20A in the Z direction. In the fourth embodiment, apart from the fact that the microlens array 20A is moved instead of moving the eyepiece 20, the details are identical to the third embodiment. Hence, that explanation is not repeated. That is, in the fourth embodiment, it serves the purpose when the term "eyepiece 20" in the third embodiment is substituted with the term "microlens array 20A".

In this way, in the fourth embodiment, the optical element includes the microlens array 20A, and the drive control unit 76 moves the microlens array 20A. According to the fourth embodiment, as a result of moving the microlens array 20A, it becomes possible to appropriately provide stereoscopic images to the user U, and to appropriately adjust the angular aperture of the luminous flux of the image light L. That enables achieving reduction in the convergence/accommodation contradiction.

Figure 14:
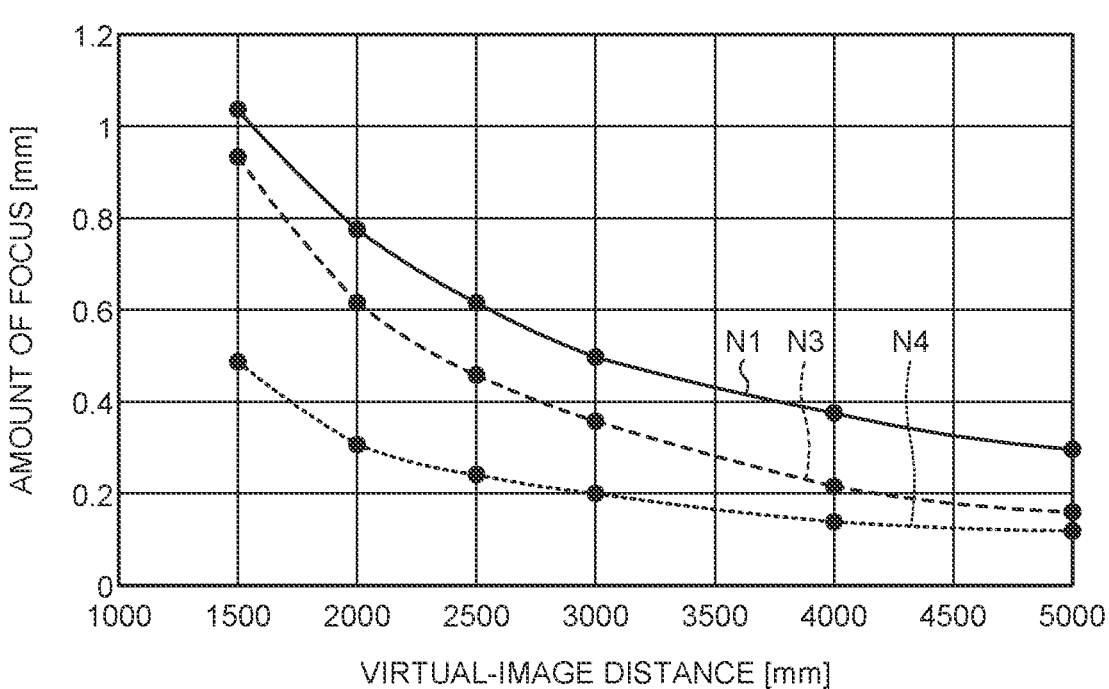
FIG. 14 is a graph for explaining the difference occurring in the amount of movement of a display unit when a microlens array is disposed.

FIG. 14 is a graph for explaining the difference occurring in the amount of movement of the display unit when a microlens array is disposed. The following explanation is given about the calculation result obtained when optical simulation was performed to calculate the difference in the required amount of movement of the display unit 10 in the case in which a microlens array was disposed and in the case in which a microlens array was not disposed. In the optical simulation, two types of microlens arrays were prepared, one having the radius of curvature of 2.5 mm and the other having the radius of curvature of 1 mm. Moreover, instead of moving the display, the microlens arrays were moved. Apart from that, the details of the optical simulation were identical to the optical simulation explained in the second embodiment. In FIG. 14, the line N1 represents the amount of focus at each virtual image distance in the case in which a microlens array is not disposed and the display is moved. A line N3 represents the amount of focus at each virtual image distance in the case in which the microlens array having the radius of curvature of 2.5 mm is disposed. A line N4 represents the amount of focus at each virtual image distance in the case in which the microlens array having the radius of curvature of 1 mm is disposed. As indicated by the lines N1, N3, and N4; it can be understood that, when a microlens array is disposed, the amount of focus becomes smaller and the amount of movement can be reduced.

Meanwhile, in the configuration in which the microlens array 20A is disposed as explained in the fourth embodiment, either the eyepiece 20 can be moved as explained in the third embodiment, or the eyepiece 20 as well as the microlens array 20A can be moved. According to the third embodiment, the eyepiece 20 is moved; and, according to the fourth embodiment, the microlens array 20A is moved. However, the optical element to be moved is not limited to the eyepiece 20 or the microlens array 20A. That is, any arbitrary optical element that is disposed on the side of the user U with respect to the display unit 10 can be moved.

Modification Example

Given below is the explanation of a modification example. In a display device 1d according to the modification example, the difference from the second embodiment is that the display is expanded using a concave mirror 20C, and the eyepiece 20 is not used. In the modification example, regarding identical constituent elements to the second embodiment, the explanation is not repeated.

Figure 15:
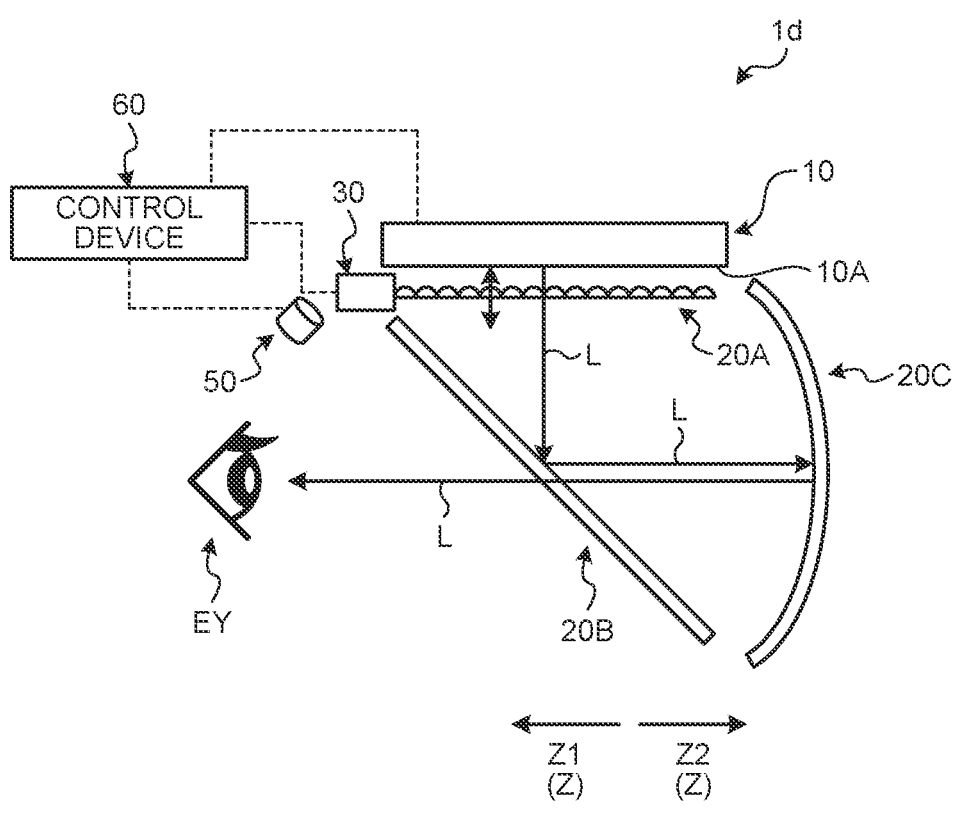
FIG. 15 is a schematic diagram of a display device according to a modification example.

FIG. 15 is a schematic diagram of the display device according to the modification example. As illustrated in FIG. 15, in the display device 1d according to the modification example, the eyepiece 20 is not disposed, and a half mirror 20B and the concave mirror 20C are disposed on the side of the eyes EY of the user U with respect to the display unit 10 in the optical axis direction of the image light L. The half mirror 20B and the concave mirror 20C can also be treated as optical elements. In the modification example, the image light L emitted from the display unit 10 gets reflected from the half mirror 20B and falls onto the concave mirror 20C. The image light L that falls onto the concave mirror 20C becomes almost a parallel light while having a slight spread angle at the concave mirror 20C, and then passes through the half mirror 20B and falls onto the eyes EY of the user U.

In the modification example, in an identical manner to the second embodiment, the microlens array 20A is moved. Even with the configuration as explained in the modification example, since the microlens array 20A is moved, in an identical manner to the second embodiment, it becomes possible to appropriately provide stereoscopic images to the user U and to appropriately adjust the aperture angle of the luminous flux of the image light L. That enables enabling achieving reduction in the convergence/accommodation contradiction.

Meanwhile, the modification example is applicable in other embodiments too. That is, in the configuration according to the modification example, either the display unit 10 can be moved, or any optical element other than the half mirror 20B can be moved. Moreover, the display device can have some other configuration other than the configurations according to the embodiments described above and the configuration according to the modification example explained with reference to FIG. 15.

Fifth Embodiment to Eighth Embodiment

Figure 16:
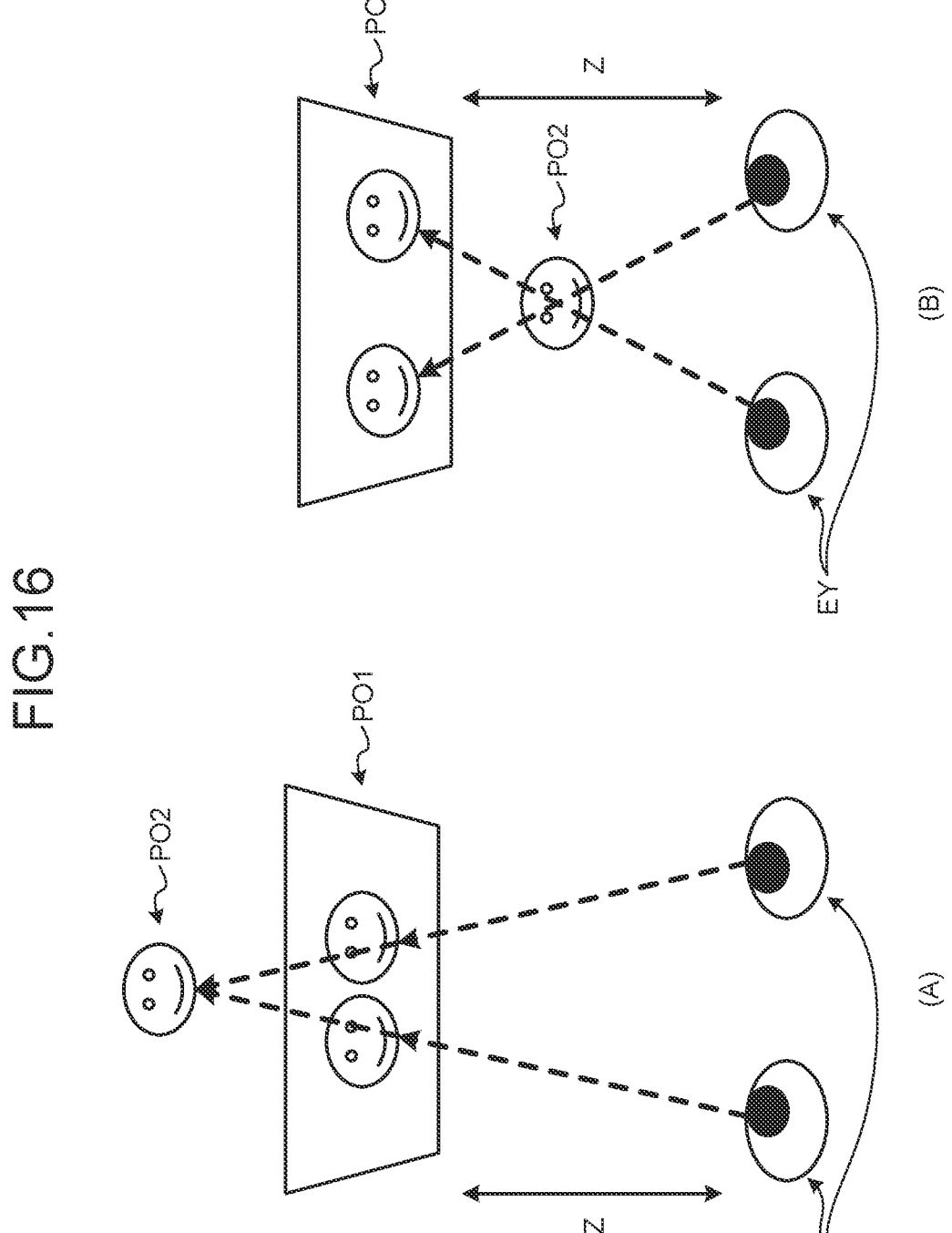
FIG. 16 is a schematic diagram for explaining the convergence/accommodation contradiction.

Given below is the description of embodiments from a fifth embodiment to an eighth embodiment.
Convergence/Accommodation Contradiction FIG. 16 is a schematic diagram for explaining the convergence/accommodation contradiction. A display device, which is configured to display stereoscopic images, causes the right and left eyes of the user to view images having different parallaxes, and displays a stereoscopic image by making use of the variation in the convergence. In the case of displaying a stereoscopic image, the display surface on which the image is actually displayed serves as the focal position of the eyes of the user, and the position at which the lines of sight of the right and left eyes intersect represents the convergence position. However, as illustrated in FIG. 16, in a stereoscopic image, there are times when the focal position PO1 and the convergence position PO2 become misaligned in the Z direction representing the depth direction of the stereoscopic image. If the focal position PO1 and the convergence position PO2 become misaligned, it results in what is called the convergence/accommodation contradiction that is responsible for the eye fatigue or for what is called 3D sickness. For that reason, there is a demand for ensuring that the convergence/accommodation contradiction is held down. Meanwhile, in (A) in FIG. 16, an example is illustrated in which, as compared to the convergence position PO2, the focal position PO1 is closer to eyes EY of the user. On the other hand, in (B) in FIG. 16, an example is illustrated in which, as compared to the focal position PO1, the convergence position PO2 is closer to the eyes EY of the user.

Fifth Embodiment

Figure 17:
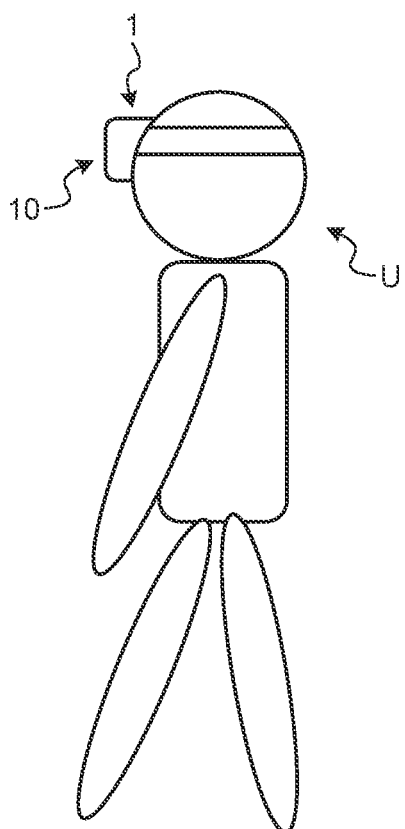
FIG. 17 is a schematic diagram of a display device according to a fifth embodiment.

Overall Configuration of Display Device
FIG. 17 is a schematic diagram of a display device according to the fifth embodiment. The display device 1 according to the fifth embodiment is configured to display stereoscopic images. As illustrated in FIG. 17, the display device 1 is what is called a head-mounted display (HMD) that is mounted in the head region of the user U. For example, of the display device 1, the display unit 10 is mounted to face toward the eyes EY of the user U. The display device 1 displays images in the display unit 10 and provides contents to the user U. Meanwhile, the configuration of the display device 1 illustrated in FIG. 17 is only exemplary. Alternatively, for example, the display device 1 can include a sound output unit (speaker) that is mounted on an ear of the user U.

As a result of mounting the display device 1 on the user U in the manner explained above, the position of the display device 1 with respect to the eyes EY of the user U gets fixed. The display device 1 is not limited to be an HMD mounted on the user U, and can alternatively be a display device fixed to an equipment. In that case too, it is desirable that the position of the display device 1 with respect to the eyes EY of the user U is fixed. For example, it is desirable that the position of the display device 1 is fixed with respect to the seat on which the user U is sitting.

Figure 18:
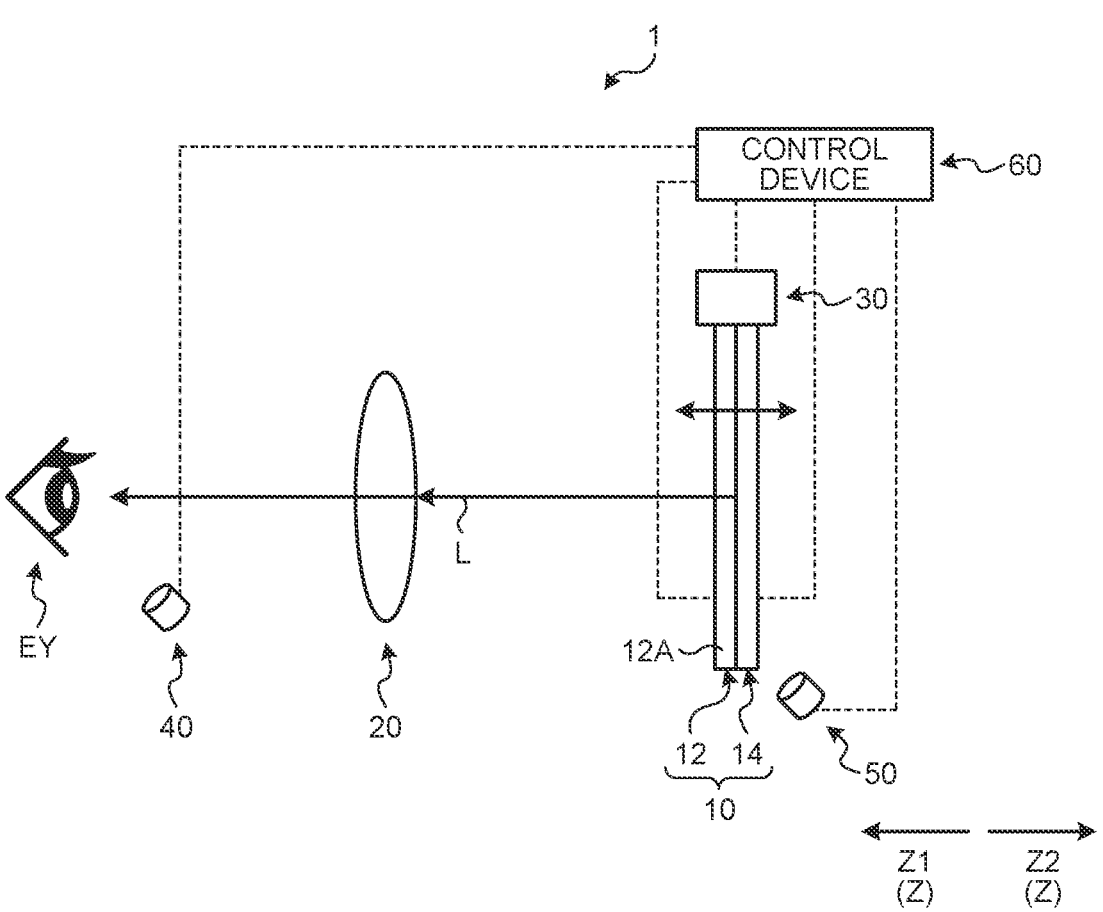
FIG. 18 is a schematic diagram illustrating the constituent elements of the display device according to the fifth embodiment.

FIG. 18 is a schematic diagram illustrating the constituent elements of the display device according to the fifth embodiment. As illustrated in FIG. 18, the display device 1 includes the display unit 10, the eyepiece 20, the driving unit 30, an eye gaze detection unit 40, the position detection unit 50, and the control device 60.

Display Unit

The display unit 10 is a device for displaying stereoscopic images. The display unit 10 includes a display panel 12 and a light source unit 14. The display panel 12 is a display including a plurality of pixels arranged in a matrix. In the example explained in the fifth embodiment, the display panel 12 is a liquid crystal panel that includes a plurality of pixel electrodes arranged in a matrix and includes a liquid crystal layer filled with liquid crystal elements. Herein, a display surface 12A represents the surface of the display panel 12 on which images are displayed. In the following explanation, the direction from the display surface 12A toward the eyes EY of the user U is referred to as the Z1 direction; and the direction opposite to the Z1 direction, that is, the direction from the eyes EY of the user U toward the display surface 12A is referred to as the Z2 direction. When the directions Z1 and Z2 need not be distinguished from each other, they are referred to as the Z direction. In FIG. 18, the display surface 12A represents that surface of the display panel 12 which is present on the side of the eyes EY of the user U. However, the display surface 12A is not limited to be the surface present on the side of the eyes EY of the user U. Alternatively, the display surface 12A can be present more on the inner side than the surface on the side of the eyes EY of the user U. Meanwhile, the display unit 10 receives, from the control device 60 (explained later), a driving signal meant for driving the display panel 12 and a control signal meant for controlling the emission timing regarding the light emitted from the light source unit 14.

The light source unit 14 is a light source that emits light onto the display panel 12. In the fifth embodiment, the light source unit 14 is what is called a backlight that is disposed on the surface on the opposite side of the display surface 12A of the display panel 12. The light source unit 14 is not limited to be disposed at the position mentioned above, and can be disposed at an arbitrary position. For example, the light source unit 14 can be a sidelight disposed beside the display panel 12. In the fifth embodiment, the light source unit 14 emits light uniformly onto all pixels of the display panel 12. In other words, the light source unit 14 does not perform the light emission control for each pixel on an individual basis. However, the light source unit 14 is not limited to emit light uniformly onto all pixels of the display panel 12. Alternatively, for example, the light source unit 14 can be of the local dimming type in which the emission of light can be adjusted for groups of a plurality of pixels. For example, the entire screen can be partitioned into a few sections and the light intensity can be adjusted on a section-by-section basis.

In this way, the display unit 10 includes the display panel 12 and the light source unit 14. The display unit 10 ensures that the image light L, which is emitted from the light source unit 14 onto the display panel 12, reaches the eyes EY of the user U, and thus provides stereoscopic images to the user U. In the example explained in the fifth embodiment, the light emitted from the light source unit 14 passes through the pixels of the display panel 12, and falls onto the eyes EY of the user U as the image light L. More specifically, in order to ensure that a left-eye image and a right-eye image are provided, for example, the pressure of the pixel electrodes is controlled and at the same time the light coming from the light source unit 14 is emitted toward the display panel 12. Of the light coming from the light source unit 14, the image light L that passes through the pixels corresponding to the left-side image falls onto the left eye of the user U, and the image light L that passes through the pixels corresponding to the right-side image falls onto the right eye of the user U. As a result, a stereoscopic image is provided to the user U.

Eyepiece

The eyepiece 20 is disposed on the side in the Z1 direction with reference to the display unit 10. The eyepiece 20 is an optical element that lets light (the image light) pass therethrough. Moreover, in the display device 1, the eyepiece 20 is the closest optical element (lens) to the eyes EY of the user U. The image light L coming from the display panel 12 passes through the eyepiece 20 and falls onto the eyes EY of the user U. Meanwhile, in the fifth embodiment, in the light path of the image light L from the eyepiece 20 (eyepiece) to the eyes EY of the user U, the optical axis direction can be treated as the Z direction. Moreover, in the fifth embodiment, the eyepiece 20 is not movable, and has a fixed position in the display device 1.

In the example illustrated in FIG. 18, only the eyepiece 20 is illustrated as the optical element present on the side in the Z1 direction with reference to the display unit 10. However, that is not the only possible case, and other optical elements other than the eyepiece 20 can also be disposed on that side.

Driving Unit

The driving unit 30 is a driving mechanism for the purpose of moving the display unit 10 in the Z direction, and can also be called an actuator. In the fifth embodiment, the driving unit 30 moves the entire display unit 10, which includes the display panel 12 and the light source unit 14, in the Z direction. However, that is not the only possible case. Alternatively, the driving unit 30 can be configured to move the display panel 12 in the Z direction. In the following explanation too, although the movement of the display unit 10 and the position of the display unit 10 is explained, the display panel 12 can be substituted for the entire display unit 10 unless specified otherwise. Meanwhile, from the control device 60 (explained later), the driving unit 30 acquires a signal meant for performing drive control.

Eye Gaze Detection Unit

The eye gaze detection unit 40 detects the direction of orientation of the eyes EY of the user U, that is, detects the eye gaze of the user U. The eye gaze detection unit 40 can be an arbitrary sensor enabling detection of the eye gaze of the user U. For example, the eye gaze detection unit 40 can be a camera that takes images of the eyes EY of the user U. The eye gaze detection unit 40 sends the eye gaze detection result to the control device 60.

Position Detection Unit

The position detection unit 50 is a sensor for detecting the position of the display unit 10 in the Z direction. As long as the position of the display unit 10 in the Z direction can be detected, the position detection unit 50 can be any type of sensor. Meanwhile, when only the display panel 12 moves in the Z direction instead of the entire display unit 10 moving in the Z direction, the position detection unit 50 can detect the position of the display panel 12 in the Z direction. The position information detection unit 50 sends the position detection result to the control device 60.

Control Device

Figure 19:
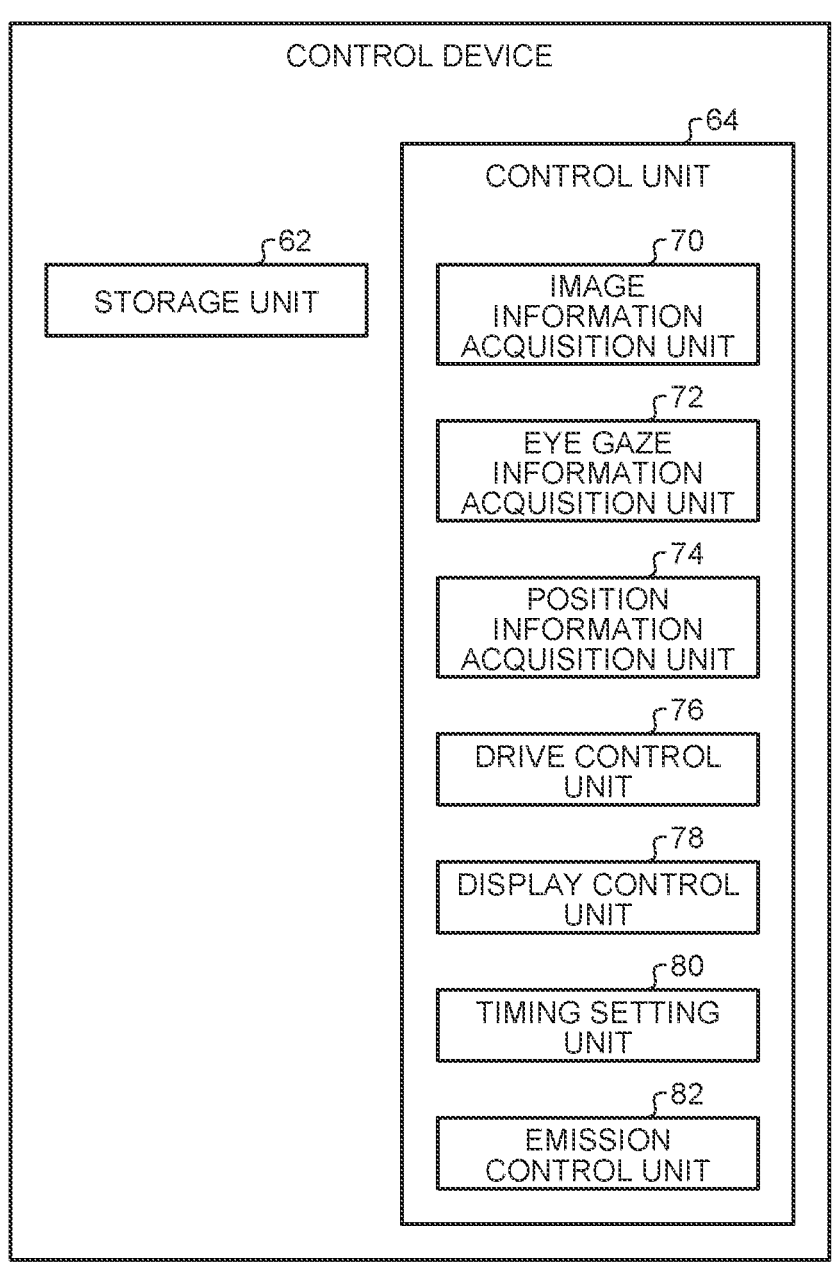
FIG. 19 is a schematic block diagram of a control device according to the fifth embodiment.

The control device 60 controls the constituent elements of the display device 1. FIG. 19 is a schematic block diagram of the control device according to the fifth embodiment. In the fifth embodiment, the control device 60 is a computer and includes the storage unit 62 and the control unit 64. The storage unit 62 is a memory used to store the computational details of the control unit 64 and to store a variety of information such as computer programs. For example, the storage unit 62 includes at least either a main storage device such as a random access memory (RAN) or a read only memory (ROM), or an external storage device such as a hard disk drive. The computer programs written for the control unit 64 and stored in the storage unit 62 can be alternatively stored in a recording medium that is readable by the control device 60.

The control unit 64 is an arithmetic device that includes an arithmetic circuit such as a central processing unit (CPU). The control unit 64 includes an image information acquisition unit 70, an eye gaze information acquisition unit 72, the position information acquisition unit 74, the drive control unit 76, a display control unit 78, the timing setting unit 80, and the emission control unit 82. The control unit 64 reads computer programs (software) from the storage unit 62 and executes them so as to implement the image information acquisition unit 70, the eye gaze information acquisition unit 72, the position information acquisition unit 74, the drive control unit 76, the display control unit 78, the timing setting unit 80, and the emission control unit 82 to perform their processing. Meanwhile, the control unit 64 either can perform those processing using a single CPU, or can include a plurality of CPUs and can perform the processing using those CPUs. Meanwhile, at least one of the image information acquisition unit 70, the eye gaze information acquisition unit 72, the position information acquisition unit 74, the drive control unit 76, the display control unit 78, the timing setting unit 80, and the emission control unit 82 can be implemented using a hardware circuit.

Image Information Acquisition Unit

The image information acquisition unit 70 acquires image data of each stereoscopic image that is displayed in the display unit 10. That is, the image information acquisition unit 70 acquires image data of a left-eye image and acquires image data of a right-eye image. Moreover, the image information acquisition unit 70 acquires depth information indicating the position of a stereoscopic image in the depth direction. The position of a stereoscopic image in the depth direction implies the position of a virtual image in the depth direction that is viewed by the user U when an image is displayed on the display surface 12A. The depth direction can also be said to be the direction orthogonal to the display surface 12A of the display panel 12. In the fifth embodiment, the Z direction represents the depth direction. Meanwhile, the depth information is associated to the image data. Moreover, in a stereoscopic image, regarding each image included in a single frame, the position in the depth direction is set. In other words, for each position on the display surface 12A, the position in the depth direction is set. Hence, it can be said that, regarding a stereoscopic image, the image information acquisition unit 70 acquires the depth information regarding each position on the display surface 12A. Meanwhile, in a stereoscopic image, the position in the depth direction is set for each pixel. However, alternatively, for a plurality of pixels constituting a single image, the position in the depth direction can be set to be identical. The image information acquisition unit 70 can acquire the image data and the depth information according to an arbitrary method, such as by reading the image data and the depth information stored in advance in the storage unit 62 or by receiving the image data and the depth information via a communication unit (not illustrated). Alternatively, the image information acquisition unit 70 can calculate the positions in the depth direction based on the image data, and thus acquire the depth information.

Eye Gaze Information Acquisition Unit

The eye gaze information acquisition unit 72 controls the eye gaze detection unit 40 and causes it to detect the eye gaze of the user U, and acquires the eye gaze detection result from the eye gaze detection unit 40. In the fifth embodiment, based on the eye gaze detection result, the eye gaze information acquisition unit 72 detects the gazing position in the stereoscopic image at which the user U is looking fixedly. The gazing position implies that position of the image, from among the stereoscopic image, on the display surface 12A at which the user U is looking fixedly. In other words, the gazing position implies that position in the entire display surface 12A at which the user U is looking fixedly. In the fifth embodiment, the eye gaze information acquisition unit 72 acquires the convergence position of the user U from the eye gaze detection result regarding the user U and detects, as the gazing position, the position on the display surface 12A of that image which corresponds to the virtual image at the position overlapping with the convergence position. That is, for example, when the convergence position of the user U overlaps with the virtual image of a vehicle in a stereoscopic image, the position of the image of a vehicle on the display surface 12A is treated as the gazing position. However, that is not the only possible method for detecting the gazing position. Alternatively, the gazing position can be detected according to an arbitrary method using the eye gaze detection result regarding the user U.

Position Information Acquisition Unit

The position information acquisition unit 74 controls the position detection unit 50 and causes it to detect the position of the display unit 10 in the Z direction, and acquires the detection result about the position of the display unit 10 in the Z direction. Meanwhile, in the case in which only the display panel 12 moves in the Z direction instead of the entire display unit 10 moving in the Z direction, the position information acquisition unit 74 can acquire the detection result about the position of the display panel 12 in the Z direction.

Drive Control Unit

The drive control unit 76 controls the driving unit 30 and causes it to the move the display unit 10 in the Z direction. The drive control unit 76 moves the display unit 10 in such a way that the display unit 10 repeatedly reciprocates (oscillates) by moving in the Z1 direction for a predetermined distance and then moving in the Z2 direction for a predetermined distance. Thus, the drive control unit 76 moves the display unit 10 along the Z direction at regular intervals. In other words, the drive control unit 76 causes reciprocation of the display unit 10 in the Z direction at regular intervals. In the fifth embodiment, the cycle of reciprocation in the Z direction (i.e., the period of time taken by the display unit 10 to return to the original position in the Z direction) is constant. However, the cycle is not limited to be constant, and can be variable. Meanwhile, the drive control unit 76 is not limitedly configured to move the entire display unit 10 in the Z direction, and can also be configured to move the display panel 12 in the Z direction.

Display Control Unit

The display control unit 78 drives the pixels of the display panel 12 based on the image data, and ensures that a stereoscopic image is displayed on the display panel 12. In the fifth embodiment, based on the image data, the display control unit 78 controls the applied voltage on each pixel electrode of the display panel 12 and aligns the liquid crystal elements. As a result, the light coming from the light source unit 14 passes through the liquid crystal layer and is emitted toward the eyes EY of the user U as the image light L to be used for stereoscopic images.

Timing Setting Unit and Emission Control Unit

The timing setting unit 80 sets the emission timing regarding the light emitted from the light source unit 14. The emission control unit 82 controls the light source unit 14 and causes it to emit light. The emission control unit 82 causes the light source unit 14 to emit light at the emission timing set by the timing setting unit 80. The timing setting unit 80 sets the emission timing based on the eye gaze detection result regarding the user U and based on the position of the display unit 10 in the Z direction (i.e., in the optical axis direction of the image light L). More particularly, the timing setting unit 80 sets the emission timing based on the eye gaze detection result regarding the user U, based on the depth information regarding the stereoscopic image, and based on the position of the display unit 10 in the Z direction. Meanwhile, in the case in which only the display panel 12 is moved in the Z direction instead of moving the entire display unit 10 in the Z direction, the timing setting unit 80 can set the emission timing based on the position of the display panel 12 in the Z direction. Regarding the setting performed by the timing setting unit 80, more specific explanation is given below.

Figure 20:
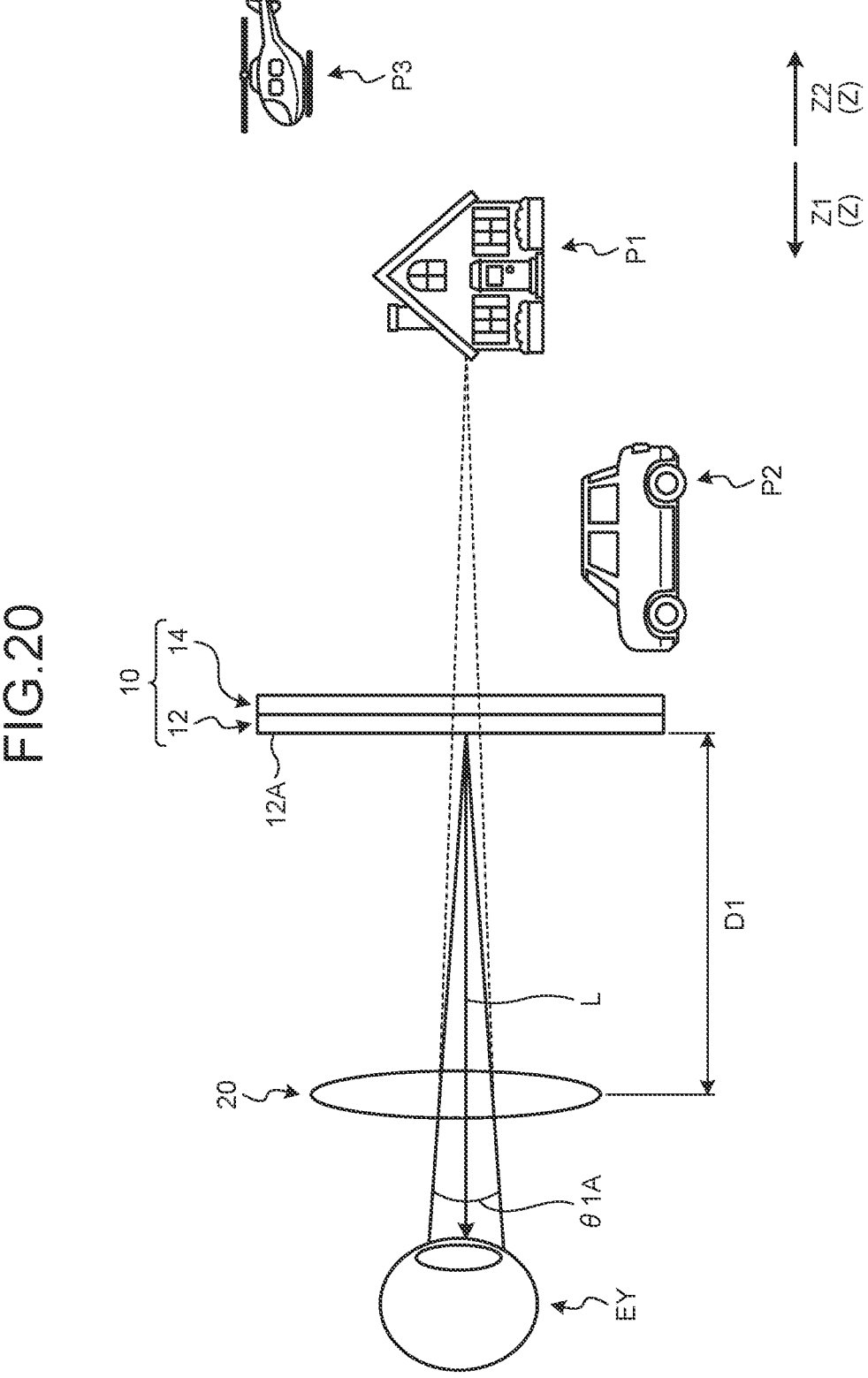
Figure 21:
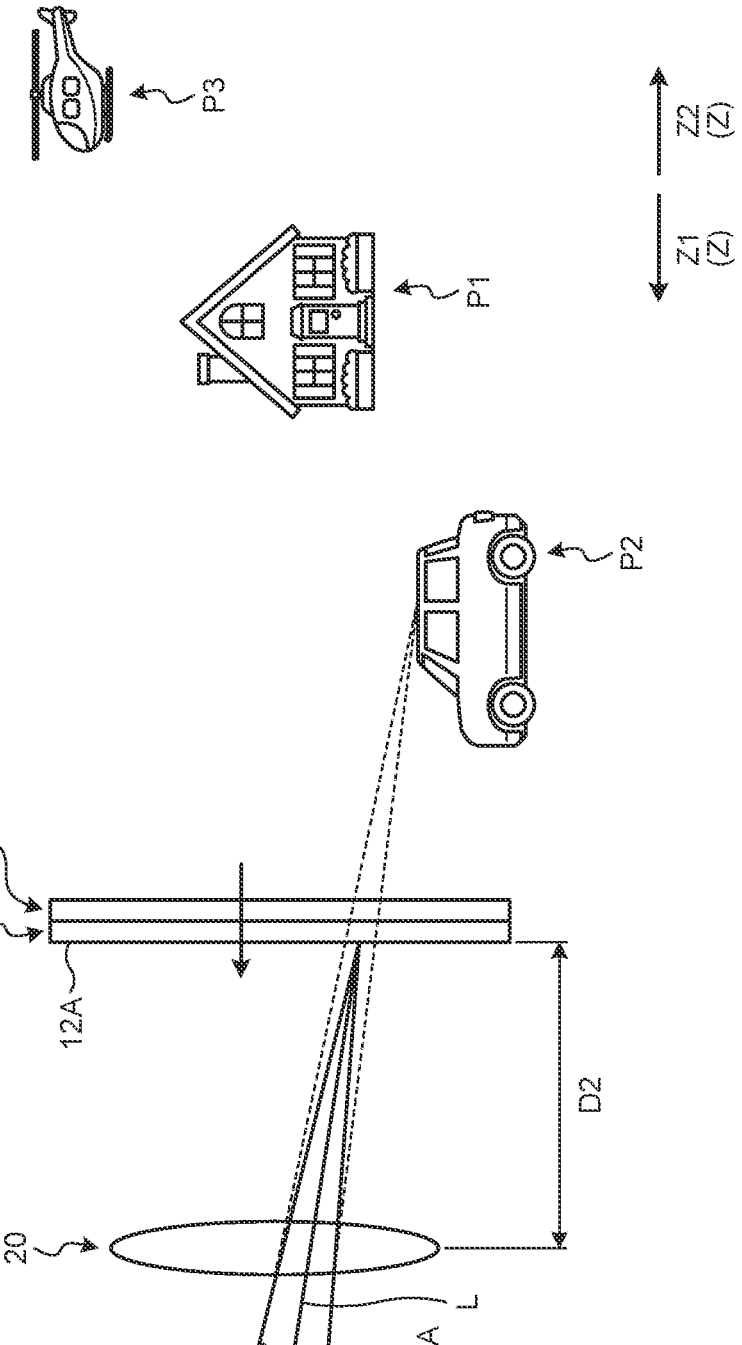
Figure 22:
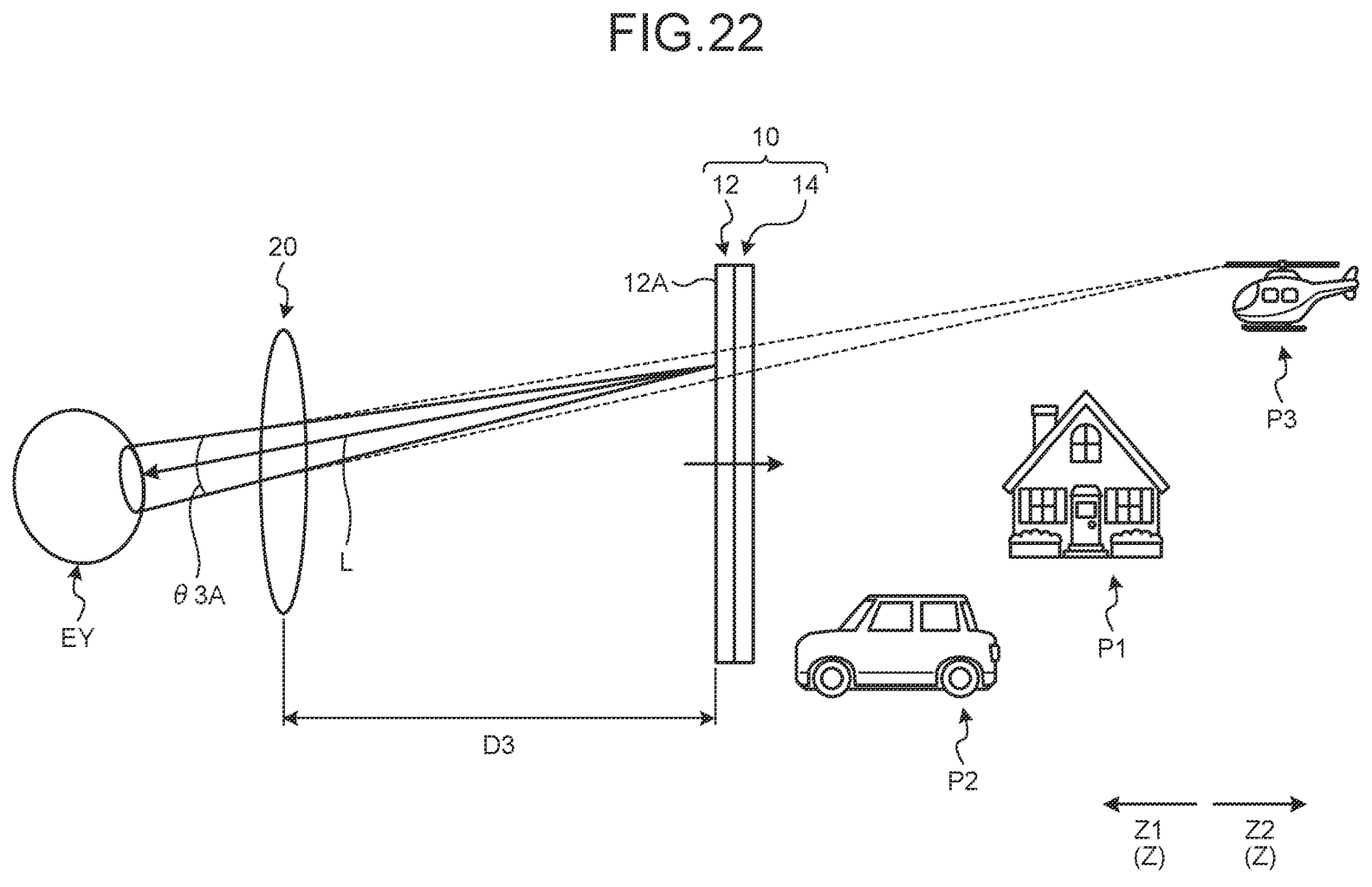

FIGS. 20 to 22 are schematic diagrams for explaining about setting the emission timing. For example, as illustrated in FIG. 20, the image light L that is emitted from the display unit 10 falls onto the eyes EY of the user U as a luminous flux having a predetermined angular aperture. In that case, in order to be in alignment with the angular aperture of the luminous flux, the user U involuntarily varies the thickness of the crystalline lenses of the eyeballs, and makes adjustment so that the retinas come in focus. The convergence/accommodation contradiction implies that the degree of convergence of the right and left eyes (the degree of cross-eye of the right and left eyes) does not match with the state in which the angular aperture of the luminous flux is in focus. In that regard, the display device 1 according to the fifth embodiment emits the image light L in such a way that there is a decrease in the difference between the virtual image angular aperture, which represents the angular aperture when it is assumed that light is emitted from a virtual image (convergence position) and falls onto the eyes EY (in the example illustrated in FIG. 20, the angle θ1A), and the angular aperture of the image light L at the time when the image light L is actually emitted from the display unit 10 and falls onto the eyes EY. Herein, the angular aperture of the image light L is decided according to the distance in the Z direction (the optical axis direction) from the display unit 10 (the display surface 12A) to the eyes EY. In the fifth embodiment, since the display unit 10 is moved in the Z direction at regular intervals, the timing setting unit 80 sets, as the emission timing, the timing at which the display unit 10 reaches the position at which there is a decrease in the difference between the virtual image angular aperture and the angular aperture of the image light L.

More specifically, the timing setting unit 80 acquires the depth information regarding the gazing position detected by the eye gaze information acquisition unit 72. That is, the timing setting unit 80 acquires the information about a position in the depth direction (the Z direction) of the gazing position. In other words, the timing setting unit 80 acquires the information about the position of the virtual image, which is being gazed by the user, in the Z direction. Then, based on the depth information regarding the gazing position, the timing setting unit 80 sets the emission position of the display unit 10 at the time when the light source unit 14 is made to start emitting light. The timing setting unit 80 sets, as the emission position, the position of the display unit 10 in the Z direction at the time when the angular aperture of the image light L matches with the angular aperture of the luminous flux attributed to the emission of light from a position in the depth direction of the gazing position (i.e., from the position of the virtual image being gazed by the user U) onto the eyes EY (i.e., matches with the virtual image angular aperture attributed to the gazing position). Then, the timing setting unit 80 sets, as the emission timing, the timing at which the display unit 10 reaches the position at which the distance between the display unit 10 and the emission position falls within a predetermined distance range. In the fifth embodiment, from the position information acquisition unit 74, the timing setting unit 80 sequentially acquires the information about the position of the display unit 10 in the Z direction; and, when the position of the display unit 10 in the Z direction reaches within a predetermined distance from the emission position, determines that the emission timing has arrived. Herein, the predetermined distance can be set in an arbitrary manner. However, in order to reduce the convergence/accommodation contradiction, it is desirable that the predetermined distance is set in such a way that there is a decrease in the difference between the virtual image angular aperture attributed to the gazing position and the angular aperture of the image light L. Moreover, as a position that is in the depth direction of the gazing position and that is to be used in setting the emission position, the timing setting unit 80 can use a value obtained by quantizing the depth direction. That is, for example, the depth direction is segmented into a plurality of numerical ranges and, for each numerical range, a predetermined value within that numerical range is set as the reference position. Then, the timing setting unit 80 extracts the numerical range that includes the position in the depth direction of the gazing position as acquired by the eye gaze information acquisition unit 72, treats the reference position of that numerical range as the position that is in the depth direction of the gazing position and that is to be used in setting the emission position.

In this way, the timing setting unit 80 sets the emission timing. Moreover, the timing setting unit 80 sets a timing arriving later than the emission timing as the emission discontinuation timing. When the timing setting unit 80 determines that the emission timing has arrived, the emission control unit 82 causes the light source unit 14 to start emitting light. The emission control unit 82 causes the light source unit 14 to emit light during the period of time from the emission timing to the emission discontinuation timing; and, upon arrival of the emission discontinuation timing, causes the light source unit 14 to stop emitting the light. Meanwhile, the emission discontinuation timing can be set in an arbitrary manner. For example, either the timing arriving after a predetermined period of time since the emission timing can be set as the emission discontinuation timing; or, immediately after the emission timing, the timing at which the distance between the display unit 10 and the emission position goes out of the predetermined distance range can be set as the emission discontinuation timing.

In this way, in the display device 1, the light source unit 14 is made to emit light upon arrival of the emission timing and is made to stop emitting the light upon arrival of the emission discontinuation timing. Thus, during the period of time from the emission timing to the emission discontinuation timing, the image light L falls onto the eyes EY of the user U. As a result, the angular aperture of the luminous flux of the image light L falling on the eyes EY gets closer to the virtual image angular aperture attributed to the gazing position (i.e., the virtual image angular aperture attributed to the virtual image being gazed by the user U), thereby enabling achieving reduction in the convergence/accommodation contradiction. Meanwhile, since the display unit 10 reciprocates in the Z direction, it repeatedly switches between the state in which the distance to the emission position is within a predetermined distance range and the state in which the distance to the emission position goes out of the predetermined distance range. Every time the distance between the display unit 10 and the emission position falls within the predetermined distance range, that is, at every arrival of the emission timing, the control device 60 causes the light source unit 14 to emit the light. Hence, the user U happens to view the stereoscopic images in the form of a video. Moreover, since the display unit 10 reciprocates in the Z direction, during a single cycle of reciprocation, the distance to the emission position becomes equal to the predetermined distance at two timings. For that reason, it is desirable that the oscillation frequency of the reciprocation of the display unit 10 is set to be equal to or greater than a half times of the framerate of the stereoscopic image. Herein, the oscillation frequency (cycle) of the reciprocation of the display unit 10 can be set in an arbitrary manner.

The abovementioned example about setting the emission timing is explained below with reference to FIGS. 20 to 22. The following explanation is given about an example in which an image of a house, an image of a vehicle, and an image of a helicopter are displayed as stereoscopic images, and the position in the depth direction (the Z direction) becomes more distant from the eyes EY of the user U in the order of the image of a vehicle, the image of a house, and the image of a helicopter. That is, the virtual image P2 of the image of a vehicle is positioned more on the side in the Z1 direction than the virtual image P1 of the image of a house, and the virtual image P3 of the image of a helicopter is positioned more on the side in the Z2 direction than the virtual image P1 of the image of a house.

In FIG. 20 is illustrated an example in which the user U is looking fixedly at the virtual image P1 of the image of a house. In the example illustrated in FIG. 20, the angle 01A represents the angular aperture of the luminous flux when light is emitted from the virtual image P1 (i.e., from a position in the depth direction of the gazing position) onto the eyes EY (i.e., the angle θ1A represents the virtual image angular aperture attributed to the gazing position). Moreover, it is assumed that, at the position of the display unit 10 at which the distance between the display unit 10 and the eyepiece 20 in the Z direction is equal to the distance D1, the angular aperture of the luminous flux of the image light L becomes equal to the angle θ1A. In that case, the position at which the distance to the eyepiece 20 in the Z direction becomes equal to the distance D1 represents the emission position. Then, the timing setting unit 80 sets, as the emission timing, the timing at which the display unit 10 arrives to the position at which the distance to the emission position falls within a predetermined distance range. Upon arrival of the emission timing, the emission control unit 82 causes the light source unit 14 to emit light. As a result, the virtual image angular aperture attributed to the virtual image P1 of the image of a house gets closer to the angular aperture of the image light L that actually falls onto the eyes EY of the user U (i.e., the image light L being gazed by the user U), thereby enabling achieving reduction in the convergence/accommodation contradiction. Meanwhile, since the image light L gets refracted from the eyepiece 20 before falling on the eyes EY, the angular aperture of the luminous flux of the image light L implies the angular aperture of the luminous flux of the image light L that has already passed through the eyepiece 20. Meanwhile, in the fifth embodiment, since the light is emitted onto the entire display panel 12, the virtual image P2 of the image of a vehicle and the virtual image P3 of the image of a helicopter also get viewed by the user U. In that case, the virtual image angular apertures with respect to the virtual images P2 and P3 do not match with the angular aperture of the image light L that actually falls onto the eyes EY of the user U. However, the virtual images P2 and P3 are out of range of the region being gazed by the user U, and the virtual image angular aperture of the virtual image P1, which is within the range of the region being gazed by the user, matches with the angular aperture of the image light L that actually falls onto the eyes EY of the user U. That enables achieving reduction in the burden on the user U.

In FIG. 21 is illustrated an example in which the user U is looking fixedly at the virtual image P2 of the image of a vehicle. In the example illustrated in FIG. 21, the angle 02A represents the angular aperture of the luminous flux when light is emitted from the virtual image P2 (i.e., from a position in the depth direction of the gazing position) onto the eyes EY (i.e., the angle θ2A represents the virtual image angular aperture attributed to the gazing position). Moreover, it is assumed that, at the position of the display unit 10 at which the distance between the display unit 10 and the eyepiece 20 in the Z direction is equal to the distance D2, the angular aperture of the luminous flux of the image light L becomes equal to the angle θ2A. Meanwhile, since the virtual image P2 is viewable more on the side in the Z1 direction than the virtual image P1, the angle θ2A is greater than the angle θ1A illustrated in FIG. 20 and the distance D2 is shorter than the distance D1 illustrated in FIG. 20. In that case, the position at which the distance to the eyepiece 20 in the Z direction becomes equal to the distance D2 represents the emission position. Then, the timing setting unit 80 sets, as the emission timing, the timing at which the display unit 10 arrives to the position at which the distance to the emission position falls within a predetermined distance range. Upon arrival of the emission timing, the emission control unit 82 causes the light source unit 14 to emit light. As a result, the virtual image angular aperture attributed to the virtual image P2 of the image of a vehicle gets closer to the angular aperture of the image light L that actually falls onto the eyes EY of the user U, thereby enabling achieving reduction in the convergence/accommodation contradiction.

In FIG. 22 is illustrated an example in which the user U is looking fixedly at the virtual image P3 of the image of a helicopter. In the example illustrated in FIG. 22, the angle θ3A represents the angular aperture of the luminous flux when light is emitted from the virtual image P3 (i.e., from a position in the depth direction of the gazing position) onto the eyes EY (i.e., the angle θ3A represents the virtual image angular aperture attributed to the gazing position). Moreover, it is assumed that, at the position of the display unit 10 at which the distance between the display unit 10 and the eyepiece 20 in the Z direction is equal to the distance D3, the angular aperture of the luminous flux of the image light L becomes equal to the angle θ3A. Meanwhile, since the virtual image P3 is viewable more on the side in the Z2 direction than the virtual image P1, the angle θ3A is smaller than the angle θ1A illustrated in FIG. 20 and the distance D3 is longer than the distance D1 illustrated in FIG. 20. In that case, the position at which the distance to the eyepiece 20 in the Z direction becomes equal to the distance D3 represents the emission position. Then, the timing setting unit 80 sets, as the emission timing, the timing at which the display unit 10 arrives to the position at which the distance to the emission position falls within a predetermined distance range. Upon arrival of the emission timing, the emission control unit 82 causes the light source unit 14 to emit light. As a result, the virtual image angular aperture attributed to the virtual image P3 of the image of the helicopter gets closer to the angular aperture of the image light L that actually falls onto the eyes EY of the user U, thereby enabling achieving reduction in the convergence/accommodation contradiction.

In the explanation given above, from the detection result acquired by the position detection unit 50, the timing setting unit 80 sequentially acquires the information about the position of the display unit 10 in the Z direction, and determines whether the display unit 10 has reached within a predetermined distance from the emission position. However, that is not the only possible case. For example, when the display unit 10 is being reciprocated in the Z direction at regular intervals, the timing-by-timing positions of the display unit 10 in the Z direction (i.e., the predicted positions) can be figured out without causing the position detection unit 50 to perform position detection. Thus, the timing setting unit 80 can acquire, from the timing information, the information about the positions of the display unit 10 in the Z direction. In that case, based on the information about the timing-by-timing predicted positions of the display unit 10 and based on the information about the emission position, the timing setting unit 80 can set, as the emission timing, the timing at which the display unit 10 reaches within a predetermined distance from the emission position; and, when the current timing coincides with the emission timing, can determine that the display unit 10 has reached the emission position and can cause the light source unit 14 to emit the image light L.

Flow of Processing

Figure 23:
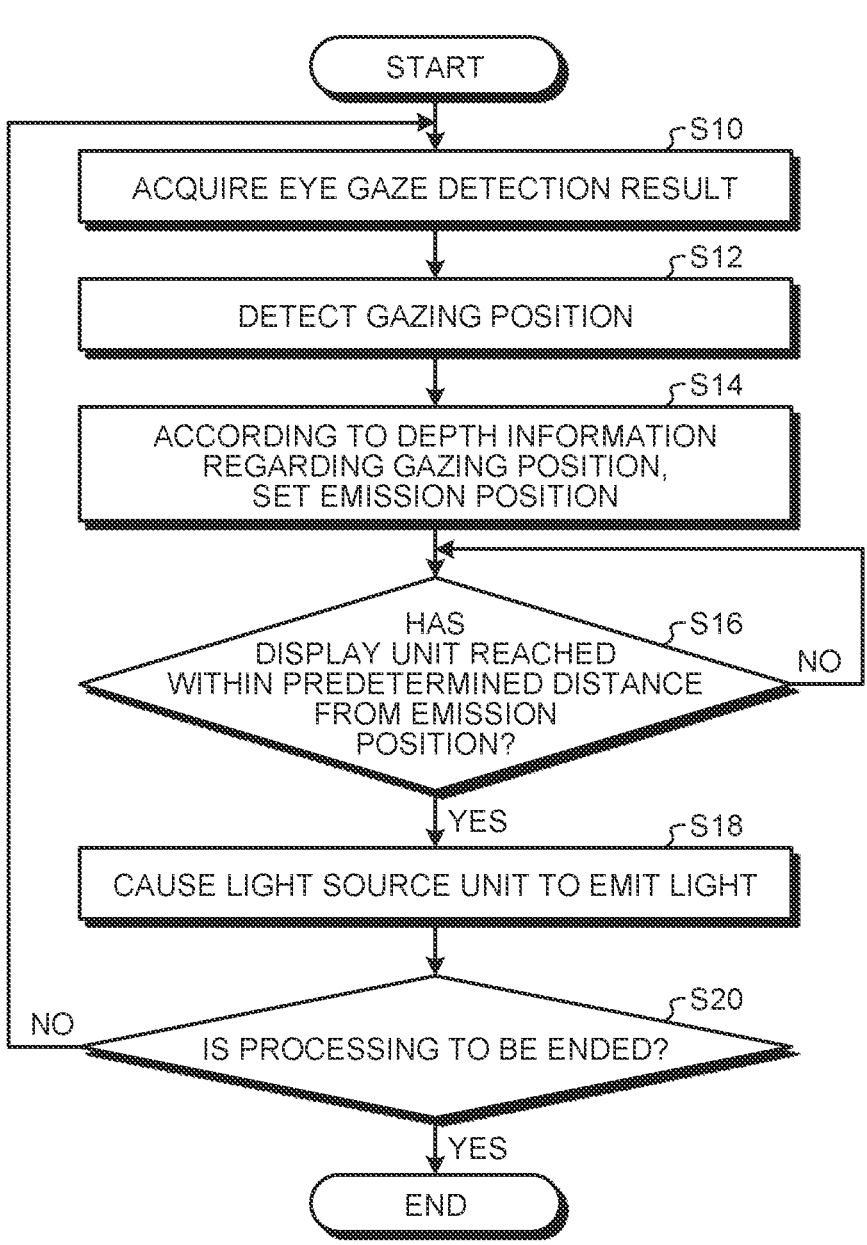
FIG. 23 is a flowchart for explaining a flow of processing performed by the control device according to the fifth embodiment.

Given below is the explanation of a flow of processing performed by the control device 60. FIG. 23 is a flowchart for explaining a flow of processing performed by the control device according to the fifth embodiment. In the control device 60, the display control unit 78 drives the pixels of the display panel 12 based on the image data, and at the same time the drive control unit 76 causes the display unit 10 to reciprocate in the Z direction at regular intervals. Moreover, in the control device 60, while the pixels are driven and the display unit 10 is made to reciprocate, the eye gaze information acquisition unit 72 acquires the eye gaze detection result regarding the user U (Step S10) and detects the gazing position based on the eye gaze detection result (Step S12). Then, in the control device 60, the timing setting unit 80 sets the emission position according to the depth information regarding the gazing position (Step S14). Subsequently, in the control device 60, the position information acquisition unit 74 sequentially acquires the position of the display unit 10 in the Z direction and determines whether the display unit 10 has reached within a predetermined distance from the emission position (Step S16). If the display unit 10 has reached within a predetermined distance from the emission position (Yes at Step S16), then the timing setting unit 80 determines that the emission timing has arrived, and the emission control unit 82 causes the light source unit 14 to emit light (Step S18). Subsequently, upon arrival of the emission discontinuation timing, the emission control unit 82 causes the light source unit 14 to stop emitting the light. After that, if the processing is not to be ended (No at Step S20), then the system control returns to Step S10 and the processing are performed again. Meanwhile, if the display unit 10 has not yet reached within a predetermined distance from the emission position (No at Step S16), then the system control returns to Step S16 and the light source unit 14 is not allowed to emit the light until the display unit 10 reaches within the predetermined distance from the emission position. However, even if the display unit 10 has not yet reached within a predetermined distance from the emission position (No at Step S16), the system control can still return to Step S10. When the processing is to be ended (Yes at Step S20), it marks the end of the processing.

Effects

As explained above, the display device 1 according to the fifth embodiment provides stereoscopic images to the user U and includes the display unit 10, the eye gaze information acquisition unit 72, the drive control unit 76, the timing setting unit 80, and the emission control unit 82. The display unit 10 includes the display panel 12 having a plurality of pixels, and includes the light source unit 14 that emits light onto the display panel 12. The display unit 10 ensures that the image light L, which represents the light emitted from the light source unit 14 onto the display panel 12, reaches the user U, and thus provides a stereoscopic image to the user U. The eye gaze information acquisition unit 72 acquires the eye gaze detection result regarding the user U. The drive control unit 76 moves either the entire display unit 10 or only the display panel 12 along the optical axis direction of the image light L (in the fifth embodiment, along the Z direction) at regular intervals. Based on the eye gaze detection result regarding the user U and based on the position of the entire display unit 10 or the display panel 12 in the optical axis direction (in the fifth embodiment, the Z direction), the timing setting unit 80 sets the emission timing regarding the emission of light from the light source unit 14. Upon arrival of the emission timing, the emission control unit 82 causes the light source unit 14 to emit light.

In the case of displaying a stereoscopic image, it is required that the stereoscopic image is provided to the user in an appropriate manner. In that regard, in the fifth embodiment, the display unit 10 is moved in the optical axis direction and, based on the viewpoint of the user U and based on the position of the display unit 10 in the optical axis direction, the emission timing regarding the light is set. Thus, according to the fifth embodiment, it can be ensured that the image light L reaches the user U at an appropriate timing based on the viewpoint of the user U and based on the position of the display unit 10 in the optical axis direction, thereby making it possible to provide a stereoscopic image to the user U in an appropriate manner. Moreover, as explained above, at the time of displaying a stereoscopic image, there are times when the convergence/accommodation contradiction occurs. In that regard, in the fifth embodiment, the display unit 10 is moved in the optical axis direction and at the same time the emission timing regarding the light is set based on the viewpoint of the user U and the position of the display unit 10 in the optical axis direction. Hence, the angular aperture of the luminous flux of the image light L can be appropriately adjusted and the convergence/accommodation contradiction can be reduced. More particularly, in the fifth embodiment, it is not every time that the display unit 10 is moved to a position at which the angular aperture of the luminous flux of the image light L is appropriate. Instead, the display unit 10 is moved at regular intervals, and the emission of light from the light source unit 14 is controlled at the timing at which the angular aperture of the luminous flux of the image light L becomes appropriate. As a result of controlling the emission of light in this manner, it becomes possible to hold down a delay in the control, and to appropriately adjust the angular aperture of the luminous flux of the image light L.

Moreover, the timing setting unit 80 sets the emission timing based on the depth information that indicates the position of a stereoscopic image in the depth direction (in the fifth embodiment, the Z direction). According to the fifth embodiment, since the emission timing is set by taking into account the depth information too, the angular aperture of the luminous flux of the image light L can be appropriately adjusted according to the stereoscopic image to be displayed. That enables achieving reduction in the convergence/accommodation contradiction.

Moreover, based on the eye gaze detection result, the eye gaze information acquisition unit 72 detects the gazing position in the stereoscopic image at which the user U is looking fixedly. Then, based on the depth information regarding the gazing position, the timing setting unit 80 acquires the information about the emission position that is such a position of either the entire display unit 10 or the display panel 12 in the optical axis direction at which the angular aperture of the luminous flux of the image light L, when the light source unit 14 is made to emit light, corresponds to the angular aperture of the luminous flux when the image light L is emitted from a position in the depth direction of the gazing position toward the user U (i.e., corresponds to the virtual image angular aperture attributed to the gazing position). Moreover, the timing setting unit 80 sets, as the emission timing, the timing at which either the entire display unit 10 or the display panel 12 falls within a predetermined distance range from the emission position. According to the fifth embodiment, the angular aperture of the luminous flux of the image light L can be brought closer to the virtual image angular aperture attributed to the virtual image being gazed by the user U. That enables achieving reduction in the convergence/accommodation contradiction.

Meanwhile, in the display device 1, an eyepiece is disposed on the side of the user U with respect to the display unit 10 in the optical axis direction. As a result of disposing the eyepiece in the display device 1, stereoscopic images can be provided to the user U in an appropriate manner.

Moreover, the display device 1 is a head-mounted display, because of which stereoscopic images can be provided in an appropriate manner.

Sixth Embodiment

Given below is the description of a sixth embodiment. In the sixth embodiment, the difference from the fifth embodiment is that a microlens array is included. In the sixth embodiment, regarding identical constituent elements to the first embodiment, the explanation is not repeated.

Figure 24:
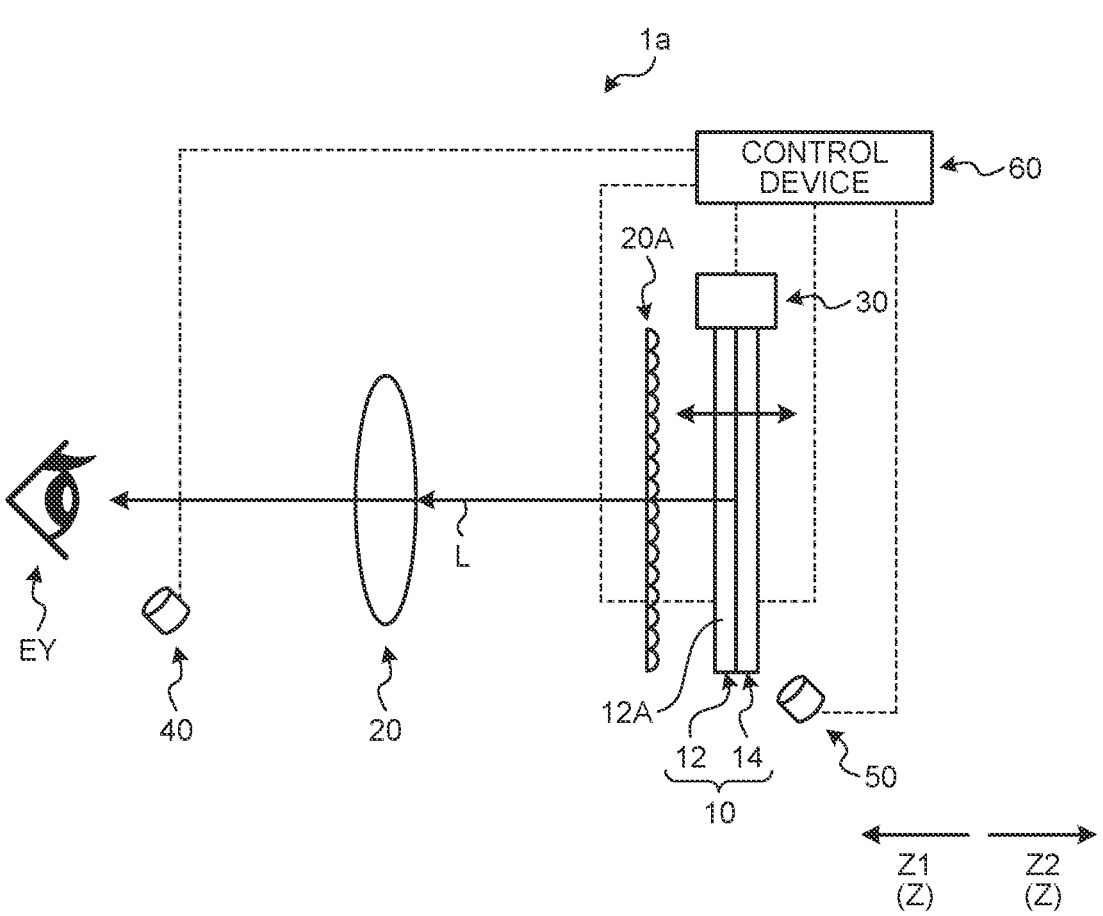
FIG. 24 is a schematic diagram of a display device according to a sixth embodiment.

FIG. 24 is a schematic diagram of a display device according to the sixth embodiment. As illustrated in FIG. 24, in the display device 1a according to the sixth embodiment, the microlens array 20A is disposed on the side of the eyes EY of the user U with respect to the display unit 10 in the optical axis direction of the image light L. The microlens array 20A is disposed in between the display unit 10 and the eyepiece 20 in the optical axis direction of the image light L. The microlens array 20A is an optical element in which a plurality of lenses is arranged in a matrix along a plane parallel to the display surface 12A. In the sixth embodiment, the pitch of each lens of the microlens array 20A, that is, the distance between the centers of neighboring lenses is about the same as, for example, the pitch of the pixels of the display panel 12 (i.e., the distance between the centers of neighboring pixel electrodes). In the microlens array 20A, the lenses are disposed opposite to the pixels of the display panel 12.

In the sixth embodiment, the image light L emitted from the display unit 10 reaches the eyes EY of the user U through the microlens array 20A and the eyepiece 20. The amount of movement of the display unit 10 in the Z direction, that is, the distance between the farthest position in the Z1 direction and the farthest position in the Z2 direction during one reciprocation cycle needs to be set to such a length that the angular aperture of the luminous flux of the image light L can follow the virtual image angular aperture attributed to a virtual image. In contrast, when the microlens array 20A is disposed, it causes widening of the angular aperture of the luminous flux of the image light L, and hence there is an increase the degree of change in the angular aperture of the luminous flux of the image light L at the time when the display unit 10 moves for a unit distance (i.e., there is an increase in the sensitivity to the degree of change in the aperture angle). Thus, according to the sixth embodiment, it becomes possible to reduce the amount of movement of the display unit 10 in the Z direction, and hence to reduce the burden on the driving unit 30 and the display unit 10 accompanying the movement of the display unit 10.

In this way, in the display device 1a according to the sixth embodiment, a microlens array is disposed on the side of the user U with respect to the display unit 10 in the optical axis direction. As a result of disposing the microlens array in the display device 1a, it becomes possible to reduce the amount of movement of the display unit 10 and at the same time reduce the convergence/accommodation contradiction.

Figure 25:
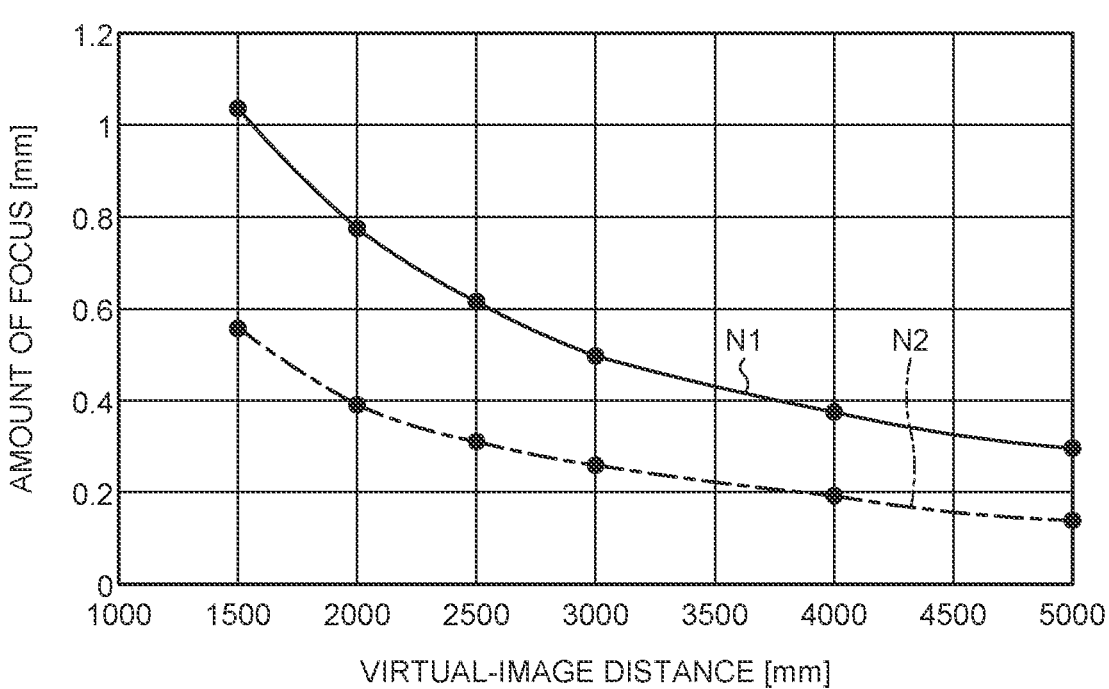
FIG. 25 is a graph for explaining the difference occurring in the amount of movement of a display unit when a microlens array is disposed.

FIG. 25 is a graph for explaining the difference occurring in the amount of movement of the display unit when a microlens array is disposed. The following explanation is given about the calculation result obtained when optical simulation was performed to calculate the difference in the required amount of movement of the display unit 10 in the case in which a microlens array was disposed and in the case in which a microlens array was not disposed. In the optical simulation, a 3.5-inch display was used, the eyepiece had the focal length of 40 mm, and the lenses in the microlens array had the focal length of 4.8 mm and had the radius of curvature of 2.5 mm. In the actual lens optical system of an HMD, there is a relatively larger field curvature due to a general restriction on the number of eyepieces. However, the size of the field curvature differs according to the lens design. Hence, in this simulation, in order to check the variation only in the focus amount, the calculation was performed using ideal lenses having no aberration. The luminous flux of the image light coming from a display passes through the microlens array and substantially becomes a parallel light in the eyepiece, before falling on the eye-point. Then, the luminous flux gets folded at the eye-point, and converges on the object point in a virtual image. In the present simulation, based on a virtual image distance of 100 m (equivalent to infinity) that is set as the reference, the virtual image distance was varied from 5000 mm to 1500 mm, and the amount of movement of the display was calculated as the amount of focus. In FIG. 25, the line N1 represents the amount of focus at each virtual image distance in the case in which a microlens array is not disposed, and the line N2 represents the amount of focus at each virtual image distance in the case in which a microlens array is disposed. As indicated by the lines N1 and N2; it can be understood that, when a microlens array is disposed, the amount of focus becomes smaller and the amount of movement of the display can be reduced.

Seventh Embodiment

Given below is the description of a seventh embodiment. In the seventh embodiment, the difference from the fifth embodiment is that the eyepiece 20 is moved in the Z direction. In the seventh embodiment, regarding identical constituent elements to the first embodiment, the explanation is not repeated.

Figure 26:
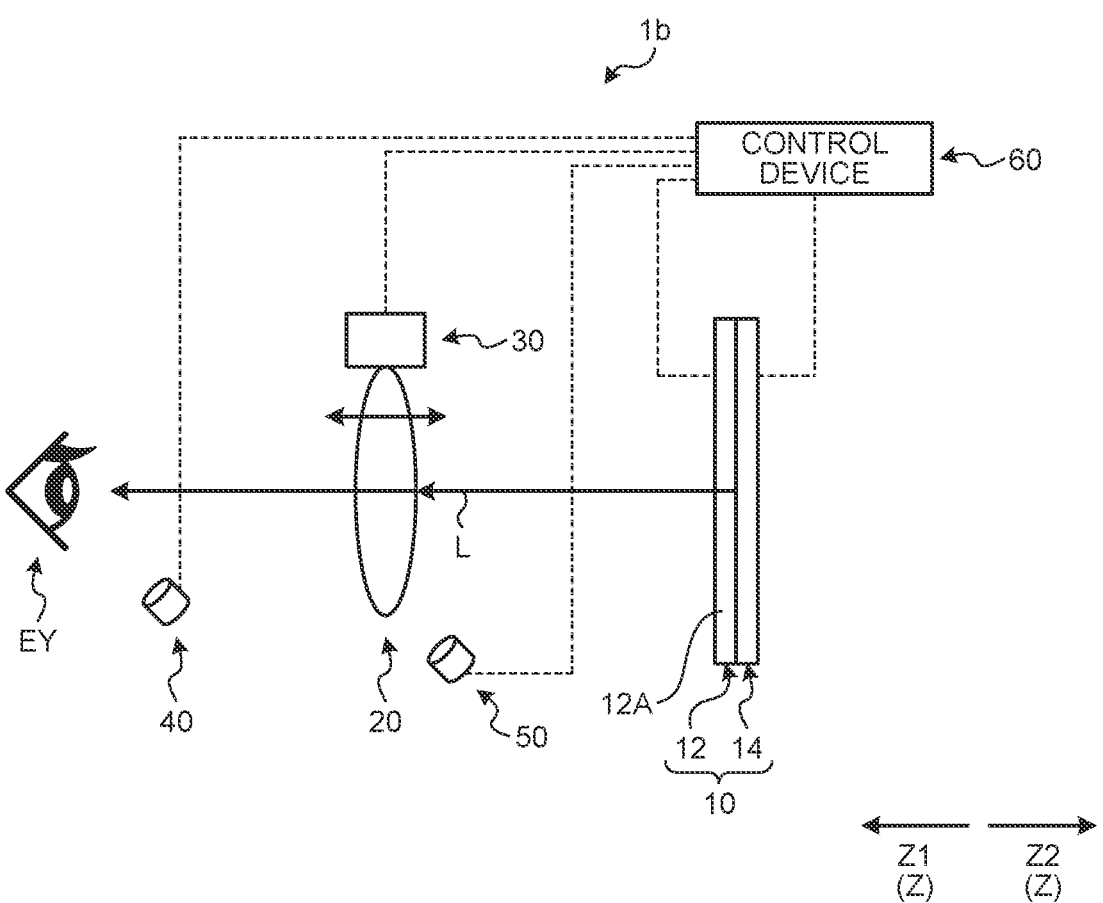
FIG. 26 is a schematic diagram of a display device according to a seventh embodiment.

FIG. 26 is a schematic diagram of a display device according to the seventh embodiment. As illustrated in FIG. 26, in the display device 1b according to the seventh embodiment, the driving unit 30 is attached to the eyepiece 20 for the purpose of moving the eyepiece 20 in the Z direction. In the seventh embodiment, the display unit 10 receives, from the control device 60 (explained later), a driving signal meant for driving the display panel 12 and a control signal meant for controlling the emission timing regarding the light emitted from the light source unit 14. Moreover, the driving unit 30 acquires, from the control device 60 (explained later), a signal meant for performing drive control; the eye gaze detection unit 40 sends the eye gaze detection result to the control device 60; and the position information detection unit 50 sends the detection result about the position to the control device 60. In the seventh embodiment, the drive control unit 76 moves the eyepiece 20 in such a way that the eyepiece 20 repeatedly reciprocates (oscillates) in the Z direction by moving in the Z1 direction for a predetermined distance and then moving in the Z2 direction for a predetermined distance. Thus, the drive control unit 76 moves the eyepiece 20 along the Z direction at regular intervals. In other words, the drive control unit 76 causes reciprocation of the eyepiece 20 in the Z direction at regular intervals. In the seventh embodiment, the cycle of reciprocation in the Z direction is constant. However, the cycle is not limited to be constant, and can be variable.

The position detection unit 50 according to the seventh embodiment detects the position of the eyepiece 20 in the Z direction. The position information acquisition unit 74 according to the seventh embodiment causes the position detection unit 50 to detect the position of the eyepiece 20 in the Z direction, and acquires the detection result about the position of the eyepiece 20 in the Z direction.

In the seventh embodiment, based on the eye gaze detection result regarding the user U and based on the position of the eyepiece 20 in the Z direction (i.e., in the optical axis direction of the image light L), the timing setting unit 80 sets the emission timing. More particularly, the timing setting unit 80 sets the emission timing based on the eye gaze detection result regarding the user U, based on the depth information regarding a stereoscopic image, and based on the position of the eyepiece 20 in the Z direction.

More specifically, the timing setting unit 80 according to the seventh embodiment acquires the depth information regarding the gazing position detected by the eye gaze information acquisition unit 72. That is, the timing setting unit 80 acquires the information about a position in the depth direction (the Z direction) of the gazing position. Then, based on the depth information regarding the gazing position, the timing setting unit 80 sets the emission position representing the position of the eyepiece 20 at the time of causing the light source unit 14 to start emitting light. The timing setting unit 80 sets, as the emission position, the position of the eyepiece 20 in the Z direction at the time when the angular aperture of the image light L matches with the angular aperture of the luminous flux when the light emitted from the position in the depth direction of the gazing position (the position of the virtual image being gazed by the user U) onto the eyes EY (i.e., matches with the virtual image angular aperture attributed to the gazing position). Moreover, the timing setting unit 80 sets, as the emission timing, the timing at which the eyepiece 20 falls within a predetermined distance range from the emission position. In the seventh embodiment, the timing setting unit 80 sequentially acquires, from the position information acquisition unit 74, the information about the position of the eyepiece 20 in the Z direction; and, when the position of the eyepiece 20 in the Z direction reaches within a predetermined distance from the emission position, determines that the emission timing has arrived. Herein, the predetermined distance can be set in an arbitrary manner. However, in order to reduce the convergence/accommodation contradiction, it is desirable that the predetermined distance is set in such a way that there is a decrease in the difference between the virtual image angular aperture attributed to the gazing position and the angular aperture of the image light L.

In this way, the timing setting unit 80 sets the emission timing. Moreover, the timing setting unit 80 sets a timing arriving later than the emission timing as the emission discontinuation timing. When the timing setting unit 80 determines that the emission timing has arrived, the emission control unit 82 causes the light source unit 14 to start emitting light. The emission control unit 82 causes the light source unit 14 to emit light during the period of time from the emission timing to the emission discontinuation timing; and, upon arrival of the emission discontinuation timing, causes the light source unit 14 to stop emitting the light.

In the explanation given above, from the position detection unit 50, the timing setting unit 80 sequentially acquires the information about the position of the eyepiece 20 in the Z direction, and determines whether the eyepiece 20 has reached within a predetermined distance from the emission position. However, that is not the only possible case. For example, when the eyepiece 20 is being reciprocated in the Z direction at regular intervals, the timing-by-timing positions of the eyepiece 20 in the Z direction (i.e., the predicted positions) can be figured out without causing the position detection unit 50 to perform position detection. Thus, the timing setting unit 80 can acquire, from the timing information, the information about the positions of the eyepiece 20 in the Z direction. In that case, based on the information about the timing-by-timing predicted positions of the eyepiece 20 and based on the information about the emission position, the timing setting unit 80 can set, as the emission timing, the timing at which the eyepiece 20 reaches within a predetermined distance from the emission position; and, when the current timing coincides with the emission timing, can determine that the eyepiece 20 has reached the emission position and can cause the light source unit 14 to emit light.

Flow of Processing

Figure 27:
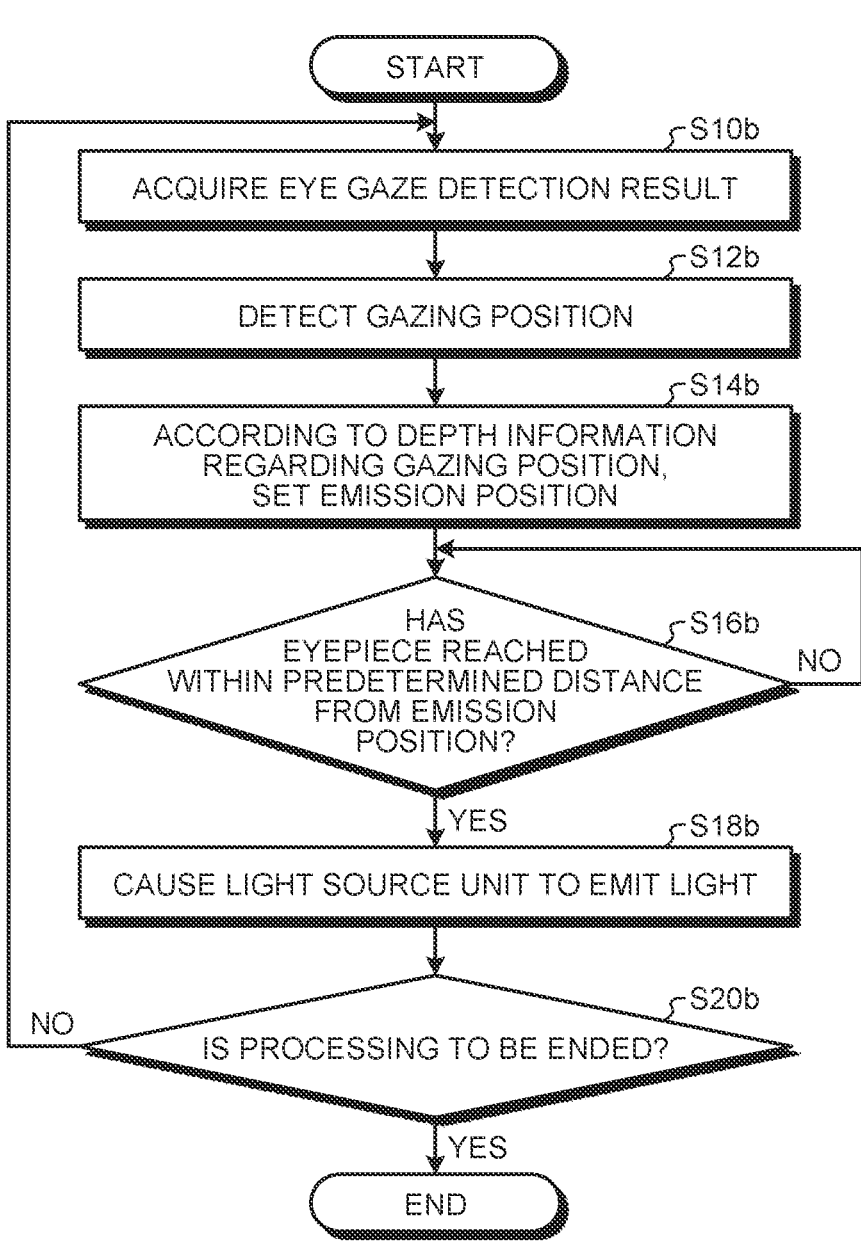
FIG. 27 is a flowchart for explaining a flow of processing performed by a control device according to the seventh embodiment.

Given below is the explanation of a flow of processing performed by the control device 60 according to the seventh embodiment. FIG. 27 is a flowchart for explaining a flow of processing performed by the control device according to the seventh embodiment. In the control device 60, the display control unit 78 drives the pixels of the display panel 12 based on the image data, and the drive control unit 76 causes the eyepiece 20 to reciprocate in the Z direction at regular intervals. Moreover, in the control device 60, while the pixels are driven and the eyepiece 20 is made to reciprocate, the eye gaze information acquisition unit 72 acquires the eye gaze detection result regarding the user U (Step S10b) and detects the gazing position based on the eye gaze detection result (Step S12b). Then, in the control device 60, the timing setting unit 80 sets the emission position according to the depth information regarding the gazing position (Step S14b). Subsequently, in the control device 60, the position information acquisition unit 74 sequentially acquires the position of the eyepiece 20 in the Z direction and determines whether the eyepiece 20 has reached within a predetermined distance from the emission position (Step S16b). If the eyepiece 20 has reached within a predetermined distance from the emission position (Yes at Step S16b), then the timing setting unit 80 determines that the emission timing has arrived, and the emission control unit 82 causes the light source unit 14 to emit light (Step S18b). Subsequently, upon arrival of the emission discontinuation timing, the emission control unit 82 causes the light source unit 14 to stop emitting the light. After that, if the processing is not to be ended (No at Step S20b), then the system control returns to Step S10b and the processing are performed again. Meanwhile, if the eyepiece 20 has not yet reached within a predetermined distance from the emission position (No at Step S16b), then the system control returns to Step S16b and the light source unit 14 is not allowed to emit the light until the eyepiece 20 reaches within the predetermined distance from the emission position. However, even if the eyepiece 20 has not yet reached within a predetermined distance from the emission position (No at Step S16b), the system control can still return to Step S10b. When the processing is to be ended (Yes at Step S20b), it marks the end of the processing.

Effects

As explained above, the display device 1b according to the seventh embodiment provides stereoscopic images to the user U and includes the display unit 10, an optical element, the eye gaze information acquisition unit 72, the drive control unit 76, the timing setting unit 80, and the emission control unit 82. The display unit 10 includes the display panel 12 having a plurality of pixels, and includes the light source unit 14 that emits light onto the display panel 12. The display unit 10 ensures that the image light L, which represents the light emitted from the light source unit 14 onto the display panel 12, reaches the user U, and thus provides a stereoscopic image to the user U. The optical element (in the example according to the seventh embodiment, the eyepiece 20) is disposed on the side of the user U with respect to the display unit 10 in the optical axis direction of the image light L. The eye gaze information acquisition unit 72 acquires the eye gaze detection result regarding the user U. The drive control unit 76 moves the optical element along the optical axis direction of the image light L (in the seventh embodiment, along the Z direction) at regular intervals. Based on the eye gaze detection result regarding the user U and based on the position of the optical element in the optical axis direction (in the first embodiment, the Z direction), the timing setting unit 78 sets the emission timing regarding the emission of light from the light source unit 14. Upon arrival of the emission timing, the emission control unit 82 causes the light source unit 14 to emit light.

As is the case of the display device 1b according to the seventh embodiment, even when an optical element is moved, in an identical manner to the fifth embodiment, stereoscopic images can be provided in an appropriate manner to the user U, and the angular aperture of the luminous flux of the image light L can be appropriately adjusted, thereby enabling achieving reduction in the convergence/accommodation contradiction. Moreover, the optical element is, for example, a lens made of resin or glass, and has a simpler configuration as compared to the display unit 10. Hence, when the optical element is moved, it becomes possible to lower the risk of malfunctioning.

Moreover, based on the eye gaze detection result, the eye gaze information acquisition unit 72 detects the gazing position in the stereoscopic image at which the user U is looking fixedly. Then, based on the depth information regarding the gazing position, the timing setting unit 80 acquires the information about the emission position that is the position of the optical element (in the seventh embodiment, the eyepiece 20) in the optical axis direction at which the angular aperture of the luminous flux of the image light L, when the light source unit 14 is made to emit light, corresponds to the angular aperture of the luminous flux when the image light L is emitted from a position in the depth direction of the gazing position toward the user U (i.e., corresponds to the virtual image angular aperture attributed to the gazing position). Moreover, the timing setting unit 80 sets, as the emission timing, the timing at which the optical element falls within a predetermined distance range from the emission position. According to the seventh embodiment, the angular aperture of the luminous flux of the image light L can be brought closer to the virtual image angular aperture attributed to the virtual image being gazed by the user U. That enables achieving reduction in the convergence/accommodation contradiction.

The optical element includes the eyepiece 20, and the drive control unit 76 moves the eyepiece 20. According to the seventh embodiment, as a result of moving the eyepiece 20, it becomes possible to appropriately provide stereoscopic images to the user U, and to appropriately adjust the angular aperture of the luminous flux of the image light L. That enables achieving reduction in the convergence/accommodation contradiction.

Meanwhile, in the fifth embodiment, the display unit 10 (or the display panel 12) is moved; and, in the third embodiment, the optical element is moved. Alternatively, it is possible to move the display unit 10 (the display panel 12) as well as the optical element.

Eighth Embodiment

Given below is the description of an eighth embodiment. In the eighth embodiment, the difference from the seventh embodiment is that the microlens array 20A is moved instead of moving the eyepiece 20. In the eighth embodiment, regarding identical constituent elements to the seventh embodiment, the explanation is not repeated.

Figure 28:
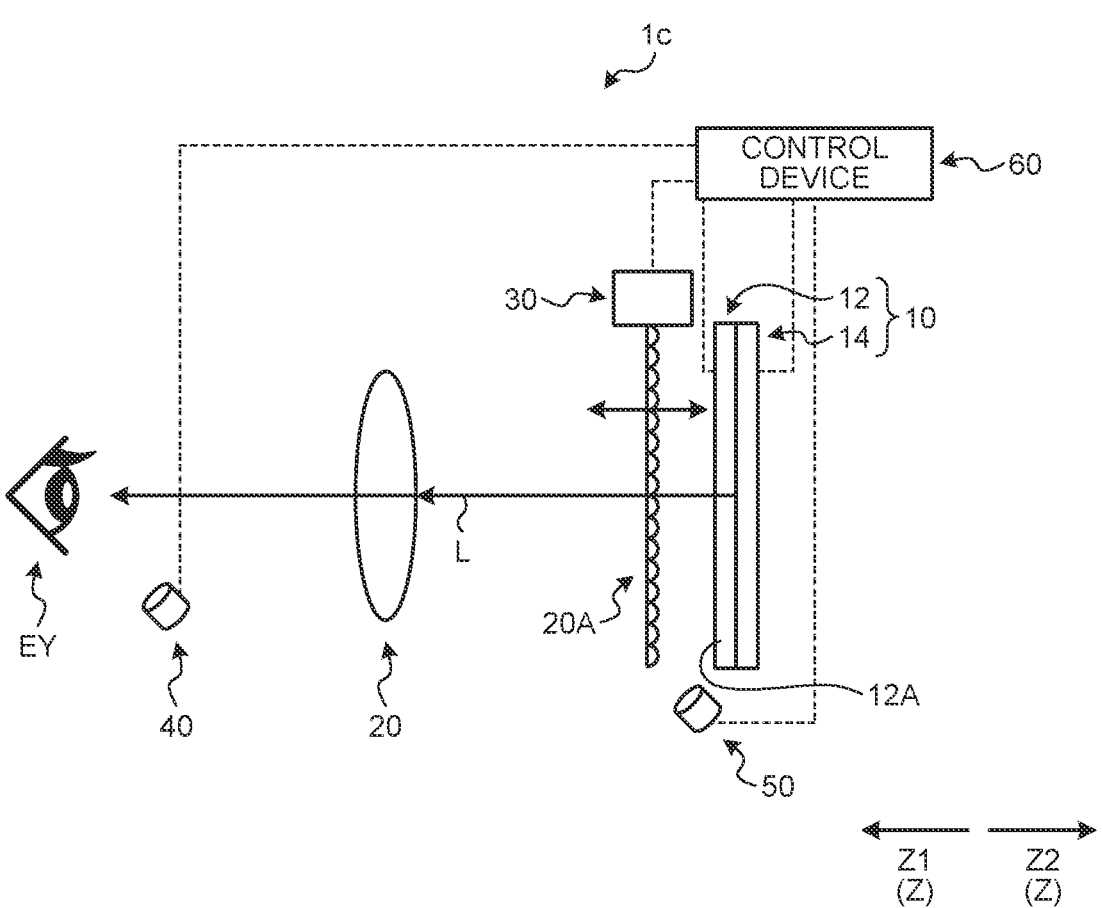
FIG. 28 is a schematic diagram of a display device according to an eighth embodiment.

FIG. 28 is a schematic diagram of a display device according to the eighth embodiment. As illustrated in FIG. 28, in the display device 1c according to the eighth embodiment, the microlens array 20A is disposed on the side of the eyes EY of the user U with respect to the display unit 10 in the optical axis direction of the image light L. The microlens array 20A is disposed in between the display unit 10 and the eyepiece 20 in the optical axis direction of the image light L. In the eighth embodiment, the driving unit 30 is attached to the microlens array 20A for the purpose of moving the microlens array 20A in the Z direction. In the eighth embodiment, apart from the fact that the microlens array 20A is moved instead of moving the eyepiece 20, the details are identical to the seventh embodiment. Hence, that explanation is not repeated. That is, in the eighth embodiment, it serves the purpose when the term "eyepiece 20" in the seventh embodiment is substituted with the term "microlens array 20A".

In this way, in the eighth embodiment, the optical element includes the microlens array 20A, and the drive control unit 76 moves the microlens array 20A. According to the eighth embodiment, as a result of moving the microlens array 20A, it becomes possible to appropriately provide stereoscopic images to the user U, and to appropriately adjust the angular aperture of the luminous flux of the image light L. That enables achieving reduction in the convergence/accommodation contradiction.

Figure 29:
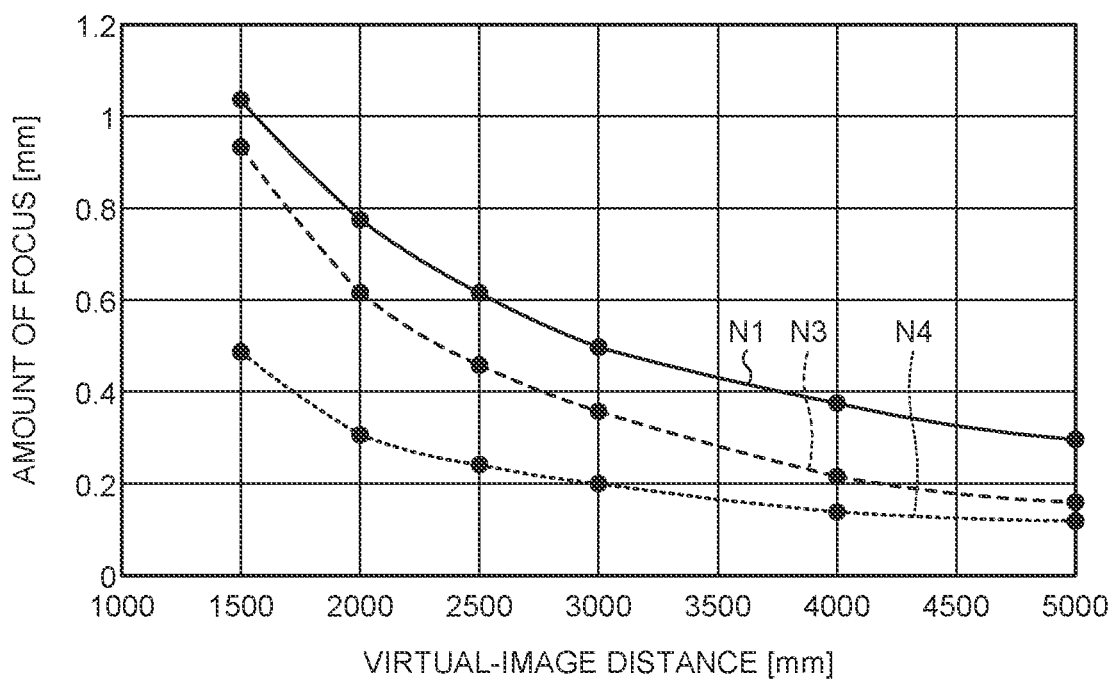
FIG. 29 is a graph for explaining the difference occurring in the amount of movement of a display unit when a microlens array is disposed.

FIG. 29 is a graph for explaining the difference occurring in the amount of movement of the display unit when a microlens array is disposed. The following explanation is given about the calculation result obtained when optical simulation was performed to calculate the difference in the required amount of movement of the display unit 10 in the case in which a microlens array was disposed and in the case in which a microlens array was not disposed. In the optical simulation, two types of microlens arrays were prepared, one having the radius of curvature of 2.5 mm and the other having the radius of curvature of 1 mm. Moreover, instead of moving the display, the microlens arrays were moved. Apart from that, the details of the optical simulation were identical to the optical simulation explained in the sixth embodiment. In FIG. 29, the line N1 represents the amount of focus at each virtual image distance in the case in which a microlens array is not disposed and the display is moved. The line N3 represents the amount of focus at each virtual image distance in the case in which the microlens array having the radius of curvature of 2.5 mm is disposed. The line N4 represents the amount of focus at each virtual image distance in the case in which the microlens array having the radius of curvature of 1 mm is disposed. As indicated by the lines N1, N3, and N4; it can be understood that, when a microlens array is disposed, the amount of focus becomes smaller and the amount of movement can be reduced.

Meanwhile, in the configuration in which the microlens array 20A is disposed as explained in the eighth embodiment, either the eyepiece 20 can be moved as explained in the seventh embodiment, or the eyepiece 20 as well as the microlens array 20A can be moved. According to the seventh embodiment, the eyepiece 20 is moved; and, according to the eighth embodiment, the microlens array 20A is moved. However, the optical element to be moved is not limited to the eyepiece 20 or the microlens array 20A. That is, any arbitrary optical element that is disposed on the side of the user U with respect to the display unit 10 can be moved.

Modification Example

Given below is the explanation of a modification example. In the display device 1d according to the modification example, the difference from the sixth embodiment is that the display is expanded using the concave mirror 20C, and the eyepiece 20 is not used. In the modification example, regarding identical constituent elements to the sixth embodiment, the explanation is not repeated.

Figure 30:
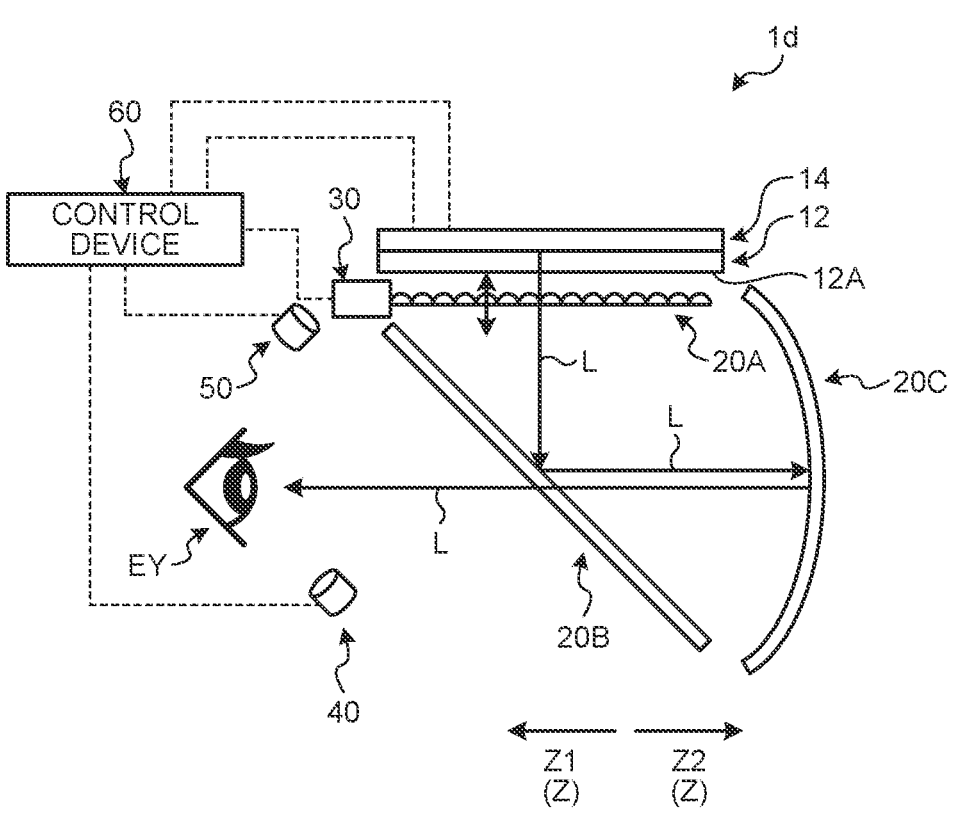
FIG. 30 is a schematic diagram of a display device according to a modification example.

FIG. 30 is a schematic diagram of the display device according to the modification example. As illustrated in FIG. 30, in the display device 1d according to the modification example, the eyepiece 20 is not disposed, and the half mirror 20B and the concave mirror 20C are disposed on the side of the eyes EY of the user U with respect to the display unit 10 in the optical axis direction of the image light L. The half mirror 20B and the concave mirror 20C can also be treated as optical elements. In the modification example, the image light L emitted from the display unit 10 gets reflected from the half mirror 20B and falls onto the concave mirror 20C. The image light L that falls onto the concave mirror 20C becomes almost a parallel light while having a slight spread angle at the concave mirror 20C, and then passes through the half mirror 20B and falls onto the eyes EY of the user U.

In the modification example, in an identical manner to the sixth embodiment, the microlens array 20A is moved. Even with the configuration as explained in the modification example, since the microlens array 20A is moved, in an identical manner to the sixth embodiment, it becomes possible to appropriately provide stereoscopic images to the user U and to appropriately adjust the aperture angle of the luminous flux of the image light L. That enables enabling achieving reduction in the convergence/accommodation contradiction.

Meanwhile, the modification example is applicable in other embodiments too. That is, in the configuration according to the modification example, either the display unit 10 can be moved, or any optical element other than the half mirror 20B can be moved. Moreover, the display device can have some other configuration other than the configurations according to the embodiments described above and the configuration according to the modification example explained with reference to FIG. 30. For example, the display unit 10 can be, for example, a self-luminous display enabling lighting control on a pixel-by-pixel basis, such as an organic light emitting diode (OLED) or what is called a micro LED. Alternatively, the display unit 10 can be a reflective liquid crystal display device.

Ninth and Tenth Embodiments

Given below is the description of ninth and tenth embodiments.

Convergence/Accommodation Contradiction

Figure 31:
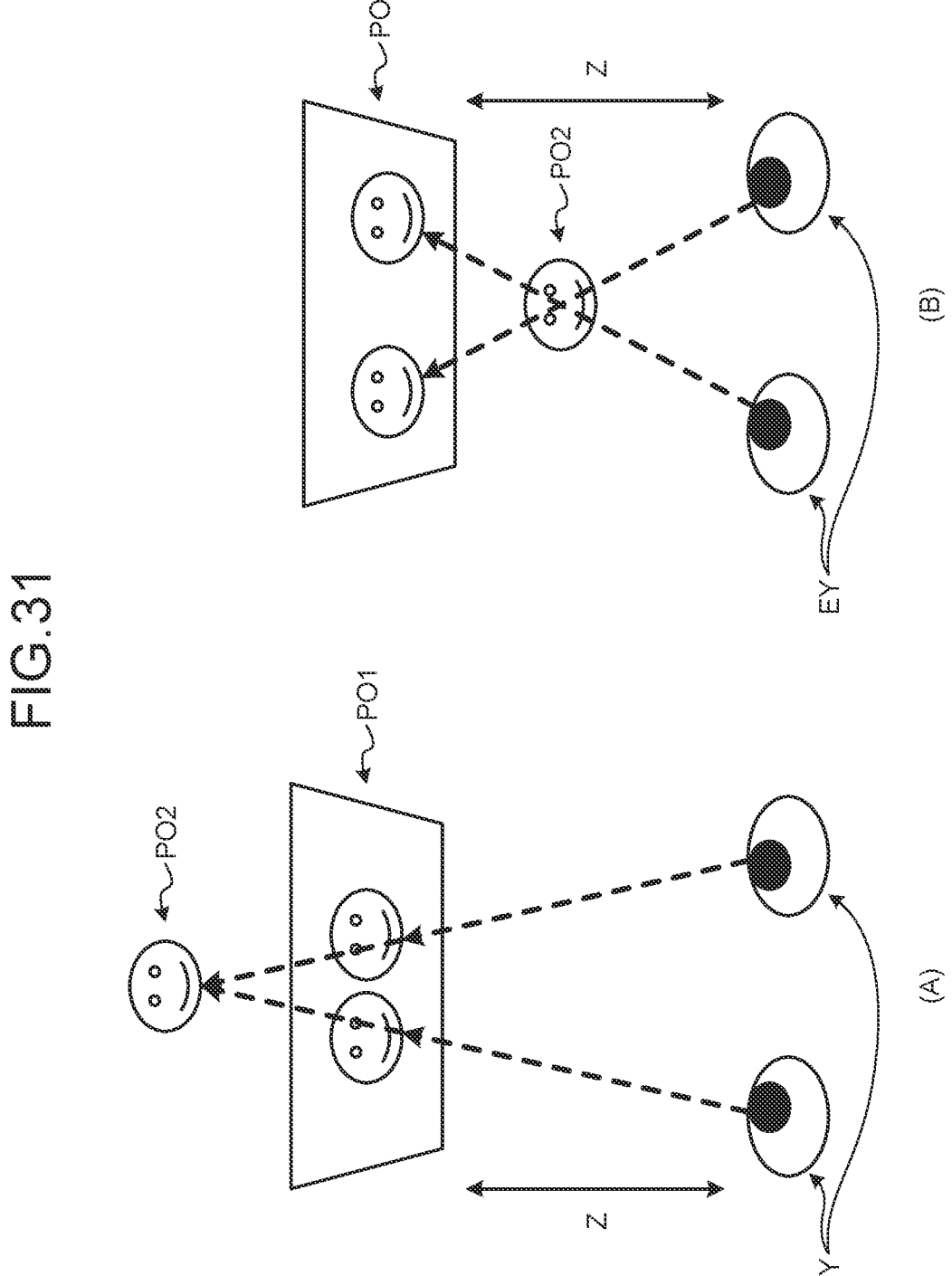
FIG. 31 is a schematic diagram for explaining the convergence/accommodation contradiction.

FIG. 31 is a schematic diagram for explaining the convergence/accommodation contradiction. A display device, which is configured to display stereoscopic images, causes the right and left eyes of the user to view images having different parallaxes, and displays a stereoscopic image by making use of the variation in the convergence. In the case of displaying a stereoscopic image, the display surface on which the image is actually displayed serves as the focal position of the eyes of the user, and the position at which the lines of sight of the right and left eyes intersect represents the convergence position. However, as illustrated in FIG. 31, in a stereoscopic image, there are times when the focal position PO1 and the convergence position PO2 become misaligned in the Z direction representing the depth direction of the stereoscopic image. If the focal position PO1 and the convergence position PO2 become misaligned, it results in what is called the convergence/accommodation contradiction that is responsible for the eye fatigue or for what is called 3D sickness. For that reason, there is a demand for ensuring that the convergence/accommodation contradiction is held down. Meanwhile, in (A) in FIG. 31, an example is illustrated in which, as compared to the convergence position PO2, the focal position PO1 is closer to eyes EY of the user. On the other hand, in (B) in FIG. 31, an example is illustrated in which, as compared to the focal position PO1, the convergence position PO2 is closer to eyes EY of the user.

Ninth Embodiment

Overall Configuration of Display Device

Figure 32:
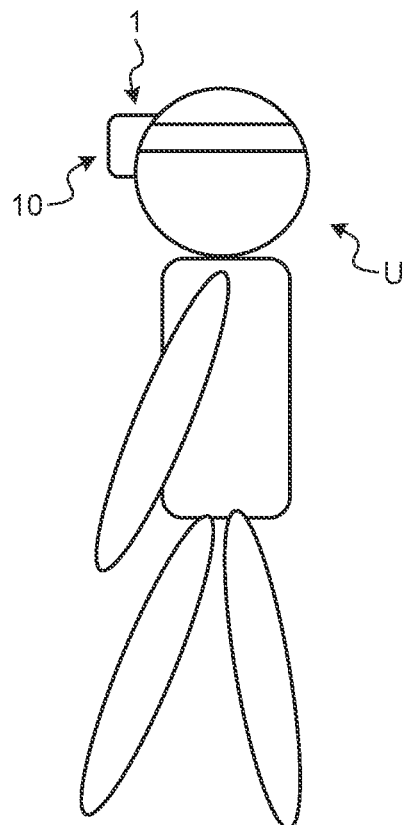
FIG. 32 is a schematic diagram of a display device according to a ninth embodiment.

FIG. 32 is a schematic diagram of a display device according to the ninth embodiment. The display device 1 according to the ninth embodiment is configured to display stereoscopic images. As illustrated in FIG. 32, the display device 1 is what is called a head-mounted display (HMD) that is mounted in the head region of the user U. For example, of the display device 1, the display unit 10 is mounted to face toward the eyes EY of the user U. The display device 1 displays images in the display unit 10 and provides contents to the user U. Meanwhile, the configuration of the display device 1 illustrated in FIG. 32 is only exemplary. Alternatively, for example, the display device 1 can include a sound output unit (speaker) that is mounted on an ear of the user U.

As a result of mounting the display device 1 on the user U in the manner explained above, the position of the display device 1 with respect to the eyes EY of the user U gets fixed. The display device 1 is not limited to be an HMD mounted on the user U, and can alternatively be a display device fixed to an equipment. In that case too, it is desirable that the position of the display device 1 with respect to the eyes EY of the user U is fixed. For example, it is desirable that the position of the display device 1 is fixed with respect to the seat on which the user U is sitting.

Figure 33:
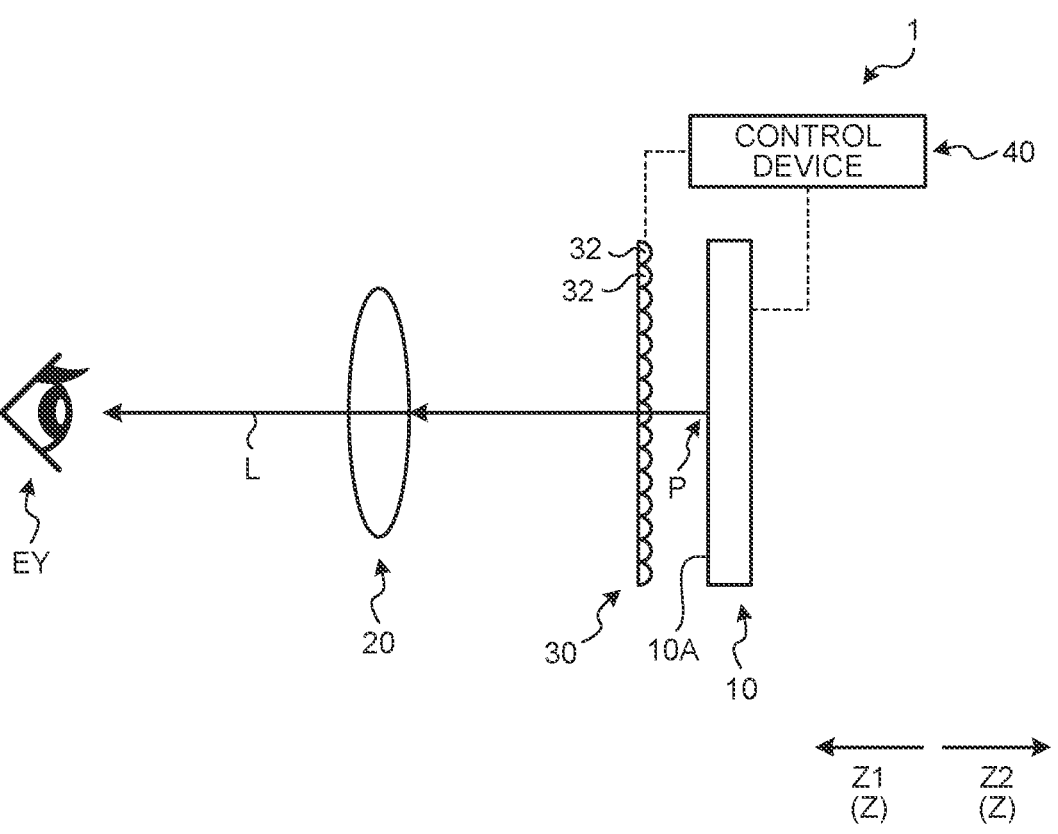
FIG. 33 is a schematic diagram illustrating the constituent elements of the display device according to the ninth embodiment.

FIG. 33 is a schematic diagram illustrating the constituent elements of the display device according to the ninth embodiment. As illustrated in FIG. 33, the display device 1 includes the display unit 10, the eyepiece 20, a microlens array 30, and a control device 40.

Display Unit

The display unit 10 is a device for displaying stereoscopic images. The display unit 10 is a display including a plurality of self-luminous pixels P (display elements) arranged in a matrix. Because of the self-luminous nature of the pixels P in the display unit 10, it becomes possible for the display unit 10 to control the emission of light (emission of light) from each pixel P on an individual basis. The pixels P of the display unit 10 can be, for example, organic light emitting diodes (OLED) or can be inorganic light emitting diodes (micro LEDs). Meanwhile, the display surface 10A represents the surface of the display unit 10 on which images are displayed. In the following explanation, the direction from the display surface 10A toward the eyes EY of the user U is referred to as the Z1 direction; and the direction opposite to the Z1 direction, that is, the direction from the eyes EY of the user U toward the display surface 10A is referred to as the Z2 direction. When the directions Z1 and Z2 need not be distinguished from each other, they are referred to as the Z direction. In FIG. 33, the display surface 10A represents that surface of the display unit 10 which is present on the side of the eyes EY of the user U. However, the display surface 10A is not limited to be the surface present on the side of the eyes EY of the user U. Alternatively, the display surface 10A can be present more on the inner side than the surface on the side of the eyes EY of the user U. Meanwhile, the display unit 10 receives, from the control device 40 (explained later), a control signal meant for controlling the pixels P of the display unit 10.

The display unit 10 ensures that the image light L, which represents the light emitted (emission light) from each pixel P, reaches the eyes EY of the user U, and thus provides a stereoscopic image to the user U. More specifically, the emission of light from each pixel is controlled in such a way that a left-eye image and a right-eye image are provided. Of the image light L emitted from the pixels P, the image light L emitted from the pixels P corresponding to the left-eye image falls onto the left eye of the user U, and the image light L emitted from the pixels P corresponding to the right-eye image falls onto the right eye of the user U. As a result, a stereoscopic image is provided to the user U.

Eyepiece

The eyepiece 20 is disposed on the side in the Z1 direction with reference to the display unit 10. The eyepiece 20 is an optical element that transmits light (image light). More particularly, in the display device 1, the eyepiece 20 is the closest optical element (lens) to the eyes EY of the user U. The image light L emitted from the display unit 10 passes through the eyepiece 20 and falls onto the eyes EY of the user U. Meanwhile, in the ninth embodiment, in the light path of the image light L from the eyepiece 20 (eyepiece) to the eyes EY of the user U, the optical axis direction can be treated as the Z direction.

In the example illustrated in FIG. 33, only the eyepiece 20 and the microlens array 30 are illustrated as the optical elements present on the side in the Z1 direction with reference to the display unit 10. However, that is not the only possible case, and other optical elements other than the eyepiece 20 and the microlens array 30 can also be disposed on that side.

Microlens Array

The microlens array 30 is disposed on the side of the eyes EY of the user U with respect to the display unit 10 in the optical axis direction of the image light L. Moreover, the microlens array 30 is disposed in between the display unit 10 and the eyepiece 20 in the optical axis direction of the image light L. The microlens array 30 is an optical element in which a plurality of lenses 32 is arranged in a matrix along a plane parallel to the display surface 10A. In the ninth embodiment, the pitch of each lens 32 of the microlens array 30, that is, the distance between the centers of neighboring lenses 32 is about the same as the pitch of each pixel P of the display unit 10 (i.e., the distance between the centers of neighboring pixels P). In the microlens array 30, the lenses 32 are disposed opposite to the pixels P of the display unit 10 in the optical axis direction of the image light L. The microlens array 30 receives, from the control device 40 (explained later), a control signal meant for controlling the microlens array 30.

The microlens array 30 is what is called a varifocal microlens array in which the focal position of each lens 32 in the Z direction (i.e., in the optical axis direction of the image light L) is variable. In the example illustrated in FIG. 9, in the microlens array 30, the focal position of each lens 32 is varied in a uniform manner. Thus, at any given timing, the lenses 32 have the same focal positions in the Z direction. Meanwhile, the microlens array 30 can have an arbitrary structure. For example, the microlens array 30 can be configured by combining liquid crystals and a Fresnel lens. For example, as the lenses 32 in the microlens array 30, it is possible to use varifocal lenses disclosed in "Volumetric 3D Display Utilizing a Liquid-Crystal Varifocal Lens" (in Japanese) (Shiro SUYAMA of Tokushima University, Japanese journal of optics: publication of the Optical Society of Japan, 40 (12) (2011)).

Control Device

Figure 34:
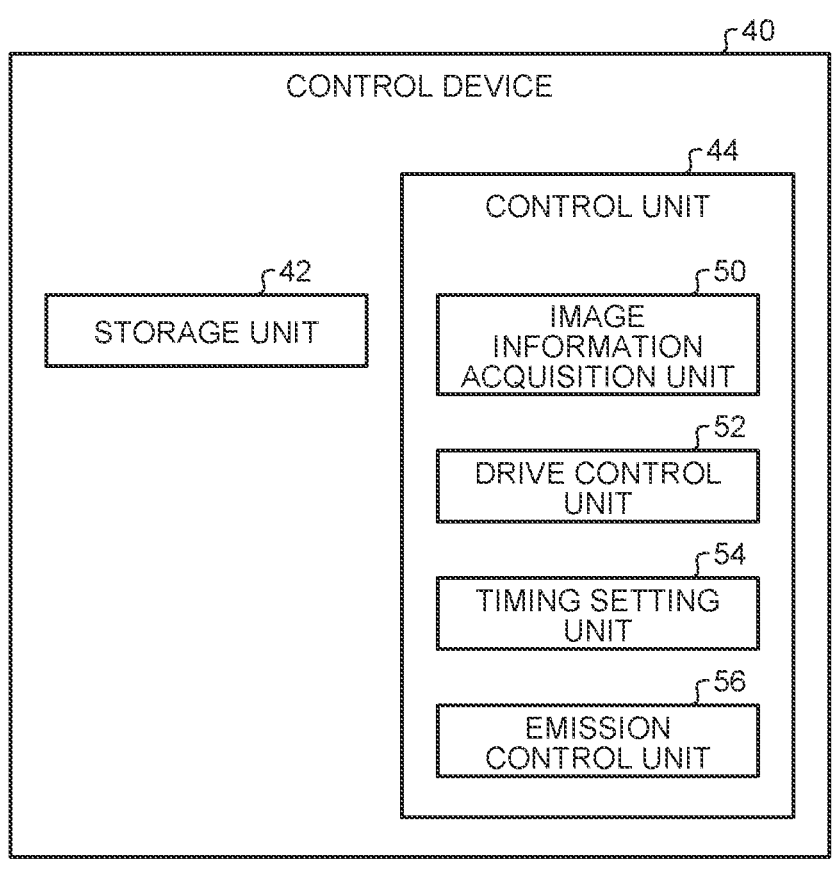
FIG. 34 is a schematic block diagram of a control device according to the ninth embodiment.

The control device 40 controls the constituent elements of the display device 1. FIG. 34 is a schematic block diagram of the control device according to the ninth embodiment. In the ninth embodiment, the control device 40 is a computer and includes a storage unit 42 and a control unit 44. The storage unit 42 is a memory used to store the computational details of the control unit 44 and to store a variety of information such as computer programs. For example, the storage unit 42 includes at least either a main storage device such as a random access memory (RAN) or a read only memory (ROM), or an external storage device such as a hard disk drive. The computer programs written for the control unit 44 and stored in the storage unit 42 can be alternatively stored in a recording medium that is readable by the control device 40.

The control unit 44 is an arithmetic device that includes an arithmetic circuit such as a central processing unit (CPU). The control unit 44 includes an image information acquisition unit 50, a drive control unit 52, a timing setting unit 54, and an emission control unit 56. The control unit 44 reads computer programs (software) from the storage unit 42 and executes them so as to implement the image information acquisition unit 50, the drive control unit 52, the timing setting unit 54, and the emission control unit 56 and to perform their processing. Meanwhile, the control unit 44 either can perform those processing using a single CPU, or can include a plurality of CPUs and can perform the processing using those CPUs. Meanwhile, at least one of the image information acquisition unit 50, the drive control unit 52, the timing setting unit 54, and the emission control unit 56 can be implemented using a hardware circuit.

Image Information Acquisition Unit

The image information acquisition unit 50 acquires image data of each stereoscopic image that is displayed in the display unit 10. That is, the image information acquisition unit 50 acquires image data of a left-eye image and acquires image data of a right-eye image. Moreover, the image information acquisition unit 50 acquires depth information indicating the position of a stereoscopic image in the depth direction. The position of a stereoscopic image in the depth direction implies the position of a virtual image in the depth direction that is viewed by the user U when an image is displayed on the display surface 10A. The depth direction can also be said to be the direction orthogonal to the display surface 10A of the display unit 10. In the ninth embodiment, the Z direction represents the depth direction. Meanwhile, the depth information is associated to the image data. Moreover, in a stereoscopic image, regarding each image included in a single frame, the position in the depth direction is set. In other words, for each position on the display surface 10A, the position in the depth direction is set. Hence, it can be said that, regarding a stereoscopic image, the image information acquisition unit 50 acquires the depth information regarding each position on the display surface 10A. Meanwhile, in a stereoscopic image, the position in the depth direction is set for each pixel P. However, alternatively, for a plurality of pixels P constituting a single image, the position in the depth direction can be set to be identical. The image information acquisition unit 50 can acquire the image data and the depth information according to an arbitrary method, such as by reading the image data and the depth information stored in advance in the storage unit 42 or by receiving the image data and the depth information via a communication unit (not illustrated). Alternatively, the image information acquisition unit 50 can calculate the positions in the depth direction based on the image data, and thus acquire the depth information.

Drive Control Unit

The drive control unit 52 controls the microlens array 30 and causes the focal position of each lens 32 of the microlens array 30 to move in the Z direction. For example, the drive control unit 52 controls the voltage application with respect to the liquid crystal elements included in the microlens array 30, and moves the focal position of the lenses 32 in the Z direction. The drive control unit 52 moves the focal position of the lenses 32 in such a way that the focal position of the lenses 32 repeatedly reciprocates (oscillates) by moving in the Z1 direction for a predetermined distance and then moving in the Z2 direction for a predetermined distance. Thus, the drive control unit 52 moves the focal position of the lenses 32 along the Z direction at regular intervals. In other words, the drive control unit 52 causes reciprocation of the focal position of the lenses 32 in the Z direction at regular intervals. In the ninth embodiment, the cycle of reciprocation in the Z direction (i.e., the period of time taken by the display unit 10 to return to the original position in the Z direction) is constant. However, the cycle is not limited to be constant, and can be variable.

Timing Setting Unit and Emission Control Unit

The timing setting unit 54 sets, for each pixel P of the display unit 10, the emission timing regarding the image light L. The emission control unit 56 controls, based on the image data, the pixels P of the display unit 10 and causes them to emit light. The emission control unit 56 causes each pixel P to emit the image light L at the emission timing set for that pixel P by the timing setting unit 54. That is, the emission control unit 56 causes a particular pixel P of the display unit 10 to emit the image light L at the emission timing set for that particular pixel P. The timing setting unit 54 sets the emission timing based on the focal position of the microlens array 30 (the lenses 32) in the Z direction (i.e., in the optical axis direction of the image light L). More particularly, based on the depth information regarding the concerned stereoscopic image and based on the focal position of the microlens array 30 in the Z direction, the timing setting unit 54 sets the emission timing. Meanwhile, although the timing setting unit 54 sets the emission timing for each pixel P, the emission timing is not limited to be different for each pixel P. For example, for a group of pixels P constituting a single image (for example, a group of pixels P displaying an image of a house in FIG. 35), the emission timing can be set to be identical. Regarding the setting performed by the timing setting unit 54, more specific explanation is given below.

Figure 35:
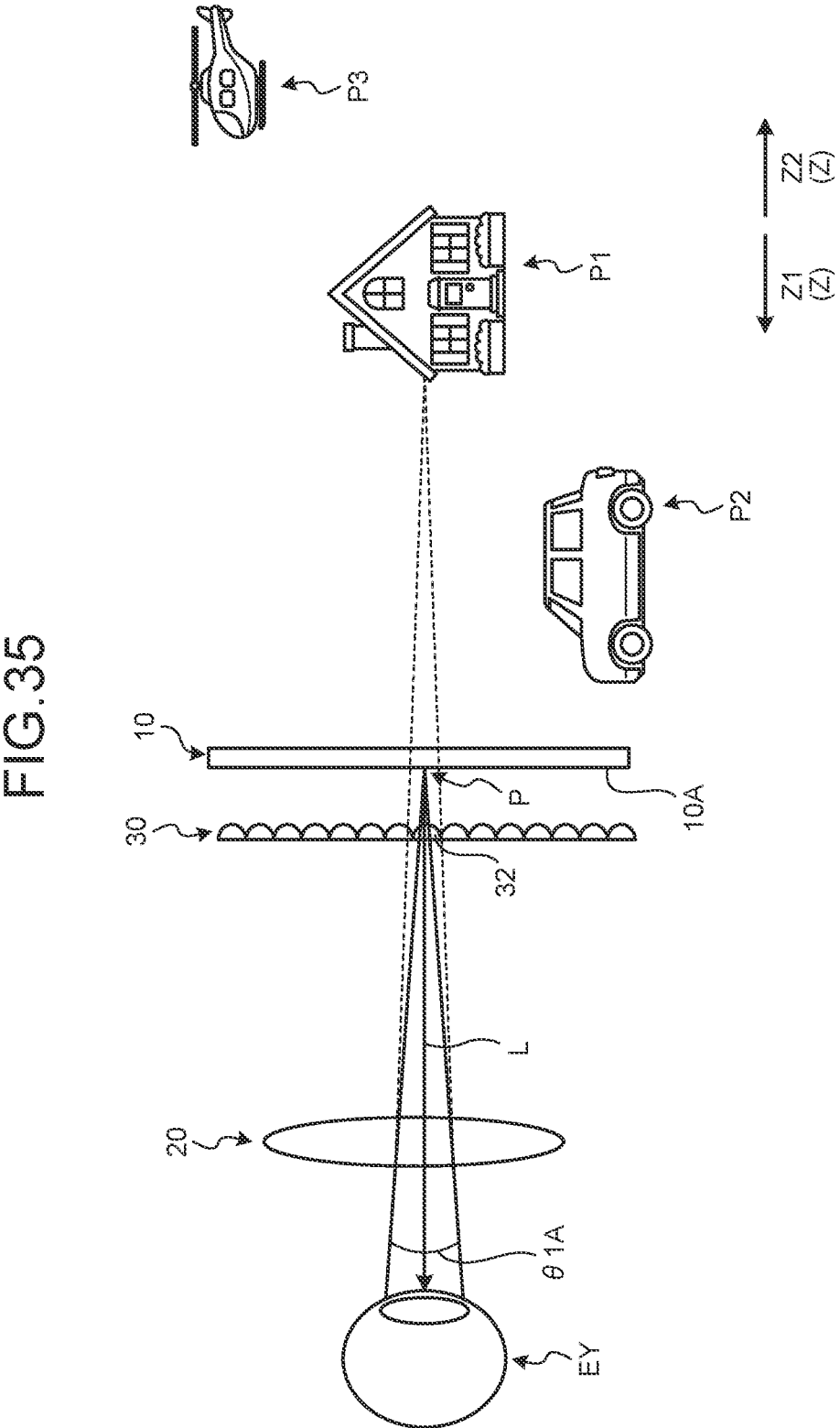
FIGS. 35 to 37 are schematic diagrams for explaining about setting an emission timing.
Figure 36:
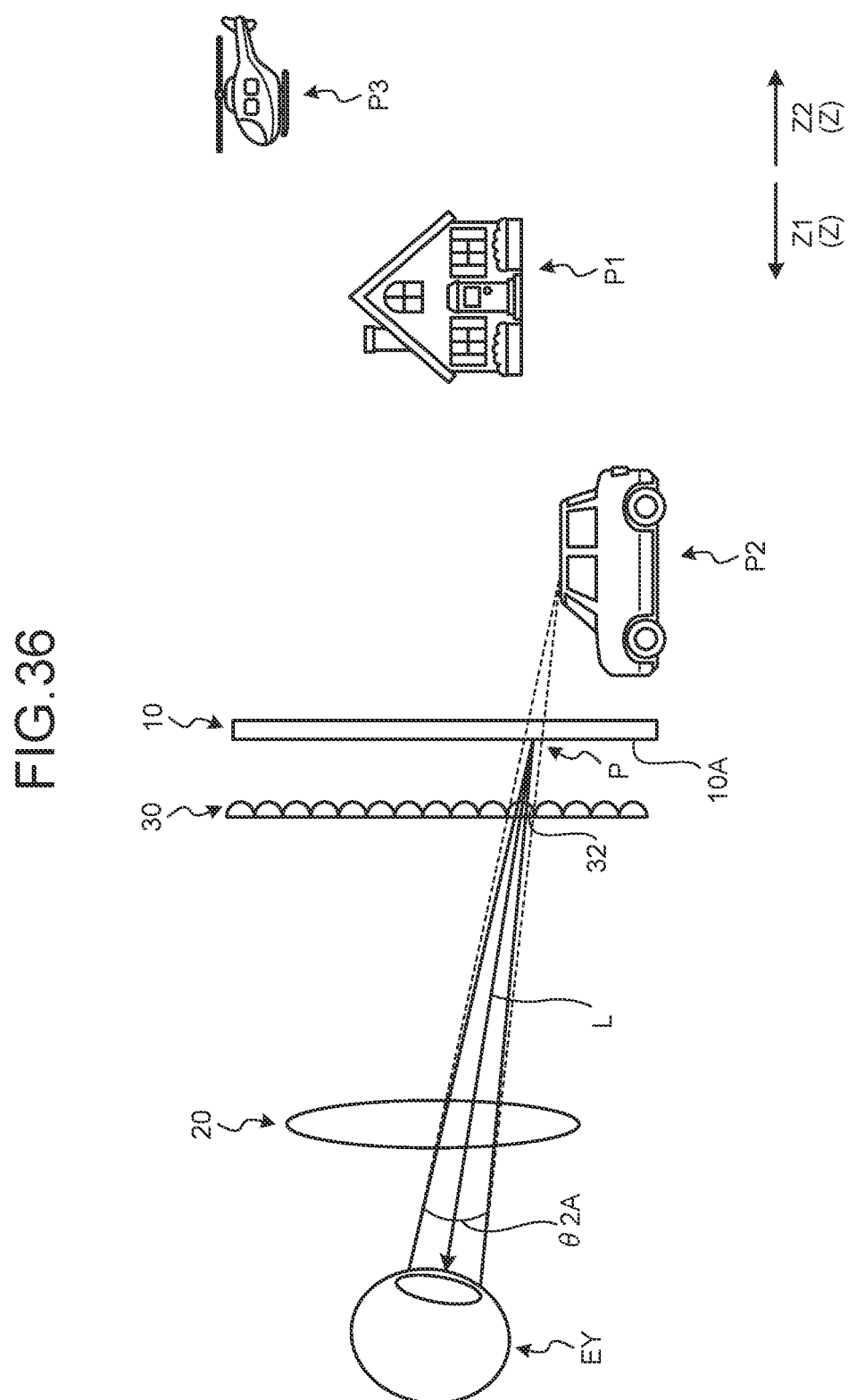
Figure 37:
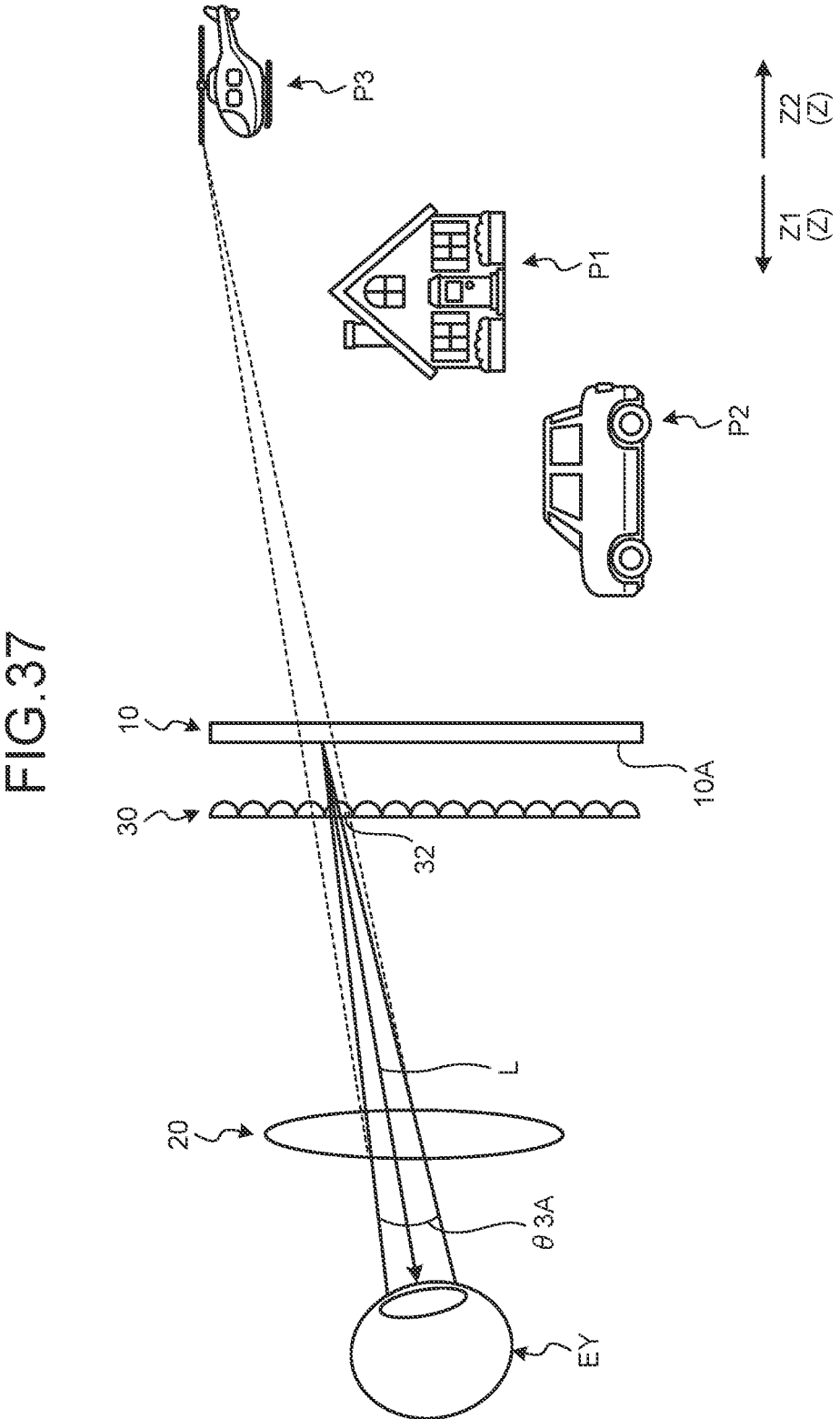

FIGS. 35 to 37 are schematic diagrams for explaining about setting the emission timing. For example, as illustrated in FIG. 35, the image light L that is emitted from a pixel P of the display unit 10 falls onto the eyes EY of the user U as a luminous flux having a predetermined angular aperture. In that case, in order to be in alignment with the angular aperture of the luminous flux, the user U involuntarily varies the thickness of the crystalline lenses of the eyeballs, and makes adjustment so that the retinas come in focus. The convergence/accommodation contradiction implies that the degree of convergence of the right and left eyes (the degree of cross-eye of the right and left eyes) does not match with the state in which the angular aperture of the luminous flux is in focus. In that regard, the display device 1 according to the ninth embodiment emits the image light L in such a way that there is a decrease in the difference between the virtual image angular aperture that represents the angular aperture when it is assumed that light is emitted from a virtual image (convergence position) and falls onto the eyes EY (in the example illustrated in FIG. 35, the angle θ1A) and the angular aperture of the image light L at the time when the image light L is actually emitted from the pixels P and falls onto the eyes EY. Herein, at the time of passing through the lenses 32 of the microlens array 30, the angular aperture of the luminous flux of the image light L changes (the image light L gets refracted), and the degree of change in the angular aperture of the luminous flux corresponds to the focal position of the lenses 32. Thus, the timing setting unit 54 sets, as the emission timing, the timing at which the focal point of the lenses 32 reaches the position at which there is a decrease in the difference between the virtual image angular aperture and the angular aperture of the image light L.

More specifically, the timing setting unit 54 acquires the depth information regarding each pixel P. That is, the timing setting unit 54 acquires, for each pixel P, the information about a position in the depth direction (the Z direction). Then, based on the depth information regarding each pixel P, the timing setting unit 54 sets the emission position representing the focal position of the lenses 32 at the time of causing the concerned pixel P to start emitting the image light L. The timing setting unit 54 sets, as the emission position for the concerned pixel P, the focal position of the lenses 32 in the Z direction at the time when the angular aperture of the image light L that is emitted from the concerned pixel P and that actually falls onto the eyes EY after passing through the lenses 32 matches with the angular aperture of the luminous flux in the case in which light is emitted onto the eyes EY from the position in the depth direction of that part of the stereoscopic image which is displayed due to the concerned pixel P (i.e., from the position of the virtual image formed by the concerned pixel P). Then, the timing setting unit 54 sets, as the emission timing for the concerned pixel P, the timing at which the focal point of the lenses 32 reaches the position at which the distance to the emission position is within a predetermined distance range. The timing setting unit 54 sets the emission position for each pixel P as well as sets the emission timing for each pixel P. Although the timing setting unit 54 sets the emission position as well as the emission timing for each pixel P, the emission position and the emission timing are not limited to be different for each pixel P. For example, for a group of pixels P constituting a single image (for example, a group of pixels P displaying the image of a house in FIG. 35), the emission position and the emission timing can be set to be identical.

In the ninth embodiment, the timing setting unit 54 sequentially acquires the information about the focal position of the lenses 32 in the Z direction; and, when the focal position of the lenses 32 in the Z direction reaches within a predetermined distance from the emission position, determines that the emission timing has arrived. Herein, the timing setting unit 54 can acquire the information about the focal position of the lenses 32 in the Z direction according to an arbitrary method. For example, when the focal point of the lenses 32 is being reciprocated in the Z direction at regular intervals, the timing-by-timing focal positions of the lenses 32 in the Z direction (i.e., the predicted positions) can be figured out. Thus, the timing setting unit 54 can acquire, from the timing information, the information about the focal positions of the lenses 32 in the Z direction. In that case, based on the information about the timing-by-timing predicted focal positions of the lenses 32 and the information about the emission position, the timing setting unit 54 can set, as the emission timing, the timing at which the focal point of the lenses 32 reaches within a predetermined distance from the emission position; and, when the current timing coincides with the emission timing, can determine that the focal point of the lenses 32 has reached the emission position and can cause the concerned pixel P to emit the image light L. Herein, the predetermined distance can be set in an arbitrary manner. However, in order to reduce the convergence/accommodation contradiction, it is desirable that the predetermined distance is set in such a way that there is a decrease in the difference between the virtual image angular aperture and the angular aperture of the image light L. Moreover, as the position in the depth direction of the pixel P which is to be used in setting the emission position, the timing setting unit 54 can use a value obtained by quantizing the depth direction. That is, for example, the depth direction is segmented into a plurality of numerical ranges and, for each numerical range, a predetermined value within that numerical range is set as the reference position. Then, the timing setting unit 54 extracts the numerical range that includes the position in the depth direction of the concerned pixel P as acquired by the image information acquisition unit 50, and treats the reference position of that numerical range as the position in the depth direction of the pixel P which is to be used in setting the emission position.

In this way, the timing setting unit 54 sets the emission timing for each pixel P. Moreover, the timing setting unit 54 sets a timing arriving later than the emission timing as the emission discontinuation timing. When it is determined that the emission timing for a particular pixel P has arrived, the emission control unit 56 causes that pixel P to start emitting the image light L. The emission control unit 56 causes that pixel P to emit the image light L during the period of time from the emission timing to the emission discontinuation timing; and, upon arrival of the emission discontinuation timing, causes that pixel P to stop emitting the image light L. Meanwhile, the emission discontinuation timing can be set in an arbitrary manner. For example, either the timing arriving after a predetermined period of time since the emission timing can be set as the emission discontinuation timing; or, immediately after the emission timing, the timing at which the distance between the focal position of the lenses 32 and the emission position goes out of the predetermined distance range can be set as the emission discontinuation timing.

In this way, in the display device 1, each pixel P is made to emit the image light L upon arrival of the emission timing and is made to stop emitting the image light L upon arrival of the emission discontinuation timing. Thus, during the period of time from the emission timing to the emission discontinuation timing, the image light L falls onto the eyes EY of the user U. As a result, the angular aperture of the luminous flux of the image light L falling on the eyes EY gets closer to the virtual image angular aperture attributed to the virtual image formed by the concerned pixel P, thereby enabling achieving reduction in the convergence/accommodation contradiction. Meanwhile, since the focal position of the lenses 32 reciprocates in the Z direction, they repeatedly switch between the state in which the distance to the emission position is within a predetermined distance range and the state in which the distance to the emission position goes out of the predetermined distance range. Every time the distance between the focal position of the lenses 32 and the emission position falls within the predetermined distance range, that is, at every arrival of the emission timing, the control device 40 causes the pixel P to emit the image light L. Hence, the user U happens to view the stereoscopic images in the form of a video. Moreover, since the focal position of the lenses 32 reciprocates in the Z direction, during a single cycle of reciprocation, the distance to the emission position becomes equal to the predetermined distance at two timings. For that reason, it is desirable that the oscillation frequency of the reciprocation of the focal position of the lenses 32 is set to be equal to or greater than a half times of the framerate of the stereoscopic image. Herein, the oscillation frequency (cycle) of the reciprocation of the focal position of the lenses 32 can be set in an arbitrary manner.

The abovementioned example about setting the emission timing is explained below with reference to FIGS. 35 to 37. The following explanation is given about an example in which an image of a house, an image of a vehicle, and an image of a helicopter are displayed as stereoscopic images, and the position in the depth direction (the Z direction) becomes more distant from the eyes EY of the user U in the order of the image of a vehicle, the image of a house, and the image of a helicopter. That is, the virtual image P2 of the image of a vehicle is positioned more on the side in the Z1 direction than the virtual image P1 of the image of a house, and the virtual image P3 of the image of a helicopter is positioned more on the side in the Z2 direction than the virtual image P1 of the image of a house.

In FIG. 35 is illustrated an example in which the user U is made to view the virtual image P1 of the image of a house. In the example illustrated in FIG. 35, the angle θ1A represents the angular aperture of the luminous flux when light is emitted from the virtual image P1 (i.e., from the position in the depth direction of the pixel P constituting the image of a house) onto the eyes EY (i.e., the angle θ1A represents the virtual image angular aperture). Moreover, it is assumed that, when the focal position of the lenses 32 in the Z direction represents the first position, the angular aperture of the luminous flux of the image light L emitted from the pixel P constituting the image of a house becomes equal to the angle θ1A. In that case, the first position represents the emission position for the pixel P constituting the image of a house. Then, the timing setting unit 54 sets, as the emission timing for the pixel P constituting the image of a house, the timing of arrival of the focal point of the lenses 32 to the position at which the distance to the first position falls within a predetermined distance range. Upon arrival of the emission timing, the emission control unit 56 causes the pixel P, which constitutes the image of a house, to emit the image light L. As a result, the virtual image angular aperture attributed to the virtual image P1 of the image of a house gets closer to the angular aperture of the image light L that actually falls onto the eyes EY of the user U, thereby enabling achieving reduction in the convergence/accommodation contradiction. Meanwhile, since the image light L gets refracted from the eyepiece 20 before falling on the eyes EY, the angular aperture of the luminous flux of the image light L implies the angular aperture of the luminous flux of the image light L that has already passed through the eyepiece 20.

In FIG. 36 is illustrated an example in which the user U is made to view the virtual image P2 of the image of a vehicle. In the example illustrated in FIG. 36, the angle θ2A represents the angular aperture of the luminous flux when light is emitted from the virtual image P2 (i.e., from the position in the depth direction of the pixel P constituting the image of a vehicle) onto the eyes EY (i.e., the angle θ2A represents the virtual image angular aperture). Moreover, it is assumed that, when the focal position of the lenses 32 in the Z direction represents a second position, the angular aperture of the luminous flux of the image light L emitted from the pixel P constituting the image of a vehicle becomes equal to the angle θ2A. Meanwhile, since the virtual image P2 is viewable more on the side in the Z1 direction than the virtual image P1, the angle θ2A is greater than the angle θ1A illustrated in FIG. 35. Moreover, as compared to the case in which the first position represents the focal point, in the case in which the second position represents the focal point, there is an increase in the degree of expansion of the angular aperture (or there is a decrease in the degree of contraction of the angular aperture) of the luminous flux attributed to the lenses 32. In that case, the second position represents the emission position for the pixel P constituting the image of a vehicle. Then, the timing setting unit 54 sets, as the emission timing for the pixel P constituting the image of a vehicle, the timing of arrival of the focal point of the lenses 32 to the position at which the distance to the second position falls within a predetermined distance range. Upon arrival of the emission timing, the emission control unit 56 causes the pixel P, which constitutes the image of a vehicle, to emit the image light L. As a result, the virtual image angular aperture attributed to the virtual image P2 of the image of a vehicle gets closer to the angular aperture of the image light L that actually falls onto the eyes EY of the user U, thereby enabling achieving reduction in the convergence/accommodation contradiction.

In FIG. 37 is illustrated an example in which the user U is made to view the virtual image P3 of the image of a helicopter. In the example illustrated in FIG. 37, the angle θ3A represents the angular aperture of the luminous flux when light is emitted from the virtual image P3 (i.e., from the position in the depth direction of the pixel P constituting the image of a helicopter) onto the eyes EY (i.e., the angle θ3A represents the virtual image angular aperture). Moreover, it is assumed that, when the focal position of the lenses 32 in the Z direction represents a third position, the angular aperture of the luminous flux of the image light L emitted from the pixel P constituting the image of a helicopter becomes equal to the angle θ3A. Meanwhile, since the virtual image P3 is viewable more on the side in the Z2 direction than the virtual image P1, the angle θ3A is smaller than the angle θ1A illustrated in FIG. 35. Moreover, as compared to the case in which the first position represents the focal point, in the case in which the third position represents the focal point, there is a decrease in the degree of expansion of the angular aperture (or there is an increase in the degree of contraction of the angular aperture) of the luminous flux attributed to the lenses 32. In that case, the third position represents the emission position for the pixel P constituting the image of a helicopter. Then, the timing setting unit 54 sets, as the emission timing for the pixel P constituting the image of a helicopter, the timing of arrival of the focal point of the lenses 32 to the position at which the distance to the third position falls within a predetermined distance range. Upon arrival of the emission timing, the emission control unit 56 causes the pixel P, which constitutes the image of a helicopter, to emit the image light L. As a result, the virtual image angular aperture attributed to the virtual image P3 of the image of a helicopter gets closer to the angular aperture of the image light L that actually falls onto the eyes EY of the user U, thereby enabling achieving reduction in the convergence/accommodation contradiction.

Meanwhile, in the display device 1, since the emission timing is set for each pixel P, there are also times when only some pixels P in a single frame are turned on. For example, at the timing explained with reference to FIG. 35, only the image of a house is displayed. Similarly, at the timing explained with reference to FIG. 36, only the image of a vehicle is displayed. Moreover, at the timing explained with reference to FIG. 37, only the image of a helicopter is displayed. However, because of the afterimage effect attributed to successive delivery of a plurality of frames, the user U recognizes that a house, a vehicle, and a helicopter are all appearing in a single image. Alternatively, the configuration can be such that the entire image (in the present example, all of the house, the vehicle, and the helicopter) is displayed within the display period of a single frame. In that case, within the display period of a single frame, the drive control unit 52 can move the focal position of the lenses 32 by at least half of the reciprocation cycle. As a result, within the display period of a single frame, all focal positions within the reciprocation can be covered, thereby enabling the display of the entire image.

Flow of Processing

Figure 38:
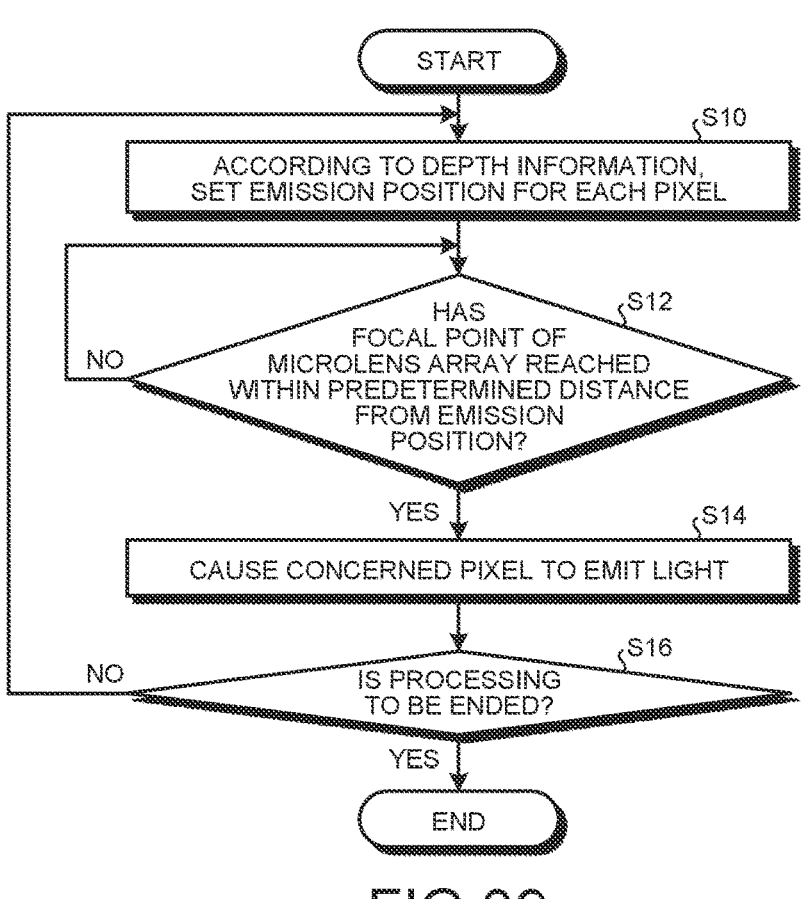
FIG. 38 is a flowchart for explaining a flow of processing performed by the control device according to the ninth embodiment.

Given below is the explanation of a flow of processing performed by the control device 40. FIG. 38 is a flowchart for explaining a flow of processing performed by the control device according to the ninth embodiment. In the control device 40, the drive control unit 52 causes the foal position of the microlens array 30 to reciprocate in the Z direction at regular intervals. Moreover, in the control device 40, the timing setting unit 54 refers to the depth information regarding each pixel P and sets the emission position for each pixel P (Step S10). Then, the control device 40 sequentially acquires the focal position of the microlens array 30 in the Z direction and determines, for each pixel P, whether the focal point of the microlens array 30 has reached within a predetermined distance from the corresponding emission position (Step S12). If the focal point of the microlens array 30 has reached within a predetermined distance (Yes at Step S12), that is, if there is a pixel P regarding which the focal point of the microlens array 30 is determined to have reached within a predetermined distance from the emission position; then the timing setting unit 54 determines that the emission timing for the concerned pixel P has arrived, and the emission control unit 56 causes that pixel P to emit the image light L based on the image data (Step S14). Subsequently, upon arrival of the emission discontinuation timing, the emission control unit 56 causes that pixel P to stop emitting the image light L. After that, if the processing is not to be ended (No at Step S16), then the system control returns to Step S10 and the processing are performed again. Meanwhile, if the focal point of the microlens array 30 has not yet reached within a predetermined distance from the emission position (No at Step S12), that is, if there is no pixel P regarding which the focal point of the microlens array 30 is determined to have reached within a predetermined distance from the emission position; then the system control returns to Step S12 and no pixel P is allowed to emit the light until the focal point of the microlens array 30 reaches within the predetermined distance from the corresponding emission position. Meanwhile, at Step S16, if the processing is to be ended (Yes at Step S16), then it marks the end of the processing.

Effects

As explained above, the display device 1 according to the ninth embodiment provides stereoscopic images to the user U and includes the display unit 10, the microlens array 30, the drive control unit 52, the timing setting unit 54, and the emission control unit 56. The display unit 10 includes a plurality of self-luminous pixels P, and provides stereoscopic images to the user U by ensuring that the image light L emitted from the pixels P reaches the user U. The microlens array 30 is disposed on the side of the user U with respect to the display unit 10 in the optical axis direction of the image light L, and is of the varifocal type. The drive control unit 52 moves the focal position of the microlens array 30 along the optical axis direction of the image light L (in the ninth embodiment, along the Z direction) at regular intervals. Based on the focal position of the microlens array 30 in the optical axis direction (in the ninth embodiment, the Z direction), the timing setting unit 54 sets, for each pixel P, the emission timing regarding the image light L. Upon arrival of the emission timing, the emission control unit 56 causes that pixel P to emit the image light L.

In the case of displaying a stereoscopic image, it is required that the stereoscopic image is provided to the user in an appropriate manner. In that regard, in the ninth embodiment, the focal point of the microlens array 30 is moved in the optical axis direction and, based on the focal position, the emission timing regarding the image light L is set. Thus, according to the ninth embodiment, it can be ensured that the image light L reaches the user U at an appropriate timing based on the focal position in the optical axis direction, thereby making it possible to provide a stereoscopic image to the user U in an appropriate manner. Moreover, as explained above, at the time of displaying a stereoscopic image, there are times when the convergence/accommodation contradiction occurs. In that regard, in the ninth embodiment, the focal point of the microlens array 30 is moved in the optical axis direction and at the same time the emission timing regarding the image light L is set based on the focal position in the optical axis direction. Hence, the angular aperture of the luminous flux of the image light L can be appropriately adjusted and the convergence/accommodation contradiction can be reduced.

Moreover, the timing setting unit 54 sets the emission timing based on the depth information that indicates the position of a stereoscopic image in the depth direction (in the ninth embodiment, the Z direction). According to the ninth embodiment, since the emission timing is set by taking into account the depth information too, the angular aperture of the luminous flux of the image light L can be appropriately adjusted according to the stereoscopic image to be displayed. That enables achieving reduction in the convergence/accommodation contradiction.

Furthermore, the timing setting unit 54 acquires the information about the emission position that represents the focal position of the microlens array 30 in the optical axis direction at which the angular aperture of the luminous flux of the image light L emitted from the concerned pixel P corresponds to the angular aperture of the luminous flux in the case in which the image light L is emitted toward the user U from the position in the depth direction in that part of the stereoscopic image which is displayed using the concerned pixel P (i.e., corresponds to the virtual image angular aperture). The timing setting unit 54 sets, as the emission timing for the concerned pixel P, the timing at which the focal point of the microlens array 30 reaches within a predetermined distance range from the emission position. According to the ninth embodiment, it becomes possible to ensure that only those pixels P emit light for which the angular aperture of the luminous flux and the virtual image angular aperture are close, and that the pixels P for which the angular aperture of the luminous flux and the virtual image angular aperture are not close do not emit light. That enables achieving reduction in the convergence/accommodation contradiction.

The drive control unit 52 varies, in a uniform manner, the focal position of each lens 32 of the microlens array 30 in the Z direction. According to the ninth embodiment, since the angular aperture of the luminous flux is adjusted using the lenses 32, stereoscopic images can be provided to the user U in an appropriate manner.

Meanwhile, the display device 1 is a head-mounted display, because of which stereoscopic images can be provided in an appropriate manner.

Other Examples

In the explanation given above, the display unit 10 is a self-luminous display. However, that is not the only possible case. For example, as another example of the ninth embodiment, the display unit 10 can be configured to include a display panel having a plurality of pixels and a light source unit that emits light onto the display panel. In that case, for example, the display panel is a liquid crystal panel that includes a plurality of pixel electrodes arranged in a matrix and includes a liquid crystal layer filled with liquid crystal elements. For example, the light source unit can be a backlight that is disposed on the back surface of the display panel, or can be a sidelight that is disposed on a lateral surface of the display panel. In such a configuration, the light source unit emits light uniformly onto all pixels of the display panel. In other words, the light source unit does not perform the light emission control for each pixel on an individual basis. However, the light source unit is not limited to emit light uniformly onto all pixels of the display panel. Alternatively, for example, the light source unit can be of the local dimming type in which the emission of light can be adjusted for groups of a plurality of pixels. For example, the entire screen can be partitioned into a few sections and the light intensity can be adjusted on a section-by-section basis.

In this example, since the light emission control cannot be performed on the pixel-by-pixel basis, it is desirable that a sensor (an eye gaze detection unit) is disposed for detecting the direction of orientation of the eyes EY of the user U, that is, detecting the eye gaze of the user U. Then, based on the eye gaze detection result regarding the user U as acquired by the eye gaze detection unit, the timing setting unit 54 detects the gazing position at which the user U is looking fixedly. The gazing position implies the position of the image, from among the stereoscopic images, on the display surface 10A at which the user U is looking fixedly. In other words, the gazing position implies that position in the entire display surface 10A at which the user U is looking fixedly. The timing setting unit 54 sets the emission timing based on the eye gaze detection result regarding the user U, based on the depth information regarding the stereoscopic image, and based on the focal position of the microlens array 30 in the Z direction. More particularly, the timing setting unit 54 sets the emission timing based on the depth information regarding the gazing position (i.e., based on a position in the depth direction of the gazing position). Moreover, the timing setting unit 54 sets, as the emission position, the focal position of the microlens array 30 in the Z direction at the time when the angular aperture of the image light L matches with the angular aperture of the luminous flux attributed to the emission of light from the position in the depth direction of the gazing position (i.e., from the position of the virtual image being gazed by the user U) onto the eyes EY (i.e., matches with the virtual image angular aperture). Then, at the emission timing at which the focal position reaches within a predetermined distance range from the emission position, the emission control unit 56 causes the light source unit to emit light, so that the image light L is emitted from all pixels. In this example, since the virtual image angular aperture at the gazing position at which the user U is looking fixedly matches with the angular aperture of the image light L, it becomes possible to hold down the convergence/accommodation contradiction. Meanwhile, at a distant position from the gazing position, the virtual image angular aperture does not match with the angular aperture of the image light L. However, since such a position is out of range of the region being gazed by the user U, the user U is not affected much by it.

Tenth Embodiment

Given below is the description of the tenth embodiment. The tenth embodiment differs from the ninth embodiment in the way that the focal position of each lens of a microlens array is individually adjustable. In the tenth embodiment, regarding identical constituent elements to the ninth embodiment, the explanation is not repeated.

Figure 39:
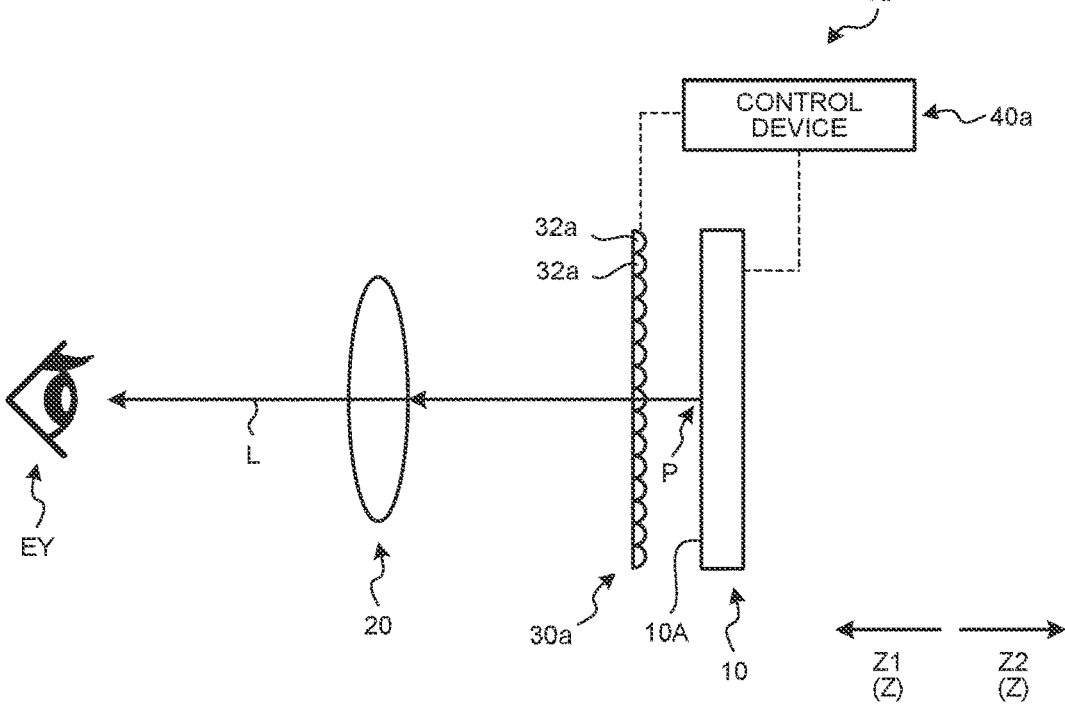
FIG. 39 is a schematic diagram illustrating the constituent elements of a display device according to a tenth embodiment.

FIG. 39 is a schematic diagram illustrating the constituent elements of the display device according to the tenth embodiment. As illustrated in FIG. 39, the display device 1a according to the tenth embodiment includes the display unit 10, the eyepiece 20, a microlens array 30a, and a control device 40a. In the following explanation, the display unit 10 according to the tenth embodiment is assumed to be a self-luminous display in an identical manner to the ninth embodiment. However, alternatively, the display unit 10 can be a display that includes a light source unit and a display panel as explained in the other example of the ninth embodiment. In the tenth embodiment, even if a display including a light source unit and a display panel is used (i.e., even if light emission cannot be controlled on a pixel-by-pixel basis), the eye gaze of the user U need not be detected.

Regarding the microlens array 30a, the difference from the ninth embodiment is that the focal points of a plurality of lenses 32a can be varied on an individual basis. That is, the microlens array 30a according to the tenth embodiment can be called an active-matrix varifocal microlens array. The microlens array 30a receives, from the control device 40a, a control signal meant for controlling the microlens array 30a.

Figure 40:
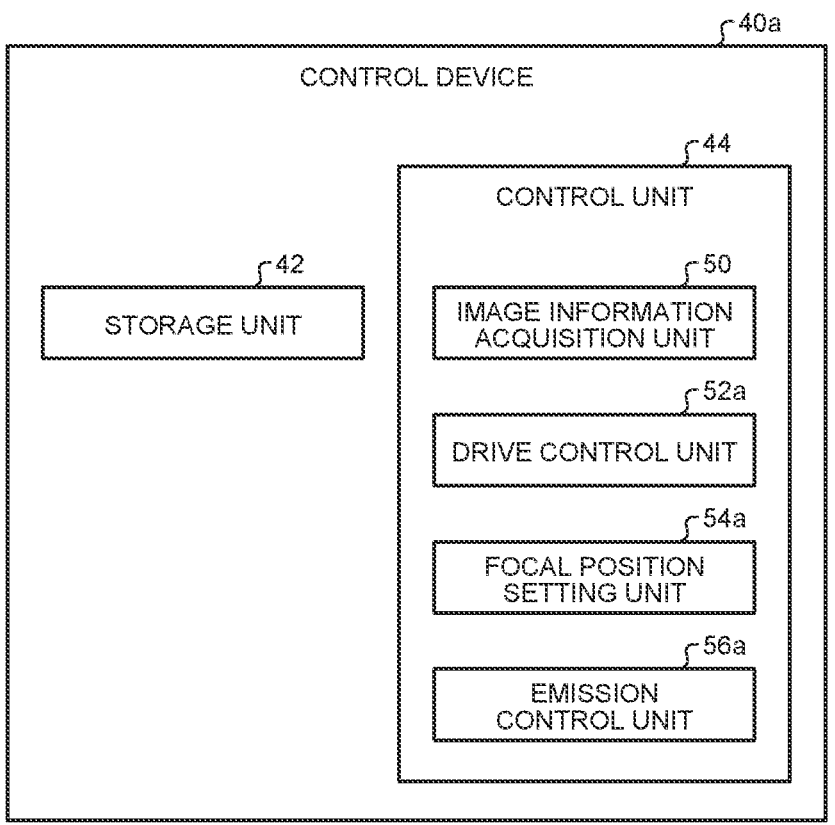
FIG. 40 is a schematic block diagram of the control device according to the tenth embodiment.

FIG. 40 is a schematic block diagram of the control device according to the tenth embodiment. As illustrated in FIG. 40, the control unit 44 of the control device 40a according to the tenth embodiment includes the image information acquisition unit 50, a drive control unit 52a, a focal position setting unit 54a, and an emission control unit 56a. The control unit 44 reads computer programs (software) from the storage unit 42 and executes them so as to implement the image information acquisition unit 50, the drive control unit 52a, the focal position setting unit 54a, and the emission control unit 56a and to perform their processing. Meanwhile, the control unit 44 either can perform those processing using a single CPU, or can include a plurality of CPUs and can perform the processing using those CPUs. Meanwhile, at least one of the image information acquisition unit 50, the drive control unit 52a, the focal position setting unit 54a, and the emission control unit 56a can be implemented using a hardware circuit.

In the tenth embodiment, based on the image data, the emission control unit 56a causes each pixel P to emit the image light L. In the tenth embodiment, the emission timing regarding the image light L is not controlled according to the focal position of the microlens array, and each pixel P can be made to emit the image light L according to the image data.

In the tenth embodiment, the focal position setting unit 54a acquires the depth information regarding each pixel P. That is, the focal position setting unit 54a acquires, for each pixel P, the information about a position in the depth direction (the Z direction). Then, based on the depth information regarding each pixel P, the focal position setting unit 54a sets a setup focal position that represents the focal position of that lens 32a which is placed opposite to the concerned pixel P at the time of causing that pixel P to emit the image light L. It can be said that the lens 32a placed opposite to the concerned pixel P is the lens 32a on which the image light L emitted from the concerned pixel P falls. In the following explanation, such a lens 32a is referred to as an opposite lens.

The focal position setting unit 54a sets, as the setup focal position of the concerned opposite lens, the focal position of the concerned opposite lens at the time when the angular aperture of the image light L that is actually emitted from the concerned pixel P onto the eyes EY through the corresponding opposite lens matches with the angular aperture of the luminous flux in the case in which light is emitted onto the eyes EY from the position in the depth direction of that part of the stereoscopic image which is displayed due to the concerned pixel P (i.e., from the position of the virtual image formed by the concerned pixel P). However, the setup focal position is not limited to be set as the position at which the virtual image angular aperture exactly matches with the actual angular aperture of the image light L. Alternatively, for example, when the difference between the virtual image angular aperture and the actual angular aperture of the image light L is within a predetermined range, the focal position of the opposite lens can be set as the setup focal position. However, in order to reduce the convergence/accommodation contradiction, it is desirable that the setup focal position is set to such a value that the difference between the virtual image angular aperture and the angular aperture of the image light L becomes smaller. Moreover, as the position in the depth direction of the pixel P which is to be used in setting the setup focal position, the focal position setting unit 54a can use a value obtained by quantizing the depth direction. That is, for example, the depth direction is segmented into a plurality of numerical ranges and, for each numerical range, a predetermined value within that numerical range is set as the reference position. Then, the focal position setting unit 54a extracts the numerical range that includes the position in the depth direction of the concerned pixel P as acquired by the image information acquisition unit 50, and treats the reference position of that numerical range as the position in the depth direction of the pixel P which is to be used in setting the setup focal position.

The focal position setting unit 54a sets the setup focal position for each opposite lens (each lens 32a). However, the setup focal position is not limited to be different for each lens 32a. For example, for a group of lenses 32a that are placed opposite to the pixels P constituting a single image (for example, a group of pixels P displaying the image of a house in FIG. 35), the setup focal position can be set to be identical.

The drive control unit 52a moves the focal position of the concerned lens 32a in the Z direction to the setup focal position. The drive control unit 52a individually controls the focal position of each lens 32a in the Z direction, and thus sets the focal point of each lens 32a to the corresponding setup focal position. In the tenth embodiment, as a result of setting the focal position of each lens 32a, the virtual image angular aperture and the angular aperture of the image light L can be constantly kept identical in the entire region of the display surface 10A.

Figure 41:
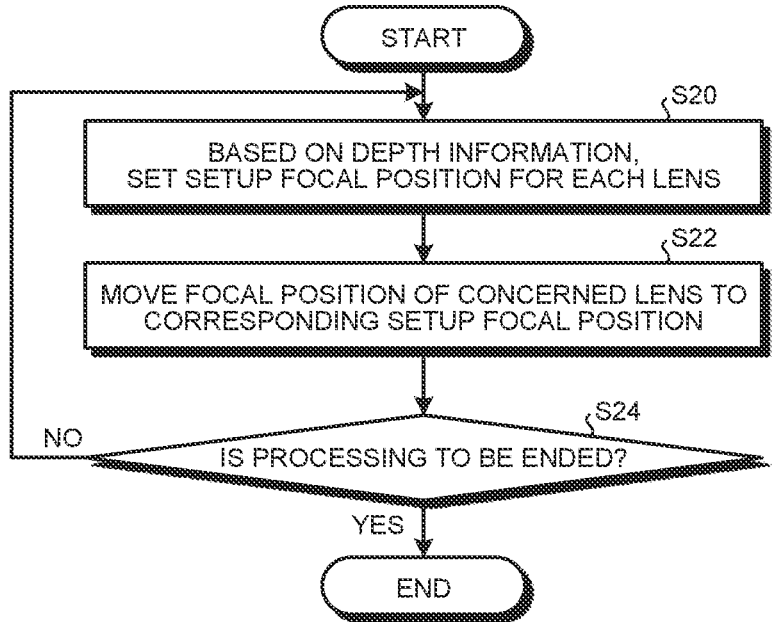
FIG. 41 is a flowchart for explaining a flow of processing performed by a control device according to the tenth embodiment.

Given below is the explanation of a flow of processing performed by the control device 40a according to the tenth embodiment. FIG. 41 is a flowchart for explaining a flow of processing performed by the control device according to the tenth embodiment. In the control device 40a, the focal position setting unit 54a refers to the depth information regarding each pixel P and accordingly sets the setup focal position of the corresponding lens 32a (Step S20). Then, in the control device 40, the drive control unit 52a moves the focal position of each lens 32a to the corresponding setup focal position (Step S22). In accordance with that, based on the image data, the control device 40 causes each pixel P to emit the image light L, and positions the focal position of each lens 32a to the corresponding setup focal position. After that, if the processing is not to be ended (No at Step S24), then the system control returns to Step S20 and the processing are performed again. When the processing is to be ended (Yes at Step S24), then it marks the end of the processing.

As explained above, the display device 1a according to the tenth embodiment provides stereoscopic images to the user U and includes the display unit 10, the microlens array 30a, the focal position setting unit 54a, and the drive control unit 52a. The display unit 10 includes a plurality of pixels, and provides stereoscopic images to the user U by ensuring that the image light L reaches the user U. The microlens array 30a is disposed on the side of the user U with respect to the display unit 10 in the optical axis direction of the image light L. The microlens array 30a includes a plurality of lenses 32a, and enables variation in the focal point of each lens 32a on an individual basis. Based on the depth information indicating the position of the stereoscopic image in the depth direction, the focal position setting unit 54a sets, for each lens 32a, the setup focal position that represents the focal position in the optical axis direction of image light L. The drive control unit 52a moves the focal position of each lens 32a to the corresponding setup focal position.

In the case of displaying a stereoscopic image, it is required that the stereoscopic image is provided to the user in an appropriate manner. In that regard, in the tenth embodiment, the focal position of each lens 32a is moved to the corresponding setup focal position that is set based on the position of the stereoscopic image in the depth direction. Thus, according to the tenth embodiment, it can be ensured that the image light L reaches the user U at an appropriate angular aperture of the luminous flux based on the position of the stereoscopic image in the depth direction. As a result, it becomes possible to provide a stereoscopic image to the user U in an appropriate manner. Moreover, as explained above, at the time of displaying a stereoscopic image, there are times when the convergence/accommodation contradiction occurs. In that regard, in the tenth embodiment, the angular aperture of the image light L can be appropriately adjusted and the convergence/accommodation contradiction can be reduced. Moreover, in the tenth embodiment, since the focal position of each lens 32a is set on an individual basis, the virtual image angular aperture and the angular aperture of the image light L can be constantly kept identical in the entire region of the display surface 10A.

The focal position setting unit 54a sets, as the setup focal position of the concerned lens 32a, such a focal position of the concerned lens 32a in the optical axis direction of the image light L at which the difference between the angular aperture of the luminous flux of the image light L passing through the concerned lens 32a and the angular aperture of the luminous flux in the case in which light is emitted toward the user U from the position in the depth direction of that part of the stereoscopic image which is displayed using the image light L (i.e., the virtual image angular aperture) falls within a predetermined range. According to the tenth embodiment, as a result of reducing the difference between the angular aperture of the luminous flux and the virtual image angular aperture, it becomes possible to reduce the convergence/accommodation contradiction.

Meanwhile, as explained earlier in the other example, the display unit 10 according to the tenth embodiment too can be configured to include a display panel having a plurality of pixels and a light source unit that emits light onto the display panel. Alternatively, the display unit 10 according to the tenth embodiment can be configured to include a plurality of self-luminous pixels P. In either case, stereoscopic images can be provided to the user U in an appropriate manner.

Modification Example

Given below is the explanation of a modification example. The display device 1*b* according to the modification example differs from the tenth embodiment in the way that the display is expanded using the concave mirror 20C, and the eyepiece 20 is not used. In the modification example, regarding identical constituent elements to the tenth embodiment, the explanation is not repeated.

Figure 42:
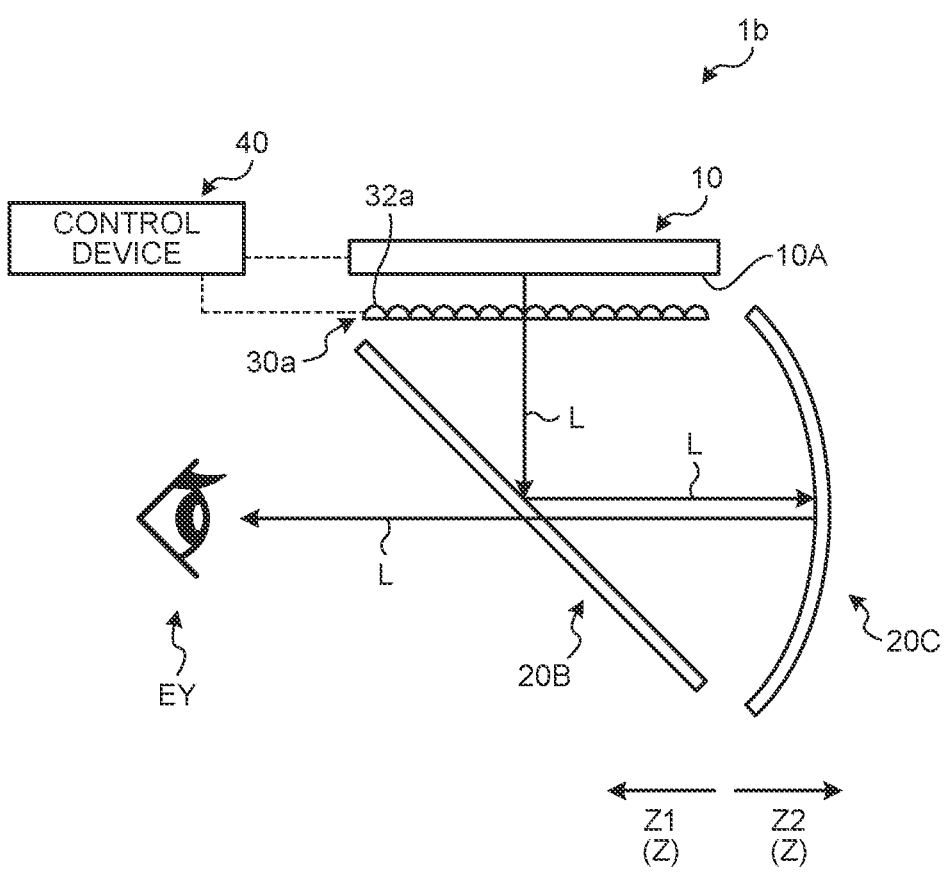
FIG. 42 is a schematic diagram of a display device according to a modification example.

FIG. 42 is a schematic diagram of the display device according to the modification example. As illustrated in FIG. 42, in the display device 1*b* according to the modification example, the eyepiece 20 is not disposed, and the half mirror 20B and the concave mirror 20C are disposed on the side of the eyes EY of the user U with respect to the display unit 10 in the optical axis direction of the image light L. The half mirror 20B and the concave mirror 20C can also be treated as optical elements. In the modification example, the image light L emitted from the display unit 10 gets reflected from the half mirror 20B and falls onto the concave mirror 20C. The image light L that falls onto the concave mirror 20C becomes almost a parallel light while having a slight spread angle at the concave mirror 20C, and then passes through the half mirror 20B and falls onto the eyes EY of the user U.

In the modification example, in an identical manner to the tenth embodiment, the focal position of each lens 32*a* of the microlens array 30*a* is controlled on an individual basis. Even with the configuration as explained in the modification example, in an identical manner to the second embodiment, it becomes possible to appropriately provide stereoscopic images to the user U and to appropriately adjust the aperture angle of the luminous flux of the image light L. That enables enabling achieving reduction in the convergence/accommodation contradiction.

Meanwhile, the modification example is applicable in the ninth embodiment too. Moreover, the configuration of the display device can be different than the configurations according to the embodiments or the configuration according to the modification example explained with reference to FIG. 42.

Eleventh Embodiment to Thirteenth Embodiment

Figure 43:
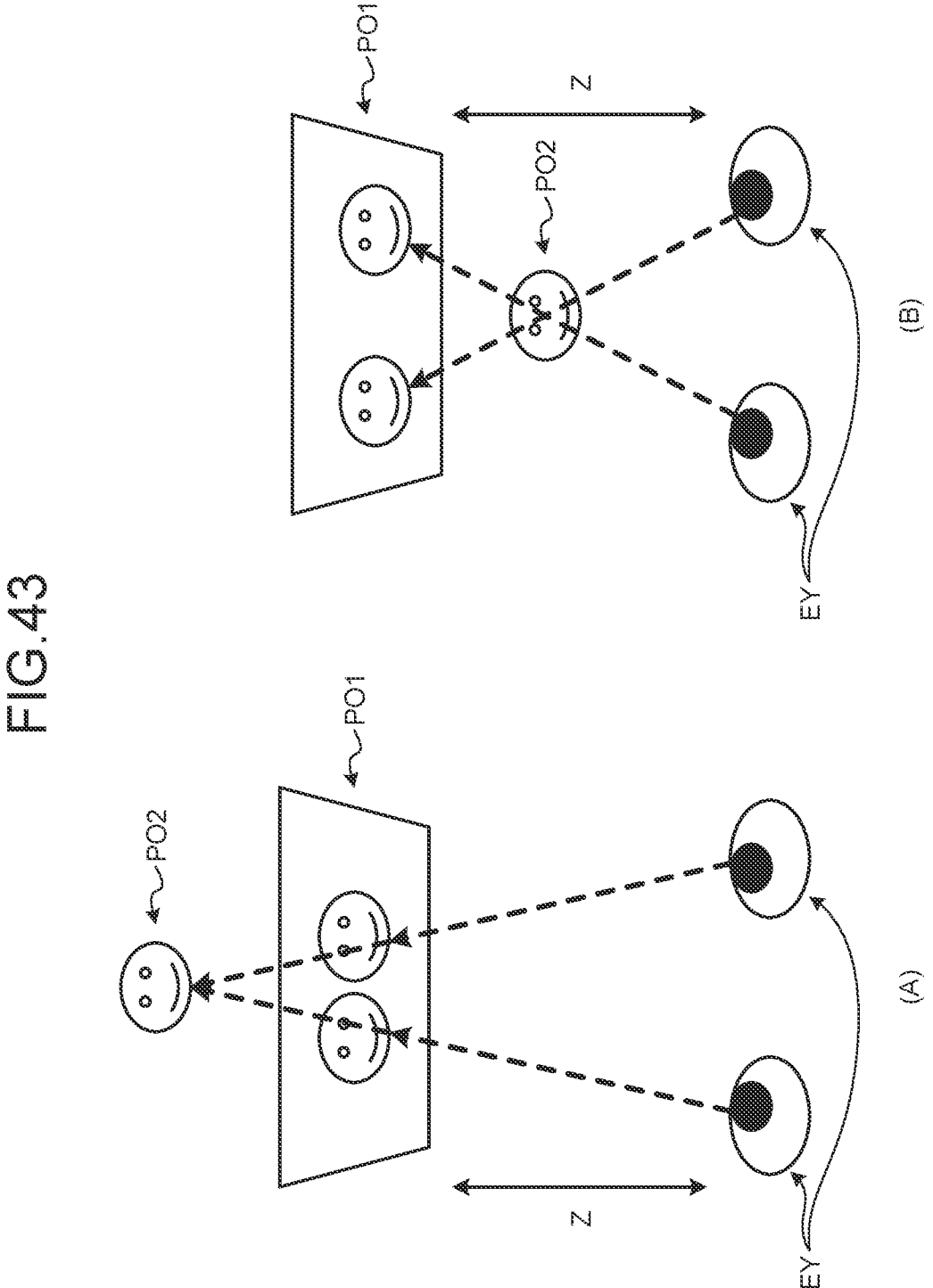
FIG. 43 is a schematic diagram for explaining the convergence/accommodation contradiction.

Given below is the description of embodiments from an eleventh embodiment to a thirteenth embodiment.
Convergence/Accommodation Contradiction FIG. 43 is a schematic diagram for explaining the convergence/accommodation contradiction. A display device, which is configured to display stereoscopic images, causes the right and left eyes of the user to view images having different parallaxes, and displays a stereoscopic image by making use of the variation in the convergence. In the case of displaying a stereoscopic image, the display surface on which the image is actually displayed serves as the focal position of the eyes of the user, and the position at which the lines of sight of the right and left eyes intersect represents the convergence position. However, as illustrated in FIG. 43, in a stereoscopic image, there are times when the focal position PO1 and the convergence position PO2 become misaligned in the Z direction representing the depth direction of the stereoscopic image. If the focal position PO1 and the convergence position PO2 become misaligned, it results in what is called the convergence/accommodation contradiction that is responsible for the eye fatigue or for what is called 3D sickness. For that reason, there is a demand for ensuring that the convergence/accommodation contradiction is held down. Meanwhile, in (A) in FIG. 43, an example is illustrated in which, as compared to the convergence position PO2, the focal position PO1 is closer to eyes EY of the user. On the other hand, in (B) in FIG. 43, an example is illustrated in which, as compared to the focal position PO1, the convergence position PO2 is closer to eyes EY of the user.

Eleventh Embodiment

Overall Configuration of Display Device

Figure 44:
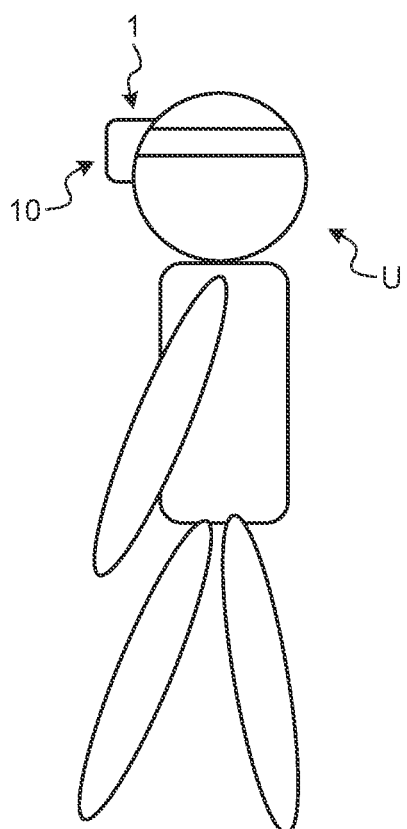
FIG. 44 is a schematic diagram of a display device according to an eleventh embodiment.

FIG. 44 is a schematic diagram of a display device according to the eleventh embodiment. The display device 1 according to the eleventh embodiment is configured to display stereoscopic images. As illustrated in FIG. 44, the display device 1 is what is called a head-mounted display (HMD) that is mounted in the head region of the user U. For example, of the display device 1, the display unit 10 is mounted to face toward the eyes EY of the user U. The display device 1 displays images in the display unit 10 and provides contents to the user U. Meanwhile, the configuration of the display device 1 illustrated in FIG. 44 is only exemplary. Alternatively, for example, the display device 1 can include a sound output unit (speaker) that is mounted on an ear of the user U.

As a result of mounting the display device 1 on the user U in the manner explained above, the position of the display device 1 with respect to the eyes EY of the user U gets fixed. The display device 1 is not limited to be an HMD mounted on the user U, and can alternatively be a display device fixed to an equipment. In that case too, it is desirable that the position of the display device 1 with respect to the eyes EY of the user U is fixed. For example, it is desirable that the position of the display device 1 is fixed with respect to the seat on which the user U is sitting.

Figure 45:
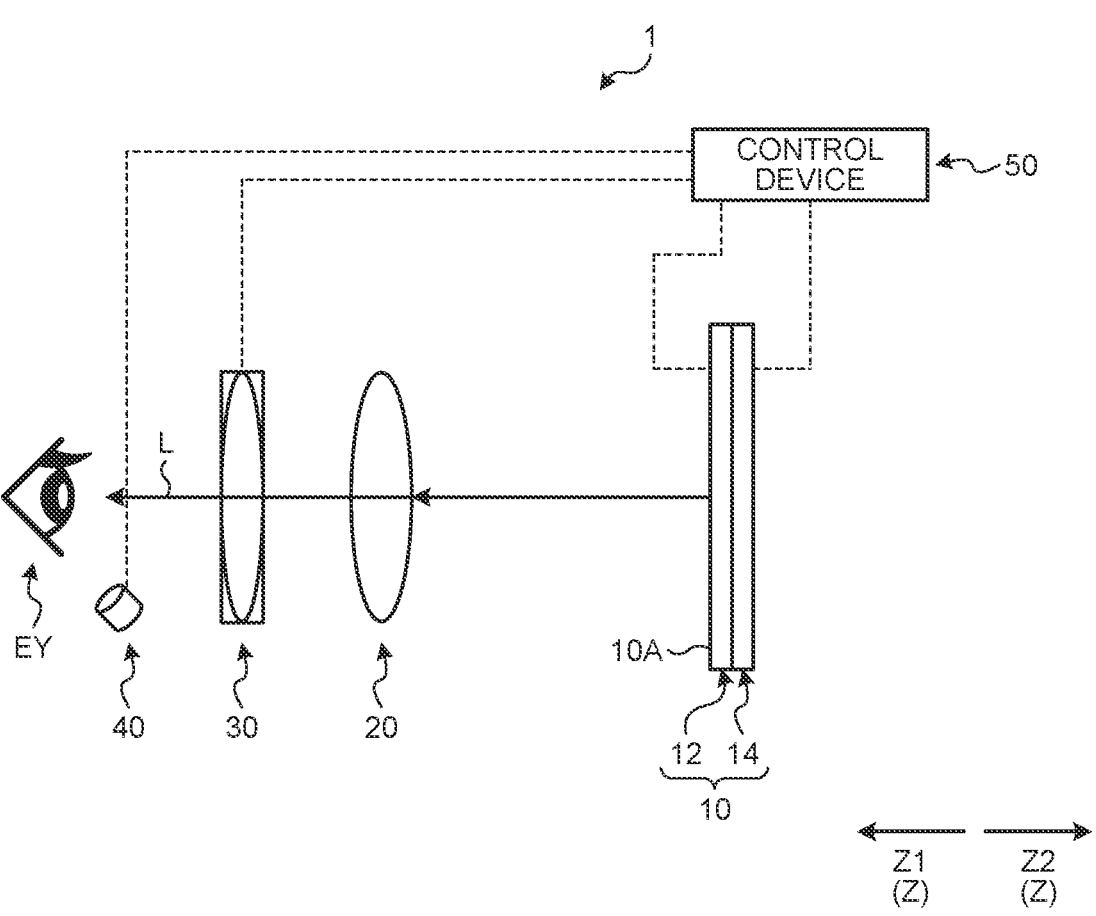
FIG. 45 is a schematic diagram illustrating the constituent elements of the display device according to the eleventh embodiment.

FIG. 45 is a schematic diagram illustrating the constituent elements of the display device according to the eleventh embodiment. As illustrated in FIG. 45, the display device 1 includes the display unit 10, the eyepiece 20, a lens 30, the eye gaze detection unit 40, and a control device 50.
Display Unit The display unit 10 is a device for displaying stereoscopic images. The display unit 10 includes the display panel 12 and the light source unit 14. The display panel 12 is a display including a plurality of pixels arranged in a matrix. In the example explained in the eleventh embodiment, the display panel 12 is a liquid crystal panel that includes a plurality of pixel electrodes arranged in a matrix and includes a liquid crystal layer filled with liquid crystal elements. Herein, the display surface 10A represents that surface of the display panel 12 on which images are displayed. In the following explanation, the direction from the display surface 10A toward the eyes EY of the user U is referred to as the Z1 direction; and the direction opposite to the Z1 direction, that is, the direction from the eyes EY of the user U toward the display surface 10A is referred to as the Z2 direction. When the directions Z1 and Z2 need not be distinguished from each other, they are referred to as the Z direction. In FIG. 45, the display surface 10A represents that surface of the display panel 12 which is present on the side of the eyes EY of the user U. However, the display surface 10A is not limited to be the surface present on the side of the eyes EY of the user U. Alternatively, the display surface 10A can be present more on the inner side than the surface on the side of the eyes EY of the user U. Meanwhile, the display unit 10 receives, from the control device 50 (explained later), a driving signal meant for driving the display panel 12 and a control signal meant for controlling the emission timing regarding the light emitted from the light source unit.

The light source unit 14 is a light source that emits light onto the display panel 12. In the eleventh embodiment, the light source unit 14 is what is called a backlight that is disposed on the surface on the opposite side of the display surface 10A of the display panel 12. The position at which the light source unit 14 is disposed is not limited to the position mentioned above, and can be an arbitrary position. For example, the light source unit 14 can be a sidelight disposed beside the display panel 12. In the eleventh embodiment, the light source unit 14 emits light uniformly onto all pixels of the display panel 12. In other words, the light source unit 14 does not perform the light emission control for each pixel on an individual basis. However, the light source unit 14 is not limited to emit light uniformly onto all pixels of the display panel 12. Alternatively, for example, the light source unit 14 can be of the local dimming type in which the emission of light can be adjusted for groups of a plurality of pixels. For example, the entire screen can be partitioned into a few sections and the light intensity can be adjusted on a section-by-section basis.

In this way, the display unit 10 includes the display panel 12 and the light source unit 14. The display unit 10 ensures that the image light L, which is emitted from the light source unit 14 onto the display panel 12, reaches the eyes EY of the user U, and thus provides stereoscopic images to the user U. In the example explained in the eleventh embodiment, the light emitted from the light source unit 14 passes through the pixels of the display panel 12, and falls onto the eyes EY of the user U as the image light L. More specifically, in order to ensure that a left-eye image and a right-eye image are provided, for example, the pressure of the pixel electrodes is controlled and at the same time the light coming from the light source unit 14 is emitted toward the display panel 12. Of the light coming from the light source unit 14, the image light L that passes through the pixels corresponding to the left-side image falls onto the left eye of the user U, and the image light L that passes through the pixels corresponding to the right-side image falls onto the right eye of the user U. As a result, a stereoscopic image is provided to the user U.

Meanwhile, the configuration of the display unit 10 is not limited to the configuration explained above. Alternatively, for example, the display unit 10 can be, for example, a self-luminous display enabling lighting control on a pixel-by-pixel basis, such as an organic light emitting diode (OLED) or what is called a micro LED. Alternatively, the display unit 10 can be a reflective liquid crystal display device.

Eyepiece

The eyepiece 20 is disposed in the Z1 direction with reference to the display unit 10. The eyepiece 20 is an optical element that lets light (the image light) pass therethrough. Moreover, the eyepiece 20 is that optical element (lens) in the display device 1 which, except for the lens 30, is present closest to the eyes EY of the user U. The image light L coming from the display panel 12 passes through the eyepiece 20 and the lens 30, and then falls onto the eyes EY of the user U. Meanwhile, in the eleventh embodiment, in the light path of the image light L from the lens 30 to the eyes EY of the user U, the optical axis direction can be treated as the Z direction.

In the example illustrated in FIG. 45, only the eyepiece 20 and the lens 30 are illustrated as the optical elements present on the side in the Z1 direction with reference to the display unit 10. However, that is not the only possible case, and other optical elements other than the eyepiece 20 and the lens 30 can also be disposed on that side.

Lens

The lens 30 is disposed on the side of the user U with respect to the display unit 10 in the optical axis direction of the image light L. More particularly, the lens 30 is disposed on the side of the user U with respect to the eyepiece 20. However, that is not the only possible case. Alternatively, the lens 30 can be disposed on the side of the display unit 10 with respect to the eyepiece 20. The lens 30 is what is called a varifocal lens because the focal position thereof in the Z direction (i.e., in the optical axis direction of the image light L) is variable. The lens 30 can have an arbitrary structure. For example, the thickness of the lens 30 can be varied by applying a voltage, and accordingly the focal position can be varied. More specifically, for example, the lens 30 includes a lens core made of an optical liquid sealed in an elastic polymer film, and includes an electromagnetic actuator attached to the lens core. The actuator is driven when a voltage is applied thereto. The lens core receives pressure from the actuator and undergoes deformation. Accordingly, the thickness of the lens 30 can be varied and the focal position thereof can be varied. Moreover, the actuator of the lens 30 receives, from the control device 50 (explained later), a signal meant for controlling the focal position.

Eye Gaze Detection Unit

The eye gaze detection unit 40 detects the direction of orientation of the eyes EY of the user U, that is, detects the eye gaze of the user U. The eye gaze detection unit 40 can be an arbitrary sensor enabling detection of the eye gaze of the user U. For example, the eye gaze detection unit 40 can be a camera that takes images of the eyes EY of the user U. The eye gaze detection unit 40 sends the eye gaze detection result to the control device 50.

Control Device

Figure 46:
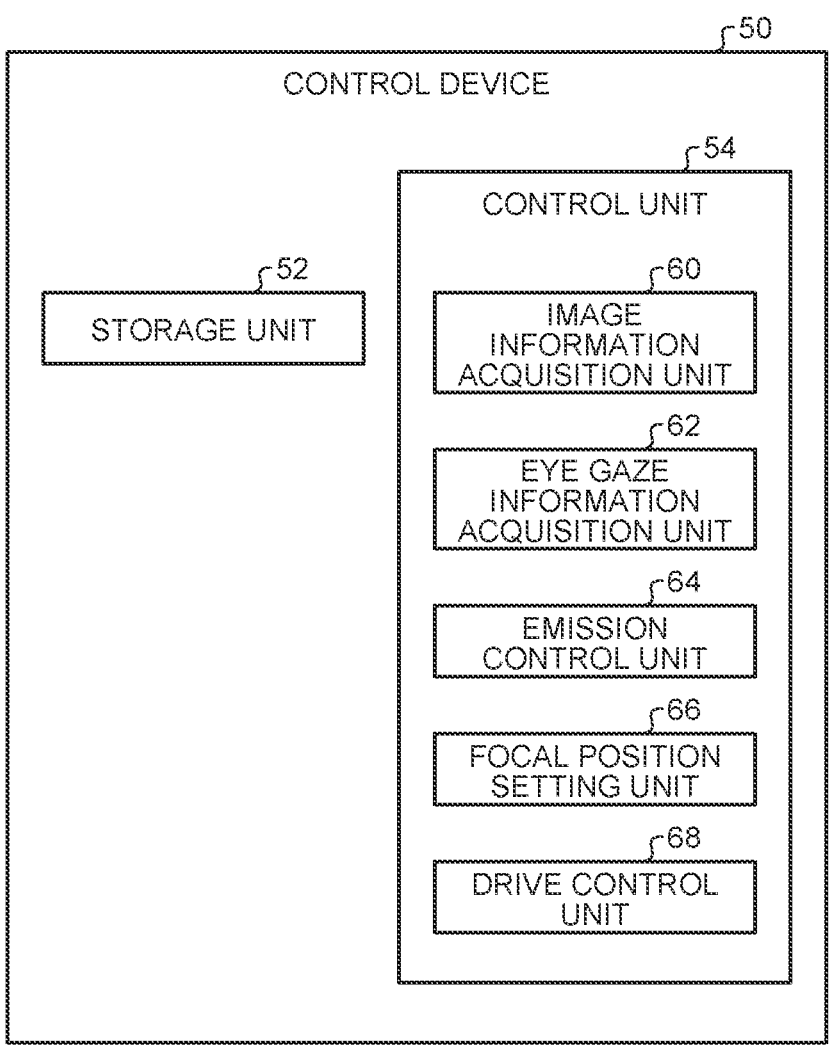
FIG. 46 is a schematic block diagram of a control device according to the eleventh embodiment.

The control device 50 controls the constituent elements of the display device 1. FIG. 46 is a schematic block diagram of the control device according to the eleventh embodiment. In the eleventh embodiment, the control device 50 is a computer and includes a storage unit 52 and a control unit 54. The storage unit 52 is a memory used to store the computational details of the control unit 54 and to store a variety of information such as computer programs. For example, the storage unit 52 includes at least either a main storage device such as a random access memory (RAN) or a read only memory (ROM), or an external storage device such as a hard disk drive. The computer programs written for the control unit 54 and stored in the storage unit 52 can be alternatively stored in a recording medium that is readable by the control device 50.

The control unit 54 is an arithmetic device that includes an arithmetic circuit such as a central processing unit (CPU). The control unit 54 includes an image information acquisition unit 60, an eye gaze information acquisition unit 62, an emission control unit 64, a focal position setting unit 66, and a drive control unit 68. The control unit 54 reads computer programs (software) from the storage unit 52 and executes them so as to implement the image information acquisition unit 60, the eye gaze information acquisition unit 62, the emission control unit 64, the focal position setting unit 66, and the drive control unit 68 and to perform their processing. Meanwhile, the control unit 54 either can perform those processing using a single CPU, or can include a plurality of CPUs and can perform the processing using those CPUs. Meanwhile, at least one of the image information acquisition unit 60, the eye gaze information acquisition unit 62, the emission control unit 64, the focal position setting unit 66, and the drive control unit 68 can be implemented using a hardware circuit.

Image Information Acquisition Unit

The image information acquisition unit 60 acquires image data of each stereoscopic image that is displayed in the display unit 10. That is, the image information acquisition unit 60 acquires image data of a left-eye image and acquires image data of a right-eye image. Moreover, the image information acquisition unit 60 acquires depth information indicating the position of a stereoscopic image in the depth direction. The position of a stereoscopic image in the depth direction implies the position of a virtual image in the depth direction that is viewed by the user U when an image is displayed on the display surface 10A. The depth direction can also be said to be the direction orthogonal to the display surface 10A of the display unit 10. In the eleventh embodiment, the Z direction represents the depth direction. Meanwhile, the depth information is associated to the image data. Moreover, in a stereoscopic image, regarding each image included in a single frame, the position in the depth direction is set. In other words, for each position on the display surface 10A, the position in the depth direction is set. Hence, it can be said that, regarding a stereoscopic image, the image information acquisition unit 60 acquires the depth information regarding each position on the display surface 10A. Meanwhile, in a stereoscopic image, the position in the depth direction is set for each pixel. However, alternatively, for a plurality of pixels constituting a single image, the position in the depth direction can be set to be identical. The image information acquisition unit 60 can acquire the image data and the depth information according to an arbitrary method, such as by reading the image data and the depth information stored in advance in the storage unit 52 or by receiving the image data and the depth information via a communication unit (not illustrated). Alternatively, the image information acquisition unit 60 can calculate the positions in the depth direction based on the image data, and thus acquire the depth information.

Eye Gaze Information Acquisition Unit

The eye gaze information acquisition unit 62 controls the eye gaze detection unit 40 and causes it to detect the eye gaze of the user U, and acquires the eye gaze detection result from the eye gaze detection unit 40. In the eleventh embodiment, based on the eye gaze detection result, the eye gaze information acquisition unit 62 detects the gazing position in the stereoscopic image at which the user U is looking fixedly. The gazing position implies that position of the image, from among the stereoscopic image, on the display surface 10A at which the user U is looking fixedly. In other words, the gazing position implies that position in the entire display surface 10A at which the user U is looking fixedly. In the eleventh embodiment, the eye gaze information acquisition unit 62 acquires the convergence position of the user U from the eye gaze detection result regarding the user U and detects, as the gazing position, the position on the display surface 10A of that image which corresponds to the virtual image at the position overlapping with the convergence position. That is, for example, when the convergence position of the user U overlaps with the virtual image of a vehicle in a stereoscopic image, the position of the image of a vehicle on the display surface 10A is treated as the gazing position. However, that is not the only possible method for detecting the gazing position. Alternatively, the gazing position can be detected according to an arbitrary method using the eye gaze detection result regarding the user U.

Emission Control Unit

The emission control unit 64 controls, based on the image data, emission of the image light L from the display unit 10 toward the user U. In the eleventh embodiment, the emission control unit 64 drives the pixels of the display panel 12 based on the image data and at the same time causes the light source unit 14 to emit light so that the image light L is emitted from each pixel toward the user U and a stereoscopic image is provided to the user U. More particularly, based on the image data, the emission control unit 64 controls the applied voltage on each pixel electrode of the display panel 12 and aligns the liquid crystal elements, and at the same time causes the light source unit 14 to emit light. As a result, the light coming from the light source unit 14 passes through the liquid crystal layer and is emitted toward the eyes EY of the user U as the image light L to be used for stereoscopic images. Meanwhile, for example, when the display unit 10 is a self-luminous display unit, the emission control unit 64 causes each pixel to emit light based on the image data, so that the image light L is emitted from each pixel.

Focal Position Setting Unit

Based on the eye gaze detection result regarding the user U, the focal position setting unit 66 sets a setup focal position that represents the focal position of the lens 30 in the optical axis direction (the Z direction) of the image light L. Moreover, based on the eye gaze detection result regarding the user U and based on the depth information regarding the stereoscopic image, the focal position setting unit 66 sets the setup focal position. Given below is the specific explanation about the setting of the setup focal position.

Figure 47:
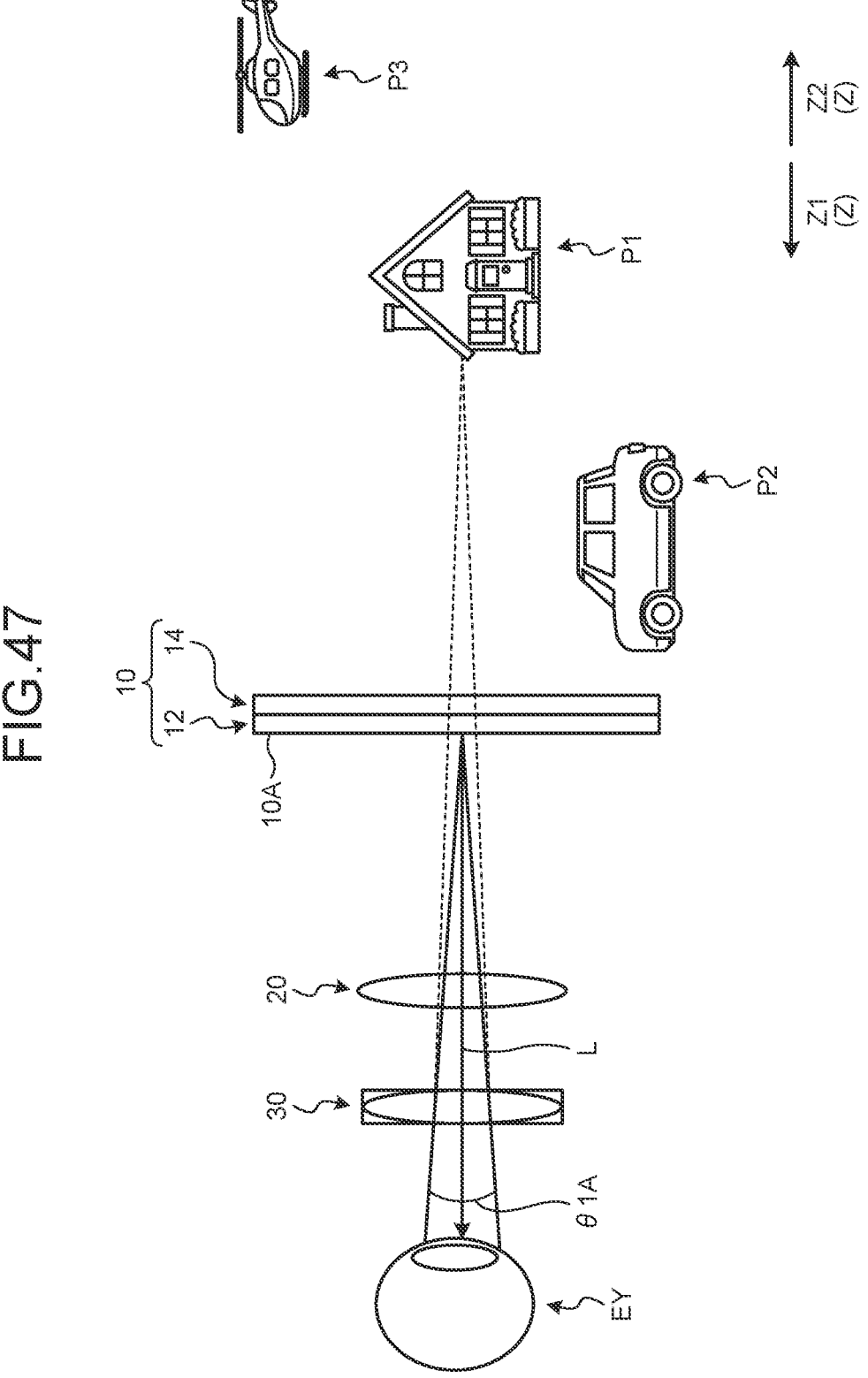
FIGS. 47 to 49 are schematic diagrams for explaining about setting an emission timing.
Figure 48:
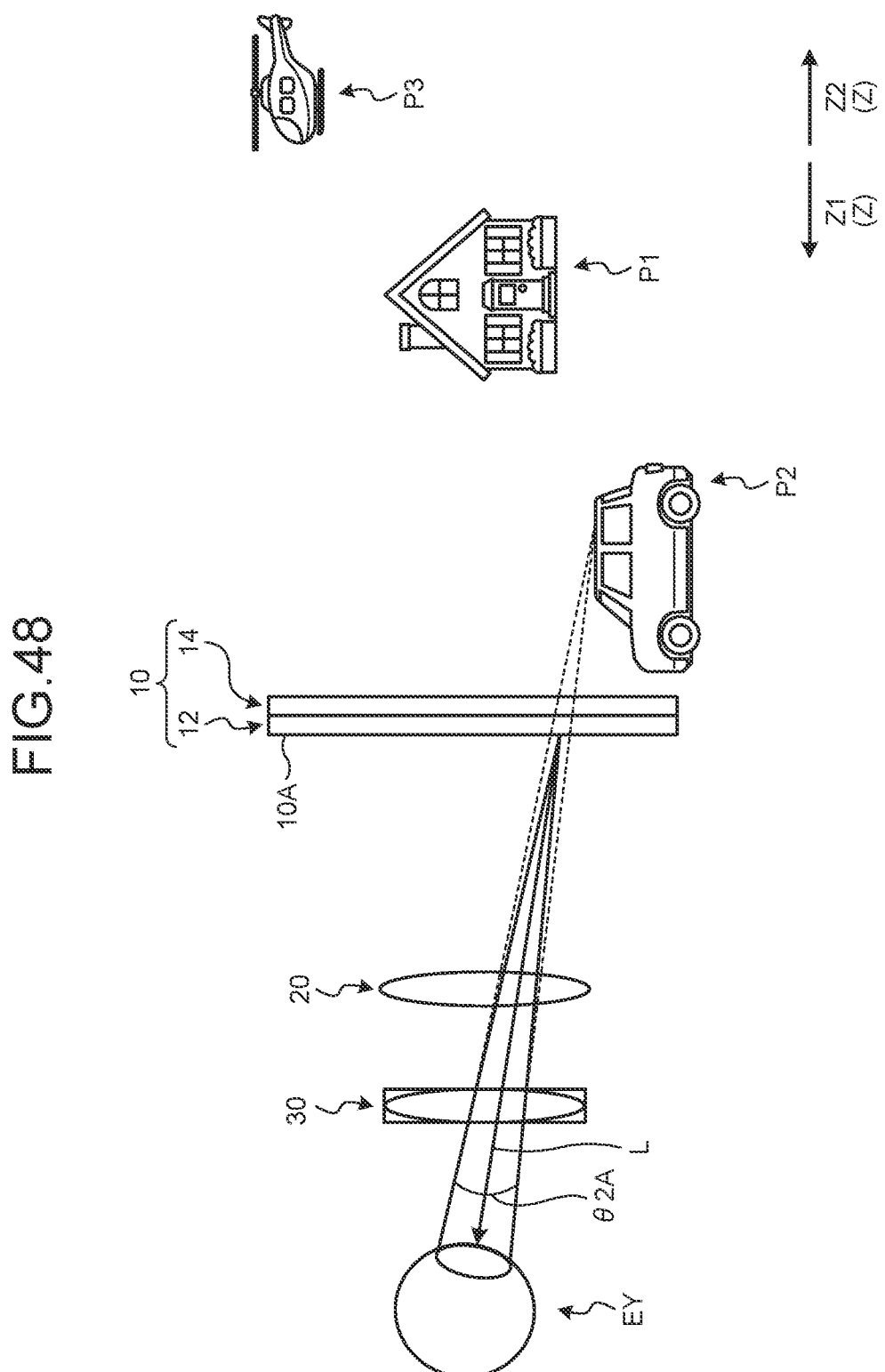
Figure 49:
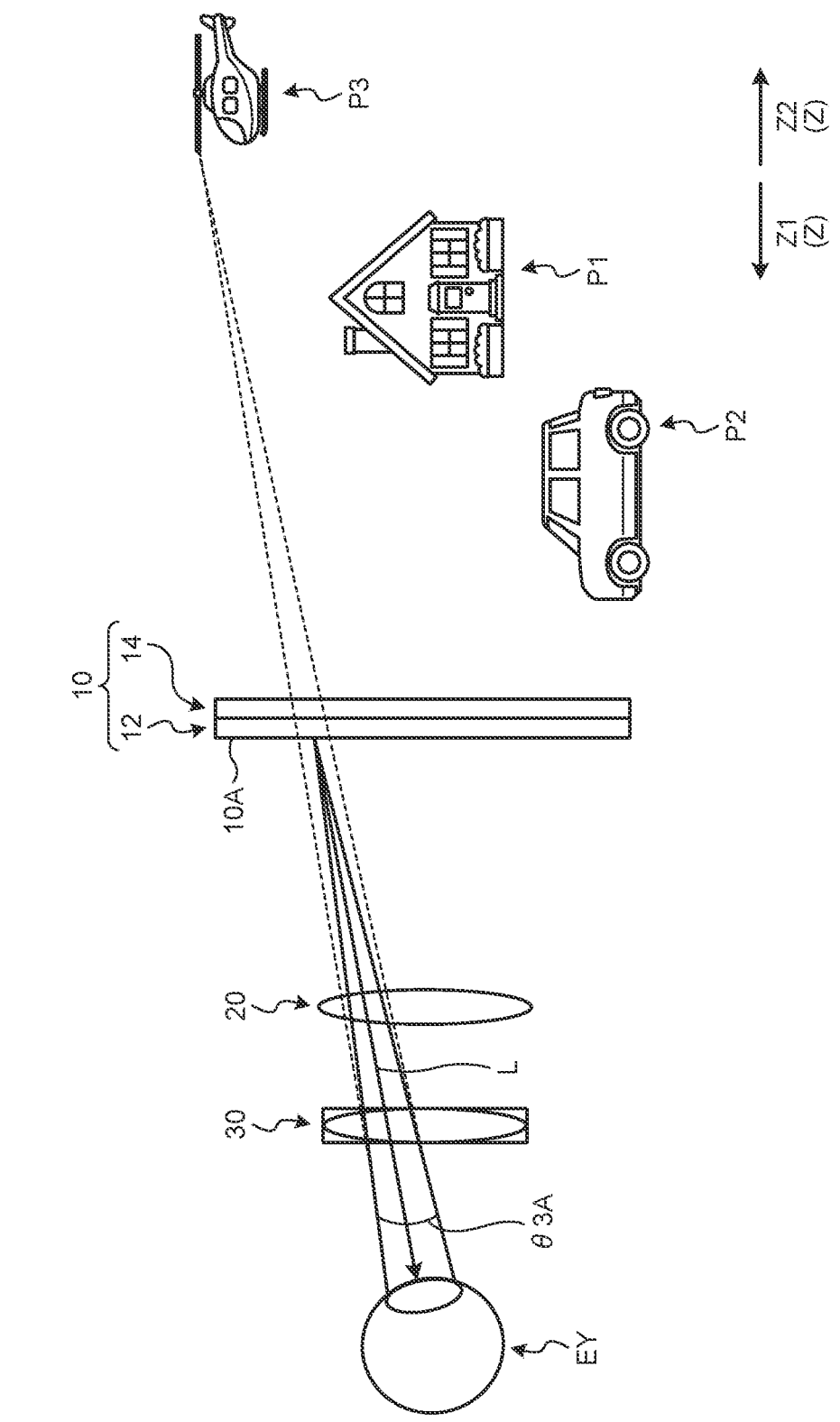

FIGS. 47 to 49 are schematic diagrams for explaining about setting the emission timing. For example, as illustrated in FIG. 47, the image light L that is emitted from the display unit 10 falls onto the eyes EY of the user U as a luminous flux having a predetermined angular aperture. In that case, in order to be in alignment with the angular aperture of the luminous flux, the user U involuntarily varies the thickness of the crystalline lenses of the eyeballs, and makes adjustment so that the retinas come in focus. The convergence/accommodation contradiction implies that the degree of convergence of the right and left eyes (the degree of cross-eye of the right and left eyes) does not match with the state in which the angular aperture of the luminous flux is in focus. In that regard, the display device 1 according to the eleventh embodiment emits the image light L in such a way that there is a decrease in the difference between the virtual image angular aperture that represents the angular aperture when it is assumed that light is emitted from a virtual image (convergence position) and falls onto the eyes EY (in the example illustrated in FIG. 47, the angle θ1A) and the angular aperture of the image light L at the time when the image light L is actually emitted from the display unit 10 and falls onto the eyes EY. Herein, since the image light L undergoes a change in the angular aperture at the time of passing through the lens 30 (i.e., since the image light L gets refracted), the degree of change in the angular aperture of the luminous flux is decided according to the focal position of the lens 30. Thus, the focal position setting unit 66 sets, as the setup focal position, such a focal position of the lens 30 at which the difference between the virtual image angular aperture and the angular aperture of the image light L becomes smaller.

More specifically, the focal position setting unit 66 acquires the depth information regarding the gazing position detected by the eye gaze information acquisition unit 62. That is, the focal position setting unit 66 acquires the information about a position in the depth direction (the Z direction) of the gazing position. In other words, the focal position setting unit 66 acquires the information about a position in the Z direction of the virtual image that is being gazed by the user. Then, based on the depth information regarding the gazing position, the focal position setting unit 66 sets the setup focal position. The focal position setting unit 66 sets, as the setup focal position, the focal position of the lens 30 in the Z direction at the time when the angular aperture of the image light L matches with the angular aperture of the luminous flux attributed to the emission of light from a position in the depth direction of the gazing position (i.e., from the position of the virtual image being gazed by the user U) onto the eyes EY (i.e., matches with the virtual image angular aperture attributed to the gazing position). However, the setup focal position is not limited to be set as the position at which the virtual image angular aperture exactly matches with the actual angular aperture of the image light L. Alternatively, for example, when the difference between the virtual image angular aperture and the actual angular aperture of the image light L is within a predetermined range, the focal position of the lens 30 can be set as the setup focal position. Herein, the predetermined range can be set in an arbitrary manner. However, in order to reduce the convergence/accommodation contradiction, it is desirable that the predetermined range is set in such a way that there is a decrease in the difference between the virtual image angular aperture and the angular aperture of the image light L. Moreover, as the position in the depth direction of the gazing position to be used in setting the setup focal position, the focal position setting unit 66 can use a value obtained by quantizing the depth direction. That is, for example, the depth direction is segmented into a plurality of numerical ranges and, for each numerical range, a predetermined value within that numerical range is set as the reference position. Then, the focal position setting unit 66 extracts the numerical range that includes the acquired position in the depth direction of the gazing position, and treats the reference position of that numerical range as the position in the depth direction of the gazing position to be used in setting the setup focal position.

The drive control unit 68 controls the lens 30 and moves the focal position of the lens 30 in the Z direction. The drive control unit 68 controls the application of the voltage to the actuator of the lens 30, and thus moves the focal position of the lens 30 in the Z direction. The drive control unit 68 moves the focal point of the lens 30 in the Z direction to the setup focal position. As a result, the angular aperture of the luminous flux of the image light L falling on the eyes EY gets closer to the virtual image angular aperture attributed to the gazing position (i.e., the virtual image angular aperture attributed to the virtual image being gazed by the user U), thereby enabling achieving reduction in the convergence/accommodation contradiction.

The abovementioned example about setting the emission timing is explained below with reference to FIGS. 47 to 49. The following explanation is given about an example in which an image of a house, an image of a vehicle, and an image of a helicopter are displayed as stereoscopic images, and the position in the depth direction (the Z direction) becomes more distant from the eyes EY of the user U in the order of the image of a vehicle, the image of a house, and the image of a helicopter. That is, the virtual image P2 of the image of a vehicle is positioned more on the side in the Z1 direction than the virtual image P1 of the image of a house, and the virtual image P3 of the image of the helicopter is positioned more on the side in the Z2 direction than the virtual image P1 of the image of a house.

In FIG. 47 is illustrated an example in which the user U is looking fixedly at the virtual image P1 of the image of a house. In the example illustrated in FIG. 47, the angle θ1A represents the angular aperture of the luminous flux when light is emitted from the virtual image P1 (i.e., from a position in the depth direction of the gazing position) onto the eyes EY (i.e., the angle θ1A represents the virtual image angular aperture attributed to the gazing position).

Moreover, it is assumed that, when the focal position of the lens 30 in the Z direction represents the first position, the angular aperture of the luminous flux of the image light L emitted from the pixel constituting the image of a house becomes equal to the angle θ1A. In that case, the first position represents the setup focal position, and the focal position setting unit 66 moves the focal point of the lens 30 to the first position. As a result, the virtual image angular aperture attributed to the virtual image P1 of the image of a house matches with the angular aperture of the image light L that actually falls onto the eyes EY of the user U, thereby enabling achieving reduction in the convergence/accommodation contradiction. Meanwhile, in the eleventh embodiment, since the light is emitted onto the entire display panel 12, the virtual image P2 of the image of a vehicle and the virtual image P3 of the image of a helicopter also get viewed by the user U. In that case, the virtual image angular apertures with respect to the virtual images P2 and P3 do not match with the angular aperture of the image light L that actually falls onto the eyes EY of the user U. However, the virtual images P2 and P3 are out of range of the region being gazed by the user U, so that there is not much impact on the user U. Moreover, the virtual image angular aperture of the virtual image P1, which is within the range of the region being gazed by the user, matches with the angular aperture of the image light L that actually falls onto the eyes EY of the user U. That enables achieving reduction in the burden on the user U. Meanwhile, in the explanation given above, the first position at which the virtual image angular aperture matches with the angular aperture of the image light L is treated as the setup focal position. However, that is not the only possible case. Alternatively, a position at which the difference between the virtual image angular aperture and the angular aperture of the image light L is within a predetermined range can be treated as the setup focal position.

In FIG. 48 is illustrated an example in which the user U is looking fixedly at the virtual image P2 of the image of a vehicle. In the example illustrated in FIG. 48, the angle θ2A represents the angular aperture of the luminous flux when light is emitted from the virtual image P2 (i.e., from the position in the depth direction of the pixel P constituting the image of a vehicle) onto the eyes EY (i.e., the angle θ2A represents the virtual image angular aperture). Moreover, it is assumed that, when the focal position of the lens 30 in the Z direction represents the second position, the angular aperture of the luminous flux of the image light L emitted from the pixel constituting the image of a vehicle becomes equal to the angle θ2A. Meanwhile, since the virtual image P2 is viewable more on the side in the Z1 direction than the virtual image P1, the angle θ2A is greater than the angle θ1A illustrated in FIG. 47. Moreover, as compared to the case in which the first position represents the focal point, in the case in which the second position represents the focal point, there is an increase in the degree of expansion of the angular aperture (or there is a decrease in the degree of contraction of the angular aperture) of the luminous flux attributed to the lens 30. In that case, the second position represents the setup focal position, and the focal position setting unit 66 moves the focal point of the lens 30 to the second position. As a result, the virtual image angular aperture attributed to the virtual image P2 of the image of a vehicle matches with the angular aperture of the image light L that actually falls onto the eyes EY of the user U, thereby enabling achieving reduction in the convergence/accommodation contradiction. Meanwhile, in the explanation given above, the second position at which the virtual image angular aperture matches with the angular aperture of the image light L is treated as the setup focal position. However, that is not the only possible case. Alternatively, a position at which the difference between the virtual image angular aperture and the angular aperture of the image light L is within a predetermined range can be treated as the setup focal position.

In FIG. 49 is illustrated an example in which the user U is looking fixedly at the virtual image P3 of the image of a helicopter. In the example illustrated in FIG. 49, the angle θ3A represents the angular aperture of the luminous flux when light is emitted from the virtual image P3 (i.e., from the position in the depth direction of the pixel P constituting the image of a vehicle) onto the eyes EY (i.e., the angle θ3A represents the virtual image angular aperture). Moreover, it is assumed that, when the focal position of the lens 30 in the Z direction represents the third position, the angular aperture of the luminous flux of the image light L emitted from the pixel constituting the image of a helicopter becomes equal to the angle θ3A. Meanwhile, since the virtual image P3 is viewable more on the side in the Z2 direction than the virtual image P1, the angle θ3A is smaller than the angle θ1A illustrated in FIG. 47. Moreover, as compared to the case in which the first position represents the focal point, in the case in which the third position represents the focal point, there is a decrease in the degree of expansion of the angular aperture (or there is an increase in the degree of contraction of the angular aperture) of the luminous flux attributed to the lens 30. In that case, the third position represents the setup focal position, and the focal position setting unit 66 moves the focal point of the lens 30 to the third position. As a result, the virtual image angular aperture attributed to the virtual image P3 of the image of the helicopter matches with the angular aperture of the image light L that actually falls onto the eyes EY of the user U, thereby enabling achieving reduction in the convergence/accommodation contradiction. In that case, the third position represents the setup focal position, and the focal position setting unit 66 moves the focal point of the lens 30 to the third position.

Flow of Processing

Figure 50:
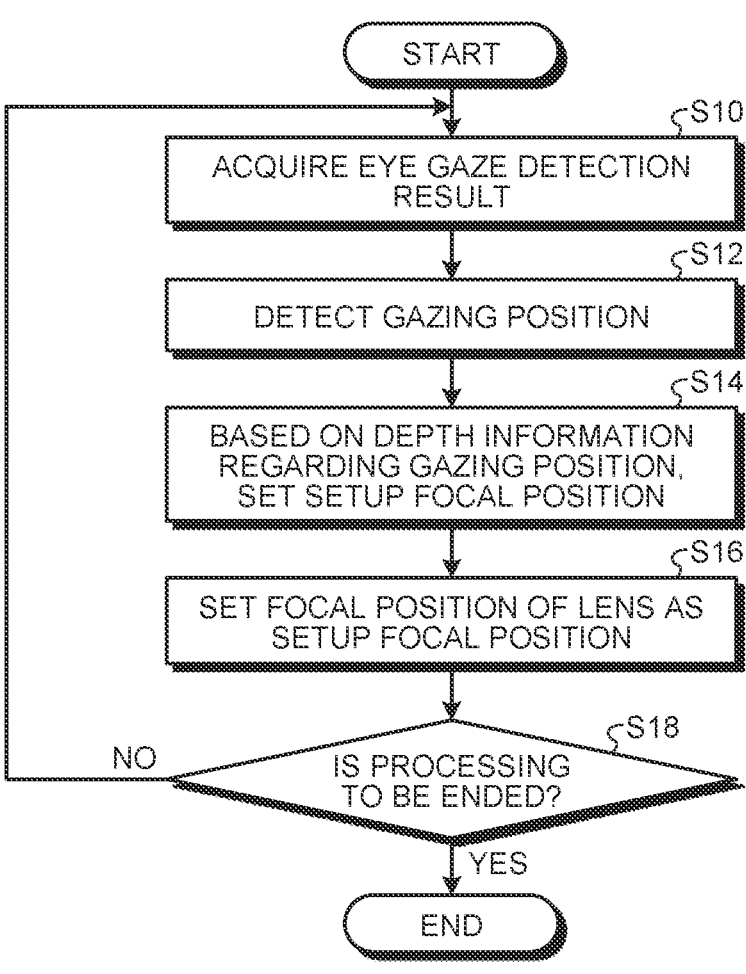
FIG. 50 is a flowchart for explaining a flow of processing performed by the control device according to the eleventh embodiment.

Given below is the explanation of a flow of processing performed by the control device 50. FIG. 50 is a flowchart for explaining a flow of processing performed by the control device according to the eleventh embodiment. In the control device 50, the emission control unit 64 drives the pixels of the display panel 12 based on the image data, and at the same time causes the light source unit 14 to emit light. Moreover, in the control device 50, the eye gaze information acquisition unit 62 acquires the eye gaze detection result regarding the user U (Step S10) and detects the gazing position based on the eye gaze detection result (Step S12). Then, in the control device 50, the focal position setting unit 66 sets the setup focal position according to the depth information regarding the gazing position (Step S14). Subsequently, in the control device 50, the drive control unit 68 sets the focal position of the lens 30 as the setup focal position (Step S16). After that, if the processing is not to be ended (No at Step S18), then the system control returns to Step S10 and the processing are performed again. When the processing is to be ended (Yes at Step S18), it marks the end of the processing.

Effects

As explained above, the display device 1 according to the eleventh embodiment provides stereoscopic images to the user U and includes the display unit 10, the lens 30, the eye gaze information acquisition unit 62, the focal position setting unit 66, and the drive control unit 68. The display unit 10 includes a plurality of pixels, and provides stereoscopic images to the user U by ensuring that the image light L reaches the user U. The eye gaze information acquisition unit 62 acquires the eye gaze detection result regarding the user U. Then, based on the eye gaze detection result regarding the user U and based on the position of the stereoscopic image in the depth direction, the focal position setting unit 66 sets the setup focal position that is treated as the focal position of the lens 30 in the optical axis direction of the image light L. Thus, the drive control unit 68 moves the focal position of the lens 30 to the setup focal position.

In the case of displaying a stereoscopic image, it is required that the stereoscopic image is provided to the user in an appropriate manner. In that regard, in the eleventh embodiment, the focal position of the lens 30 is moved to the setup focal position that is set based on the viewpoint of the user U and the position of the stereoscopic image in the depth direction. Thus, according to the eleventh embodiment, it can be ensured that the image light L reaches the user U at an appropriate angular aperture of the luminous flux based on the viewpoint of the user U and the position of the stereoscopic image in the depth direction, thereby making it possible to provide a stereoscopic image to the user U in an appropriate manner. Moreover, as explained above, at the time of displaying a stereoscopic image, there are times when the convergence/accommodation contradiction occurs. In that regard, in the eleventh embodiment, the angular aperture of the luminous flux can be adjusted in an appropriate manner, and the convergence/accommodation contradiction can be reduced.

Moreover, based on the eye gaze detection result, the eye gaze information acquisition unit 62 detects, in the stereoscopic image, the gazing position at which the user U is looking fixedly. Then, based on the depth information regarding the gazing position, the focal position setting unit 66 sets, as the setup focal position, the focal position of the lens 30 in the optical axis direction of the image light L at which the difference between the angular aperture of the image light L and the angular aperture of the luminous flux at the time when the image light L is emitted from the position in the depth direction of the gazing position toward the user U (i.e., the virtual image angular aperture attributed to the gazing position) falls within a predetermined range. According to the eleventh embodiment, since the angular aperture of the luminous flux of the image light L can be brought closer to the virtual image angular aperture attributed to the virtual image being gazed by the user U, the convergence/accommodation contradiction can be reduced in an appropriate manner.

Meanwhile, the display device 1 is a head-mounted display, because of which stereoscopic images can be provided in an appropriate manner.

Twelfth Embodiment

Given below is the description of the twelfth embodiment. The twelfth embodiment differs from the eleventh embodiment in the way that the focal position of the lens 30 is varied at regular intervals. In the twelfth embodiment, regarding identical constituent elements to the eleventh embodiment, the explanation is not repeated.

Figure 51:
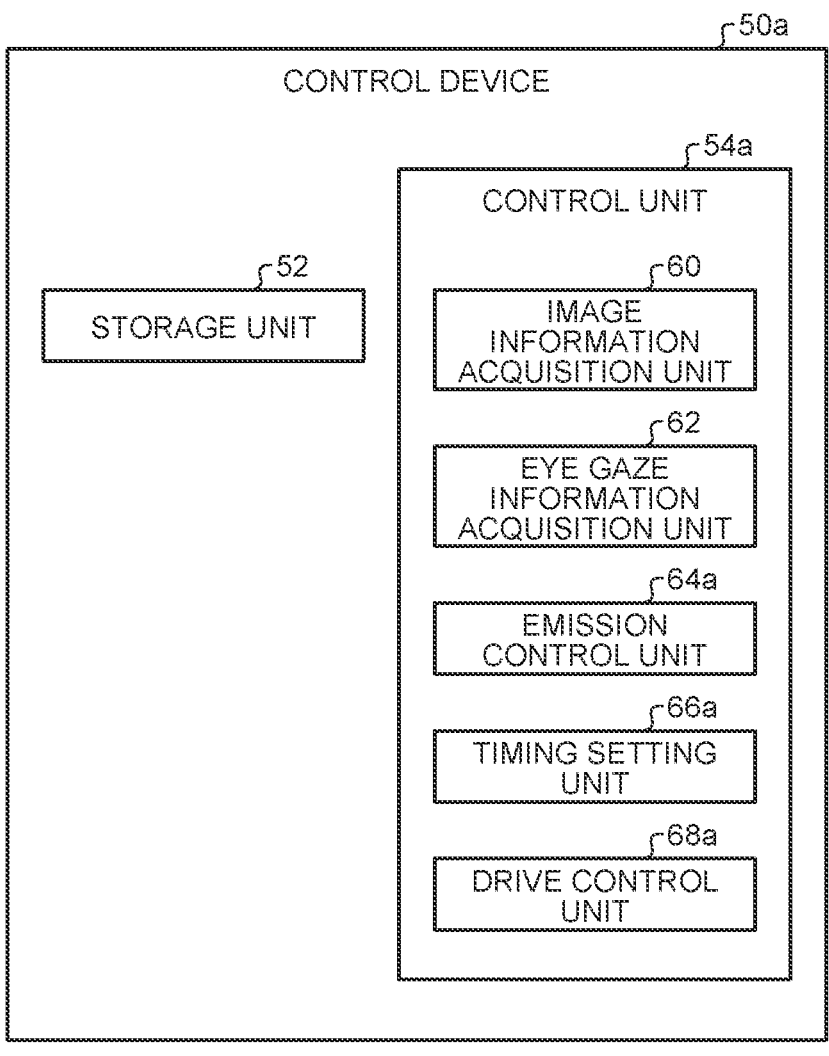
FIG. 51 is a schematic block diagram of a control device according to a twelfth embodiment.

FIG. 51 is a schematic block diagram of a control device according to the twelfth embodiment. As illustrated in FIG. 51, in a control device 50a according to the twelfth embodiment, a control unit 54a includes the image information acquisition unit 60, the eye gaze information acquisition unit 62, an emission control unit 64a, a timing setting unit 66a, and a drive control unit 68a. The control unit 54a reads computer programs (software) from the storage unit 52 and executes them so as to implement the image information acquisition unit 60, the eye gaze information acquisition unit 62, the emission control unit 64a, the timing setting unit 66a, and the drive control unit 68a and to perform their processing. Meanwhile, the control unit 54a either can perform those processing using a single CPU, or can include a plurality of CPUs and can perform the processing using those CPUs. Meanwhile, at least one of the image information acquisition unit 60, the eye gaze information acquisition unit 62, the emission control unit 64a, the timing setting unit 66a, and the drive control unit 68a can be implemented using a hardware circuit.

Drive Control Unit

In the twelfth embodiment, the drive control unit 68a moves the focal position of the lens 30 along the Z direction at regular intervals. The drive control unit 68a moves the focal position of the lens 30 in such a way that the focal position of the lens 30 repeatedly reciprocates (oscillates) in the Z direction by moving in the Z1 direction for a predetermined distance and then moving in the Z2 direction for a predetermined distance. In other words, the drive control unit 68a causes reciprocation of the focal point of the lens 30 in the Z direction at regular intervals. In the twelfth embodiment, the cycle of reciprocation in the Z direction (i.e., the period of time taken by the focal point to return to the original position in the Z direction) is constant. However, the cycle is not limited to be constant, and can be variable.

Timing Setting Unit and Emission Control Unit

The timing setting unit 66a sets the emission timing regarding the light from the light source unit 14. The emission control unit 64a causes the light source unit 14 to emit light at the emission timing set by the timing setting unit 66a. The timing setting unit 66a sets the emission timing based on the eye gaze detection result regarding the user U and based on the focal position of the lens 30 in the Z direction (i.e., in the optical axis direction of the image light L). More particularly, the timing setting unit 66a sets the emission timing based on the eye gaze detection result regarding the user U, based on the depth information regarding the stereoscopic image, and based on the focal position of the lens 30 in the Z direction. Regarding the setting performed by the timing setting unit 66a, more specific explanation is given below.

The timing setting unit 66a sets, as the emission timing, the timing at which the focal point of the lens 30 reaches the position at which the difference between the virtual image angular aperture attributed to the gazing position and the angular aperture of the image light L becomes smaller. More specifically, the timing setting unit 66a acquires the depth information regarding the gazing position detected by the eye gaze information acquisition unit 62. That is, the timing setting unit 66a acquires the information about a position in the depth direction (the Z direction) of the gazing position. Then, based on the depth information regarding the gazing position, the timing setting unit 66a sets the emission position that represents the focal position of the lens 30 at the time of causing the light source unit 14 to start emitting light. The timing setting unit 66a sets, as the emission position, the focal position of the lens 30 in the Z direction at the time when the actual angular aperture of the image light L that actually falls from the pixel P onto the eyes EY through the lens 30 matches with the angular aperture of the luminous flux attributed to the emission of light from the position in the depth direction of the gazing position (i.e., from the position of the virtual image being gazed by the user U) onto the eyes EY (i.e., matches with the virtual image angular aperture). Then, the timing setting unit 66a sets, as the emission timing, the timing at which the focal position of the lens 30 reaches the position at which the distance to the emission position falls within a predetermined distance range. Herein, the predetermined distance can be set in an arbitrary manner. However, in order to reduce the convergence/accommodation contradiction, it is desirable that the predetermined distance is set in such a way that there is a decrease in the difference between the virtual image angular aperture attributed to the gazing position and the angular aperture of the image light L.

In the twelfth embodiment, the timing setting unit 66a sequentially acquires the information about the focal position of the lens 30 in the Z direction and, when the focal position of the lens 30 in the Z direction reaches within a predetermined distance from the emission position, determines that the emission timing has arrived. Herein, the timing setting unit 66a can acquire the information about the focal position of the lens 30 in the Z direction according to an arbitrary method. For example, when the focal position of the lens 30 is being reciprocated in the Z direction at regular intervals, the timing-by-timing positions of the focal position of the lens 30 in the Z direction (i.e., the predicted positions) can be figured out. Thus, the timing setting unit 66a can acquire, from the timing information, the information about the focal positions of the lens 30 in the Z direction. In that case, based on the information about the timing-by-timing predicted focal positions of the lens 30 and the information about the emission position, the timing setting unit 66a can set, as the emission timing, the timing at which the focal point of the lens 30 reaches within a predetermined distance from the emission position; and, when the current timing coincides with the emission timing, can determine that the focal point of the lens 30 has reached the emission position and can cause the light source unit 14 to emit light.

In this way, the timing setting unit 66a sets the emission timing. Moreover, the timing setting unit 66a sets a timing arriving later than the emission timing as the emission discontinuation timing. When the timing setting unit 66a determines that the emission timing has arrived, the emission control unit 64a causes the light source unit 14 to start emitting light. The emission control unit 64a causes the light source unit 14 to emit light during the period of time from the emission timing to the emission discontinuation timing; and, upon arrival of the emission discontinuation timing, causes the light source unit 14 to stop emitting the light. Meanwhile, the emission discontinuation timing can be set in an arbitrary manner. For example, either the timing arriving after a predetermined period of time since the emission timing can be set as the emission discontinuation timing; or, immediately after the emission timing, the timing at which the distance between the focal point of the lens 30 and the emission position goes out of the predetermined distance range can be set as the emission discontinuation timing.

In this way, according to the twelfth embodiment, the light source unit 14 is made to emit light upon arrival of the emission timing and is made to stop emitting the light upon arrival of the emission discontinuation timing. Thus, during the period of time from the emission timing to the emission discontinuation timing, the image light L falls onto the eyes EY of the user U. As a result, the angular aperture of the luminous flux of the image light L falling on the eyes EY gets closer to the virtual image angular aperture attributed to the gazing position (i.e., the virtual image angular aperture attributed to the virtual image being gazed by the user U), thereby enabling achieving reduction in the convergence/accommodation contradiction. Meanwhile, since the focal point of the lens 30 reciprocates in the Z direction, it repeatedly switches between the state in which the distance to the emission position is within a predetermined distance range and the state in which the distance to the emission position goes out of the predetermined distance range. Every time the distance between the focal point of the lens 30 and the emission position falls within the predetermined distance range, that is, at every arrival of the emission timing, the control device 50a causes the light source unit 14 to emit light. Hence, the user U happens to view the stereoscopic images in the form of a video. Moreover, since the focal point of the lens 30 reciprocates in the Z direction, during a single cycle of reciprocation, the distance to the emission position becomes equal to the predetermined distance at two timings. For that reason, it is desirable that the oscillation frequency of the reciprocation of the focal point of the lens 30 is set to be equal to or greater than a half times of the framerate of the stereoscopic image. Herein, the oscillation frequency (cycle) of the reciprocation of the focal point of the lens 30 can be set in an arbitrary manner.

Flow of Processing

Figure 52:
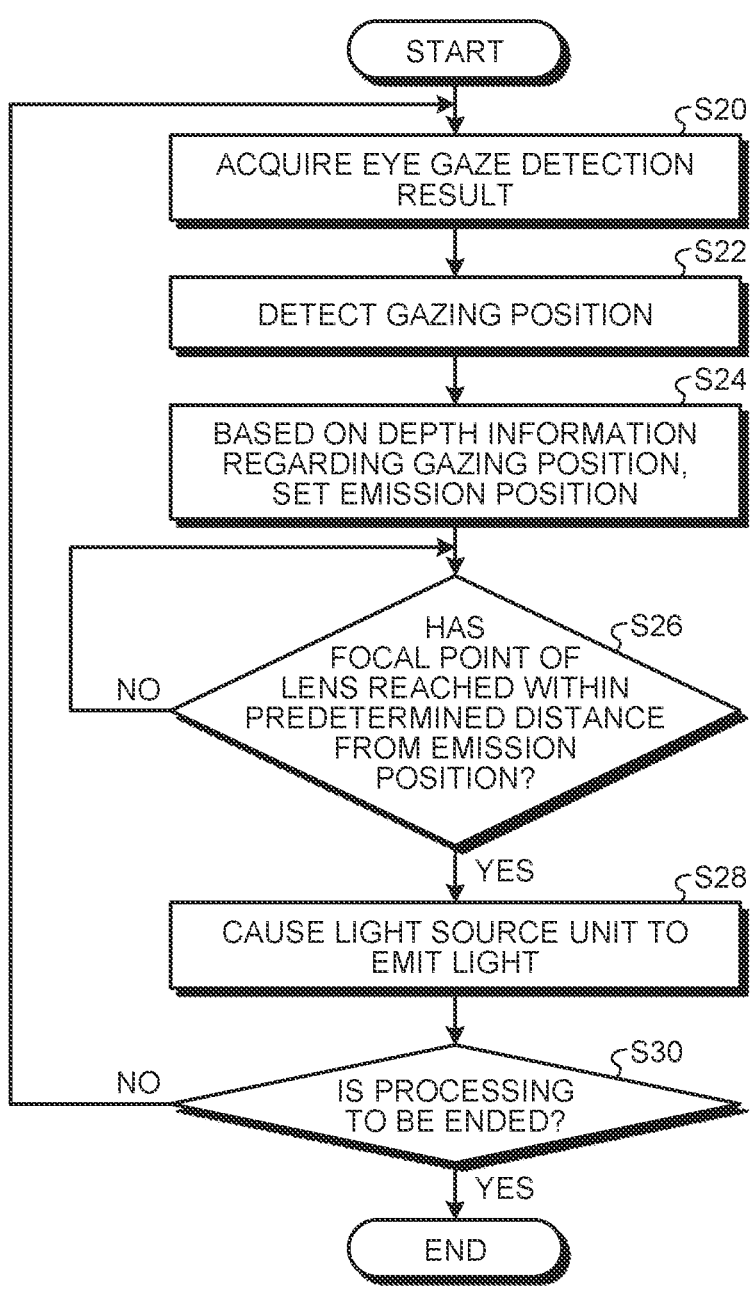
FIG. 52 is a flowchart for explaining a flow of processing performed by the control device according to the twelfth embodiment.

Given below is the explanation of a flow of processing performed by the control device 50a. FIG. 52 is a flowchart for explaining a flow of processing performed by the control device according to the twelfth embodiment. In the control device 50a, the emission control unit 64a drives the pixels of the display panel 12 based on the image data and at the same time the drive control unit 68a causes the focal point of the lens 30 to reciprocate in the Z direction at regular intervals. Moreover, in the control device 50a, while the pixels are driven and the focal point of the lens 30 is made to reciprocate, the eye gaze information acquisition unit 62 acquires the eye gaze detection result regarding the user U (Step S20) and detects the gazing position based on the eye gaze detection result (Step S22). Then, in the control device 50a, the timing setting unit 66a sets the emission position according to the depth information regarding the gazing position (Step S24). Subsequently, the control device 50a sequentially acquires the focal position of the lens 30 in the Z direction and determines whether the focal point of the lens 30 has reached within a predetermined distance from the emission position (Step S26). If the focal point of the lens 30 has reached within a predetermined distance from the emission position (Yes at Step S26), then the timing setting unit 66a determines that the emission timing has arrived, and the emission control unit 64a causes the light source unit 14 to emit light (Step S28). Subsequently, upon arrival of the emission discontinuation timing, the emission control unit 64a causes the light source unit 14 to stop emitting the light. After that, if the processing is not to be ended (No at Step S30), then the system control returns to Step S20 and the processing are performed again. Meanwhile, if the focal point of the lens 30 has not yet reached within a predetermined distance from the emission position (No at Step S26), then the system control returns to Step S26 and the light source unit 14 is not allowed to emit the light until the focal point of the lens 30 reaches within the predetermined distance from the emission position. However, even if the focal point of the lens 30 has not yet reached within a predetermined distance from the emission position (No at Step S26), the system control can still return to Step S20. When the processing is to be ended (Yes at Step S30), it marks the end of the processing.

Effects

As explained above, the display device 1a according to the twelfth embodiment provides stereoscopic images to the user U and includes the display unit 10, the lens 30, the eye gaze information acquisition unit 62, the drive control unit 68a, the timing setting unit 66a, and the emission control unit 64a. The display unit 10 includes the display panel 12 having a plurality of pixels, and includes the light source unit 14 that emits light onto the display panel 12. The display unit 10 ensures that the image light L, which represents the light emitted from the light source unit 14 onto the display panel 12, reaches the user U, and thus provides a stereoscopic image to the user U. The lens 30 is disposed on the side of the user U with respect to the display unit 10 in the optical axis direction of the image light L, and is a varifocal lens. The eye gaze information acquisition unit 62 acquires the eye gaze detection result regarding the user U. The drive control unit 68a moves the focal point of the lens 30 along the optical axis direction of the image light L (in the twelfth embodiment, along the Z direction) at regular intervals. Based on the eye gaze detection result regarding the user U and based on the focal position of the lens 30 in the optical axis direction (in the twelfth embodiment, the Z direction), the timing setting unit 66a sets the emission timing regarding the emission of light from the light source unit 14. Upon arrival of the emission timing, the emission control unit 64a causes the light source unit 14 to emit light.

In the case of displaying a stereoscopic image, it is required that the stereoscopic image is provided to the user in an appropriate manner. In that regard, in the twelfth embodiment, the focal point of the lens 30 is moved in the optical axis direction and, based on the viewpoint of the user U and the focal position of the lens 30 in the optical axis direction, the emission timing regarding the light is set. Thus, according to the twelfth embodiment, it can be ensured that the image light L reaches the user U at an appropriate timing based on the viewpoint of the user U and the focal position of the lens 30 in the optical axis direction, thereby making it possible to provide a stereoscopic image to the user U in an appropriate manner. Moreover, in the twelfth embodiment, the focal point of the lens 30 is moved in the optical axis direction and at the same time the emission timing regarding the light is set based on the viewpoint of the user U and the focal point of the lens 30.

Hence, the angular aperture of the luminous flux of the image light L can be appropriately adjusted and the convergence/accommodation contradiction can be reduced. More particularly, in the twelfth embodiment, it is not every time that the focal point of the lens 30 is moved to a position at which the angular aperture of the luminous flux of the image light L is appropriate. Instead, the focal point of the lens 30 is moved at regular intervals, and the emission of light from the light source unit 14 is controlled at the timing at which the angular aperture of the luminous flux of the image light L becomes appropriate. As a result of controlling the emission of light in this manner, it becomes possible to hold down a delay in the control, and to appropriately adjust the angular aperture of the luminous flux of the image light L.

Moreover, the timing setting unit 66a sets the emission timing based on the depth information that indicates the position of a stereoscopic image in the depth direction (in the twelfth embodiment, the Z direction). According to the twelfth embodiment, since the emission timing is set by taking into account the depth information too, the angular aperture of the luminous flux of the image light L can be appropriately adjusted according to the stereoscopic image to be displayed. That enables achieving reduction in the convergence/accommodation contradiction.

Moreover, based on the eye gaze detection result, the eye gaze information acquisition unit 62 detects the gazing position in the stereoscopic image at which the user U is looking fixedly. Then, based on the depth information regarding the gazing position, the timing setting unit 66a acquires the information about the emission position that is such a position of the focal length of the lens 30 in the optical axis direction at which the angular aperture of the luminous flux of the image light L corresponds to the angular aperture of the luminous flux when the image light L is emitted from a position in the depth direction of the gazing position toward the user U (i.e., corresponds to the virtual image angular aperture). Moreover, the timing setting unit 66a sets, as the emission timing, the timing at which the focal point of the lens 30 falls within a predetermined distance range from the emission position. According to the twelfth embodiment, the angular aperture of the luminous flux of the image light L can be brought closer to the virtual image angular aperture attributed to the virtual image being gazed by the user U. That enables achieving reduction in the convergence/accommodation contradiction.

Thirteenth Embodiment

Given below is the explanation of the thirteenth embodiment. The thirteenth embodiment differs from the twelfth embodiment in the way that the display unit is of the self-luminous type. In the thirteenth embodiment, regarding identical constituent elements to the twelfth embodiment, the explanation is not repeated.

Figure 53:
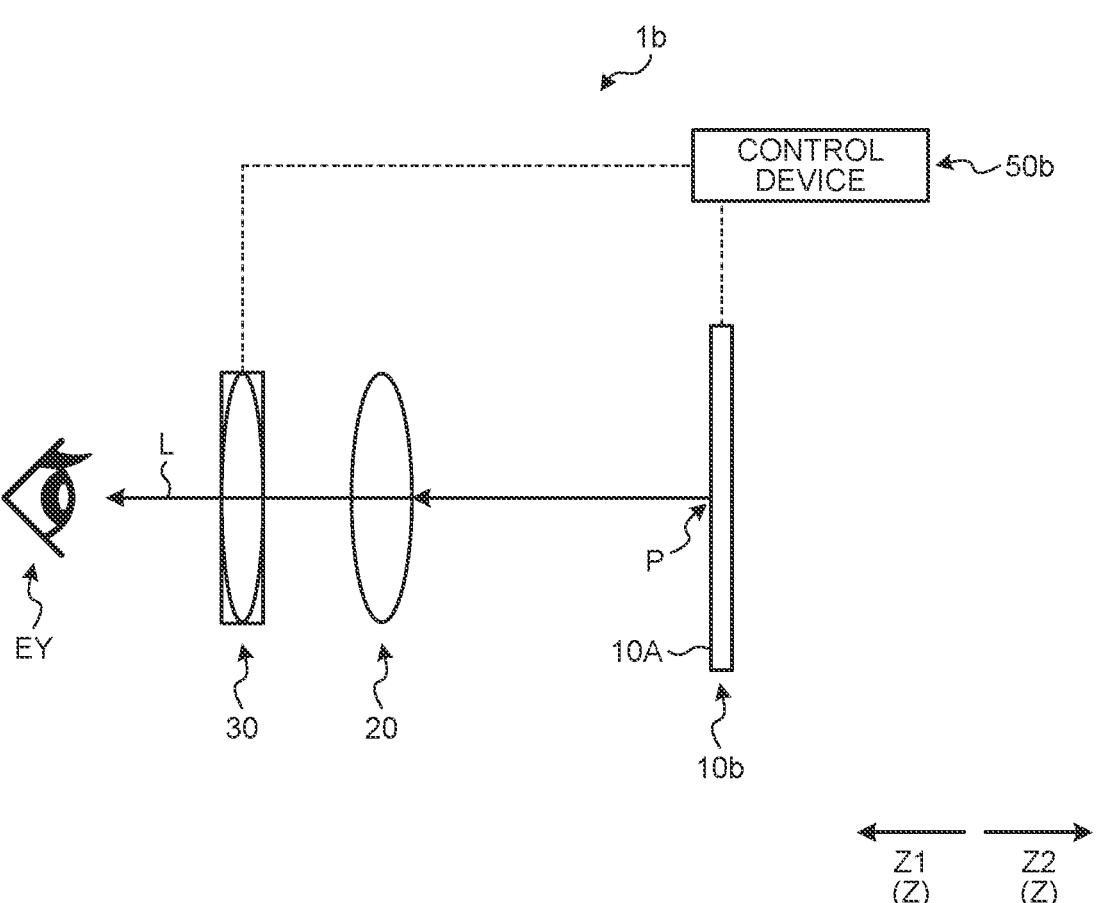
FIG. 53 is a schematic diagram illustrating the constituent elements of a display device according to a thirteenth embodiment.

FIG. 53 is a schematic diagram illustrating the constituent elements of the display device according to the thirteenth embodiment. As illustrated in FIG. 53, the display device 1b according to the thirteenth embodiment includes a display unit 10b. In the display device 1b, the eye gaze detection unit 40 is not disposed. The display unit 10b includes a plurality of self-luminous pixels P (display elements) arranged in a matrix. Because of the self-luminous nature of the pixels P in the display unit 10b, it becomes possible for the display unit 10b to control the emission of light (emission of light) from each pixel P on an individual basis. The pixels P of the display unit 10b can be, for example, organic light emitting diodes or inorganic light emitting diodes. In the thirteenth embodiment, the display unit 10b receives, from a control device 50b, a control signal meant for controlling the emission timing regarding the light emitted from the pixels P. Moreover, the actuator of the lens 30 receives, from the control device 50b, a signal meant for controlling the focal position.

Figure 54:
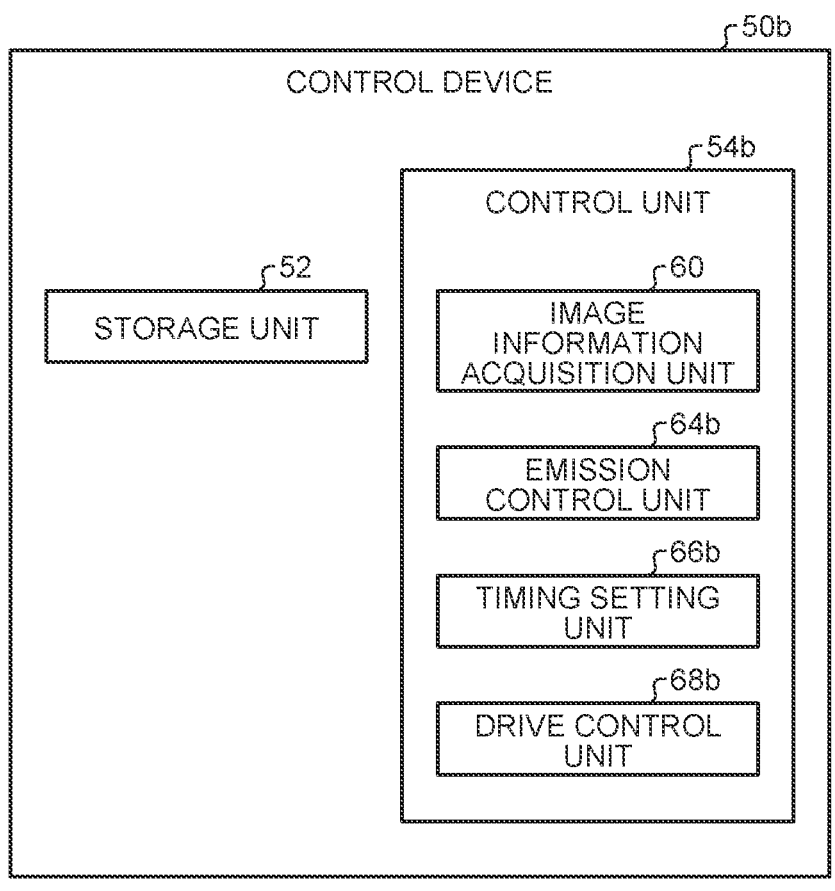
FIG. 54 is a schematic block diagram of a control device according to the thirteenth embodiment.

FIG. 54 is a schematic block diagram of the control device according to the thirteenth embodiment. As illustrated in FIG. 54, in the control device 50b according to the thirteenth embodiment, a control unit 54b includes the image information acquisition unit 60, an emission control unit 64b, a timing setting unit 66b, and a drive control unit 68b. In the thirteenth embodiment, the eye gaze information acquisition unit 62 is not included.

Drive Control Unit

In an identical manner to the twelfth embodiment, the drive control unit 68b moves the focal position of the lens 30 along the Z direction at regular intervals.

Timing Setting Unit and Emission Control Unit

The timing setting unit 66b sets, for each pixel P, the emission timing regarding the image light L. The emission control unit 64b controls the pixels P based on the image data, and causes them to emit light. The emission control unit 64b causes each pixel P to emit the image light L at the emission timing set for that pixel P by the timing setting unit 66b. That is, the emission control unit 64b causes a particular pixel P to emit the image light L at the emission timing set for that particular pixel P. The timing setting unit 66b sets the emission timing based on the focal position of the lens 30 in the Z direction (i.e., in the optical axis direction of the image light L). More particularly, based on the depth information regarding the concerned stereoscopic image and the focal position of the lens 30 in the Z direction, the timing setting unit 66b sets the emission timing. The more detailed explanation is given below.

The timing setting unit 66b acquires the depth information regarding each pixel P. That is, the timing setting unit 66b acquires, for each pixel P, the information about a position in the depth direction (the Z direction). Then, based on the depth information regarding each pixel P, the timing setting unit 66b sets the emission position representing the focal position of the lens 30 at the time of causing the concerned pixel P to start emitting the image light L. The timing setting unit 66b sets, as the emission position for the concerned pixel P, the focal position of the lens 30 in the Z direction at the time when the angular aperture of the image light L that actually falls from the pixel P onto the eyes EY through the lens 30 matches with the angular aperture of the luminous flux in the case in which light is emitted from the position in the depth direction of that part of the stereoscopic image which is displayed due to the concerned pixel P (i.e., from the position of the virtual image formed by the concerned pixel P) onto the eyes EY (i.e., matches with the virtual image angular aperture). Then, the timing setting unit 66b sets, as the emission timing for the concerned pixel P, the timing at which the focal point of the lens 30 reaches the position at which the distance to the emission position is within a predetermined distance range. The timing setting unit 66b sets the emission position for each pixel P as well as sets the emission timing for each pixel P. Although the timing setting unit 66b sets the emission position as well as the emission timing for each pixel P, the emission position and the emission timing are not limited to be different for each pixel P. For example, for a group of pixels P constituting a single image (for example, a group of pixels P displaying the image of a house in FIG. 47), the emission position and the emission timing can be set to be identical.

Meanwhile, according to the thirteenth embodiment, since the emission timing is set for each pixel P, there are also times when only some pixels P in a single frame are turned on. For example, at the timing explained with reference to FIG. 47, only the image of a house is displayed. Similarly, at the timing explained with reference to FIG. 48, only the image of a vehicle is displayed. Moreover, at the timing explained with reference to FIG. 49, only the image of a helicopter is displayed. However, because of the after-image effect attributed to successive delivery of a plurality of frames, the user U recognizes that a house, a vehicle, and a helicopter are all appearing in a single image. Alternatively, the configuration can be such that the entire image (in the present example, all of the house, the vehicle, and the helicopter) is displayed within the display period of a single frame. In that case, within the display period of a single frame, the drive control unit 68b can move the focal position of the lens 30 by at least half of the reciprocation cycle. As a result, within the display period of a single frame, all focal positions within the reciprocation can be covered, thereby enabling the display of the entire image.

Flow of Processing

Figure 55:
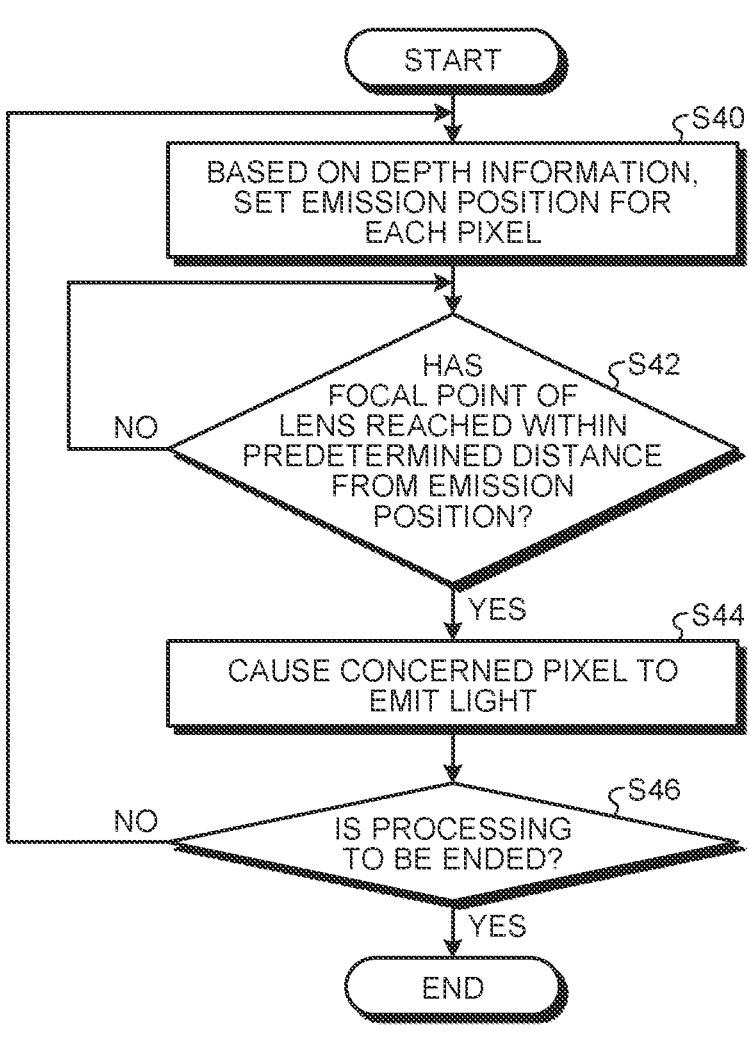
FIG. 55 is a flowchart for explaining a flow of processing performed by the control device according to the thirteenth embodiment.

Given below is the explanation of a flow of processing performed by the control device 50b. FIG. 55 is a flowchart for explaining a flow of processing performed by the control device according to the thirteenth embodiment. In the control device 50b, the drive control unit 68b causes the focal position of the lens 30 to reciprocate in the Z direction at regular intervals. Moreover, in the control device 50b, the timing setting unit 66b refers to the depth information regarding each pixel P and sets the emission position for each pixel P (Step S40). Then, the control device 50b sequentially acquires the focal position of the lens 30 in the Z direction and determines, for each pixel P, whether the focal point of the lens 30 has reached within a predetermined distance from the corresponding emission position (Step S42). If the focal point of the lens 30 has reached within a predetermined distance (Yes at Step S42), that is, if there is a pixel P regarding which the focal point of the lens 30 is determined to have reached within a predetermined distance from the emission position; then the timing setting unit 66b determines that the emission timing for the concerned pixel P has arrived, and the emission control unit 64b causes that pixel P to emit the image light L based on the image data (Step S44). Subsequently, upon arrival of the emission discontinuation timing, the emission control unit 64b causes that pixel P to stop emitting the image light L. After that, if the processing is not to be ended (No at Step S46), then the system control returns to Step S40 and the processing are performed again. Meanwhile, if the focal point of the lens 30 has not yet reached within a predetermined distance from the emission position (No at Step S42), that is, if there is no pixel P regarding which the focal point of the lens 30 is determined to have reached within a predetermined distance from the emission position; then the system control returns to Step S42 and no pixel P is allowed to emit the light until the focal point of the lens 30 reaches within the predetermined distance from the corresponding emission position. Meanwhile, at Step S46, if the processing is to be ended (Yes at Step S46), then it marks the end of the processing.

Effects

As explained above, the display device 1b according to the thirteenth embodiment provides stereoscopic images to the user U and includes the display unit 10, the lens 30, the drive control unit 68b, the timing setting unit 66b, and the emission control unit 64b. The display unit 10 includes a plurality of self-luminous pixels P, and provides stereoscopic images to the user U by ensuring that the image light L emitted from the pixels P reaches the user U. The lens 30 is disposed on the side of the user U with respect to the display unit 10 in the optical axis direction of the image light L, and is a varifocal lens. The drive control unit 68b moves the focal point of the lens 30 along the optical axis direction of the image light L (in the thirteenth embodiment, along the Z direction) at regular intervals. Based on the focal position of the lens 30 in the optical axis direction (in the thirteenth embodiment, the Z direction), the timing setting unit 66b sets the emission timing for each pixel P in regard to the emission of the image light L. At an emission timing, the emission control unit 64b causes the corresponding pixel P to emit the image light L.

In the case of displaying a stereoscopic image, it is required that the stereoscopic image is provided to the user in an appropriate manner. In that regard, in the thirteenth embodiment, the focal point of the lens 30 is moved in the optical axis direction and, based on the focal position, the emission timing regarding the image light L is set. Thus, according to the thirteenth embodiment, it can be ensured that the image light L reaches the user U at an appropriate timing based on the focal position of the lens 30 in the optical axis direction, thereby making it possible to provide a stereoscopic image to the user U in an appropriate manner. Moreover, as explained above, at the time of displaying a stereoscopic image, there are times when the convergence/accommodation contradiction occurs. In that regard, in the thirteenth embodiment, the focal point of the lens 30 is moved in the optical axis direction and at the same time the emission timing regarding the image light L is set based on the focal position in the optical axis direction. Hence, the angular aperture of the luminous flux of the image light L can be appropriately adjusted and the convergence/accommodation contradiction can be reduced.

Moreover, the timing setting unit 66b sets the emission timing based on the depth information that indicates the position of a stereoscopic image in the depth direction (in the first embodiment, the Z direction). According to the thirteenth embodiment, since the emission timing is set by taking into account the depth information too, the angular aperture of the luminous flux of the image light L can be appropriately adjusted according to the stereoscopic image to be displayed. That enables achieving reduction in the convergence/accommodation contradiction.

Furthermore, the timing setting unit 66b acquires the information about the emission position that represents the focal position of the lens 30 in the optical axis direction at which the angular aperture of the luminous flux of the image light L emitted from the concerned pixel P corresponds to the angular aperture of the luminous flux in the case in which the image light L is emitted toward the user U from the position in the depth direction in that part of the stereoscopic image which is displayed using the concerned pixel P (i.e., corresponds to the virtual image angular aperture). The timing setting unit 66b sets, as the emission timing for the concerned pixel P, the timing at which the focal point of the lens 30 reaches within a predetermined distance range from the emission position. According to the thirteenth embodiment, it becomes possible to ensure that only those pixels P emit light for which the angular aperture of the luminous flux and the virtual image angular aperture are close, and that the pixels P for which the angular aperture of the luminous flux and the virtual image angular aperture are not close do not emit light. That enables achieving reduction in the convergence/accommodation contradiction.

Modification Example

Given below is the explanation of a modification example. In the display device 1c according to the modification example, the difference from the eleventh embodiment is that the display is expanded using the concave mirror 20C, and the eyepiece 20 is not used. In the modification example, regarding identical constituent elements to the eleventh embodiment, the explanation is not repeated.

Figure 56:
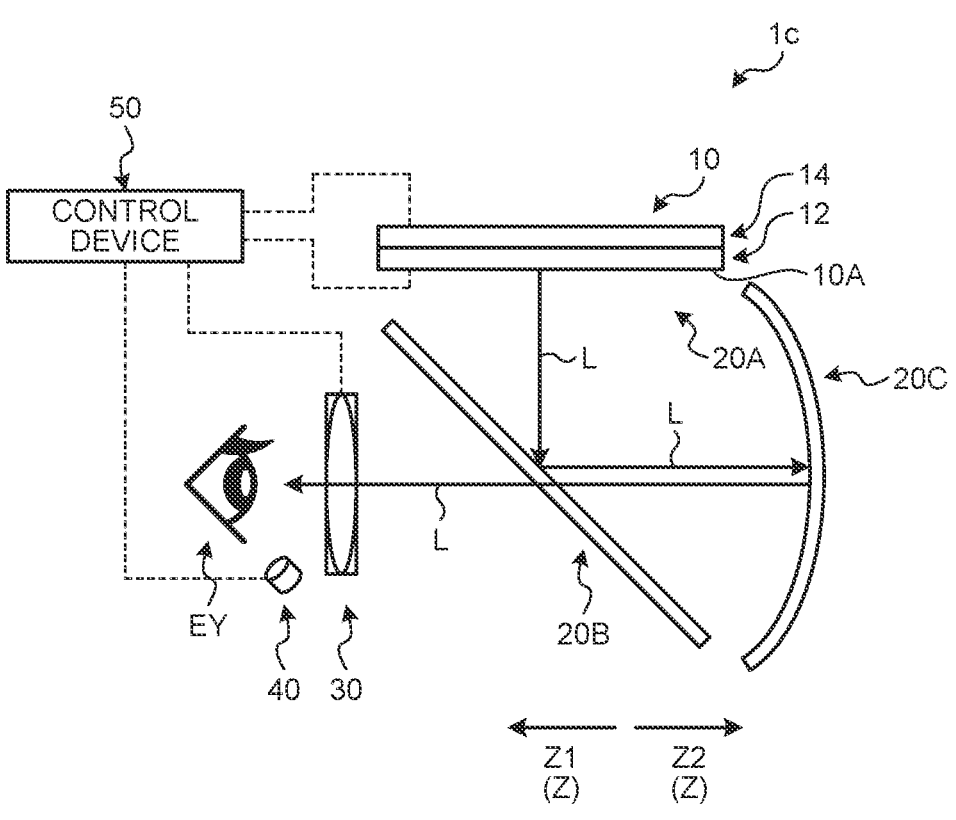
FIG. 56 is a schematic diagram of a display device according to a modification example.

FIG. 56 is a schematic diagram of the display device according to the modification example. As illustrated in FIG. 56, in the display device 1c according to the modification example, the eyepiece 20 is not disposed, and the half mirror 20B and the concave mirror 20C are disposed on the side of the eyes EY of the user U with respect to the display unit 10 in the optical axis direction of the image light L. The half mirror 20B and the concave mirror 20C can also be treated as optical elements. In the modification example, the image light L emitted from the display unit 10 gets reflected from the half mirror 20B and falls onto the concave mirror 20C. The image light L that falls onto the concave mirror 20C becomes almost a parallel light while having a slight spread angle at the concave mirror 20C, and then passes through the half mirror 20B and falls onto the eyes EY of the user U.

In the modification example, in an identical manner to the eleventh embodiment, the focal position of the lens 30 is controlled. Even with the configuration as explained in the modification example, in an identical manner to the eleventh embodiment, it becomes possible to appropriately provide stereoscopic images to the user U and to appropriately adjust the aperture angle of the luminous flux of the image light L. That enables enabling achieving reduction in the convergence/accommodation contradiction.

Meanwhile, the modification example is applicable in the twelfth and thirteenth embodiments too. Moreover, the configuration of the display device can be different than the configurations according to the embodiments or the configuration according to the modification example explained with reference to FIG. 56.

A display control program for performing the display control method, which is implemented by the display device described above, may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

According to the present disclosure, it becomes possible to provide images to the user in an appropriate manner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
a display unit including a plurality of pixels to cause the plurality of pixels to emit light to provide an image to a user;
a drive control unit configured to cause the display unit to reciprocate in an optical axis direction of the light at a frequency equal to or greater than a half times of a framerate of the image; and
a timing setting unit configured to set an emission timing of the light for each of the plurality of pixels based on a position of the display unit.

2. The display device according to claim 1, wherein the timing setting unit is configured to set the emission timing based on depth information indicating a position of the image in depth direction.

3. The display device according to claim 2, wherein the timing setting unit is configured to
acquire information about an emission position that represents a position of the display unit at which an angular aperture of luminous flux of light emitted from each pixel, of the plurality of pixels, corresponds to an angular aperture of luminous flux when the light is emitted toward the user from a position in depth direction of a part of the image that is displayed by the pixel, and
set, as the emission timing for the pixel, a timing at which the display unit reaches within a predetermined distance range from the emission position.

4. The display device according to claim 1, further comprising a microlens array disposed on a user side with respect to the display unit.

5. The display device according to claim 1, wherein
the display unit comprises
a display panel having the plurality of pixels, and
a light source unit configured to emit light onto the display panel,
the display device further comprises an eye gaze information acquisition unit configured to acquire a result of detecting an eye gaze of the user, and
the timing setting unit is configured to set an emission timing for the light source unit to emit light based on the result of detecting the eye gaze of the user and based on a position of the display panel.

6. The display device according to claim 1, wherein
the display unit comprises
a display panel having the plurality of pixels, and
a light source unit configured to emit light onto the display panel, the display device further comprises
an optical element disposed on a user side with respect to the display panel, and
an eye gaze information acquisition unit configured to acquire a result of detecting an eye gaze of the user,
the drive control unit is configured to move the optical element at predetermined intervals, and
the timing setting unit is configured to set an emission timing for the light source unit to emit light based on the result of detecting the eye gaze of the user and based on a position of the optical element.

7. The display device according to any claim 1, further comprising an optical element disposed on a user side with respect to the display unit, wherein
the drive control unit is configured to move the optical element at predetermined intervals, and
the timing setting unit is configured to set an emission timing of the light for each of the plurality of pixels based on a position of the optical element.

8. The display device according to claim 1, further comprising a varifocal type of microlens array disposed on a user side with respect to the display unit, wherein
the drive control unit is configured to vary a focal position of the microlens array at predetermined intervals, and the timing setting unit is configured to set an emission timing of the light for each of the plurality of pixels based on the focal position of the microlens array.

9. The display device according to claim 1, further comprising:

a varifocal type of lens disposed on a user side with respect to the display unit;

an eye gaze information acquisition unit configured to acquire a result of detecting an eye gaze of the user; and a focal position setting unit configured to set a focal point of the lens based on the result of detecting the eye gaze of the user and based on a position of the image in depth direction.

10. The display device according to claim 1, further comprising:

a varifocal type of microlens array disposed on a user side with respect to the display unit, having a plurality of lenses, and enabling varying focal points of the lenses on an individual basis; and a focal position setting unit configured to set a focal position of each of the plurality of lenses based on depth information indicating a position of the image in depth direction.

11. A display control method comprising:

performing drive control to cause a display unit, including a plurality of pixels and causing the plurality pixels to emit light that renders an image, to reciprocate in an optical axis direction of the light at a frequency equal to or greater than a half times of a framerate of the image; and setting an emission timing of the light for each of the plurality of pixels based on a position of the display unit.

12. A non-transitory computer-readable storage medium storing a display control program causing a computer to execute:

performing drive control to move a display unit, including a plurality of pixels and causing the plurality of pixels to emit light, to reciprocate in an optical axis direction of the light at a frequency equal to or greater than a half times of a framerate of an image rendered by the plurality of pixels; and setting an emission timing of the light for each of the plurality of pixels based on a position of the display unit.

* * * * *